US010655986B2

(12) United States Patent
Miyazawa et al.

(10) Patent No.: US 10,655,986 B2
(45) Date of Patent: May 19, 2020

(54) POSITION INDICATOR AND POSITION DETECTION APPARATUS

(71) Applicant: Wacom Co., Ltd., Saitama (JP)

(72) Inventors: Hiroshi Miyazawa, Kanagawa (JP); Toshihiko Horie, Saitama (JP)

(73) Assignee: Wacom Co., Ltd., Saitama (JP)

( * ) Notice: Subject to any disclaimer, the term of this patent is extended or adjusted under 35 U.S.C. 154(b) by 34 days.

(21) Appl. No.: 15/934,381

(22) Filed: Mar. 23, 2018

(65) Prior Publication Data
US 2018/0209818 A1 Jul. 26, 2018

Related U.S. Application Data

(63) Continuation of application No. PCT/JP2016/079201, filed on Oct. 3, 2016.

(30) Foreign Application Priority Data

Oct. 22, 2015 (JP) .................................. 2015-207932

(51) Int. Cl.
*G01D 5/20* (2006.01)
*G06F 3/0354* (2013.01)
(Continued)

(52) U.S. Cl.
CPC ............. *G01D 5/204* (2013.01); *G06F 3/038* (2013.01); *G06F 3/0383* (2013.01);
(Continued)

(58) Field of Classification Search
CPC ............. G06F 3/03545; G06F 3/03542; G06F 3/03543; G06F 3/038; G06F 3/0383; G06F 3/0416; G06F 3/046; G01D 5/204
See application file for complete search history.

(56) References Cited

U.S. PATENT DOCUMENTS 7,149,647 B2   12/2006 Katsurahira
9,268,417 B2   2/2016  Oda et al.
(Continued)

FOREIGN PATENT DOCUMENTS

JP      5-210450 A     8/1993
JP      5-210453 A     8/1993
(Continued)

*Primary Examiner* — Xuemei Zheng
(74) *Attorney, Agent, or Firm* — Seed IP Law Group LLP

(57) ABSTRACT

A position indicator includes a light emitting element, a resonance circuit including a coil which, in operation, transmits and receives a signal to and from a sensor of a position detection apparatus and a capacitor connected in parallel to the coil, and a signal generation circuit which, in operation, accumulates power of the signal received from the sensor by the resonance circuit and generates a light emission driving controlling signal that drives and controls the light emitting element to emit light based on the accumulated power. The light emitting element is driven and controlled by the light emission driving controlling signal generated by the signal generation circuit to perform light emission control of the light emitting element of the position indicator by the position detection apparatus. The position indicator has a simple configuration and performs light emission control of the light emitting element under control of the position detection apparatus.

23 Claims, 25 Drawing Sheets

(51) Int. Cl.
*G06F 3/041* (2006.01)
*G06F 3/044* (2006.01)
*G06F 3/038* (2013.01)
*G06F 3/046* (2006.01)

(52) U.S. Cl.
CPC ...... *G06F 3/03542* (2013.01); *G06F 3/03543* (2013.01); *G06F 3/03545* (2013.01); *G06F 3/046* (2013.01); *G06F 3/0416* (2013.01)

(56) References Cited

U.S. PATENT DOCUMENTS

| | | |
|---|---|---|
| 9,778,123 B2 | 10/2017 | Horie et al. |
| 2011/0007037 A1 | 1/2011 | Ogawa |
| 2014/0306940 A1* | 10/2014 | Fukushima ........... G06F 1/1626 345/179 |
| 2015/0193027 A1* | 7/2015 | Robinson ............ G06F 3/03545 345/179 |

FOREIGN PATENT DOCUMENTS

| | | |
|---|---|---|
| JP | 7-41629 U | 7/1995 |
| JP | 10-171584 A | 6/1998 |
| JP | 11-184633 A | 7/1999 |
| JP | 2001-265513 A | 9/2001 |
| JP | 2005-10844 A | 1/2005 |
| JP | 2008-152640 A | 7/2008 |
| JP | 2011-18090 A | 1/2011 |
| JP | 2012-221304 A | 11/2012 |
| JP | 2013-161307 A | 8/2013 |

* cited by examiner

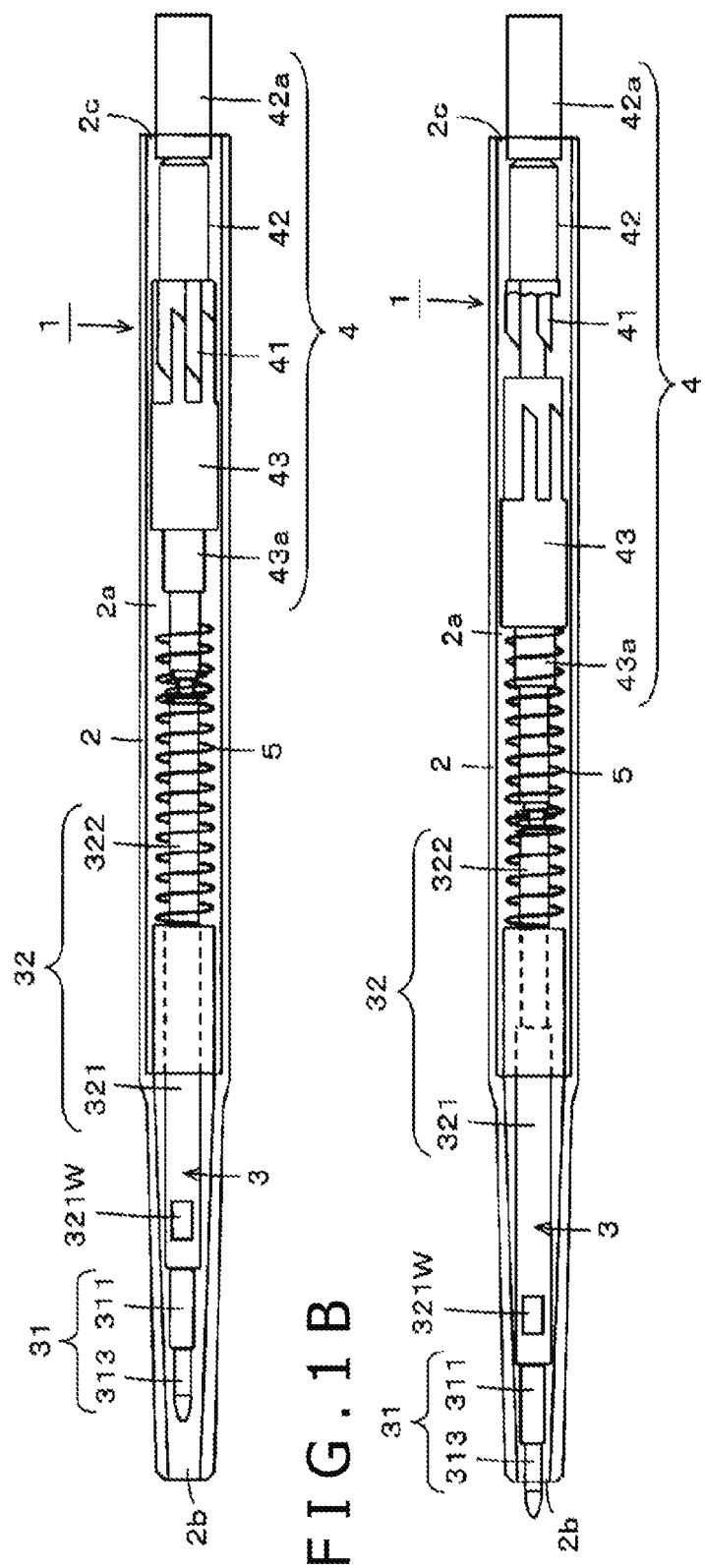

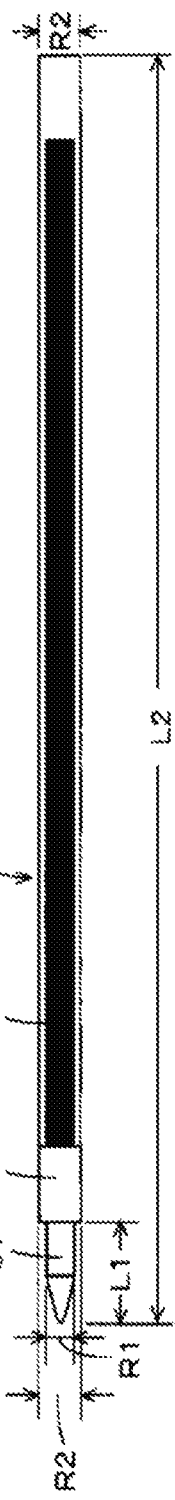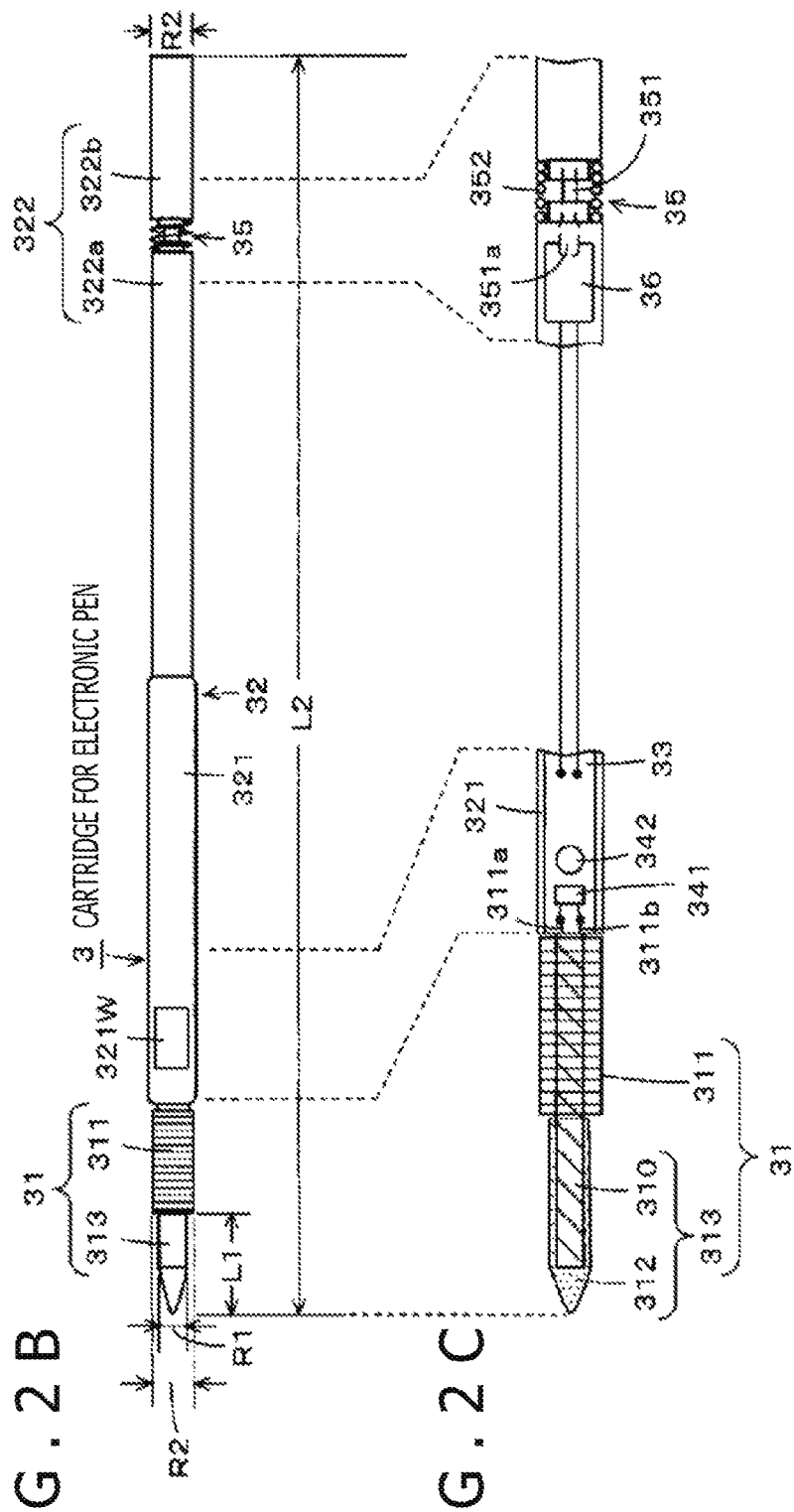

FIG. 8
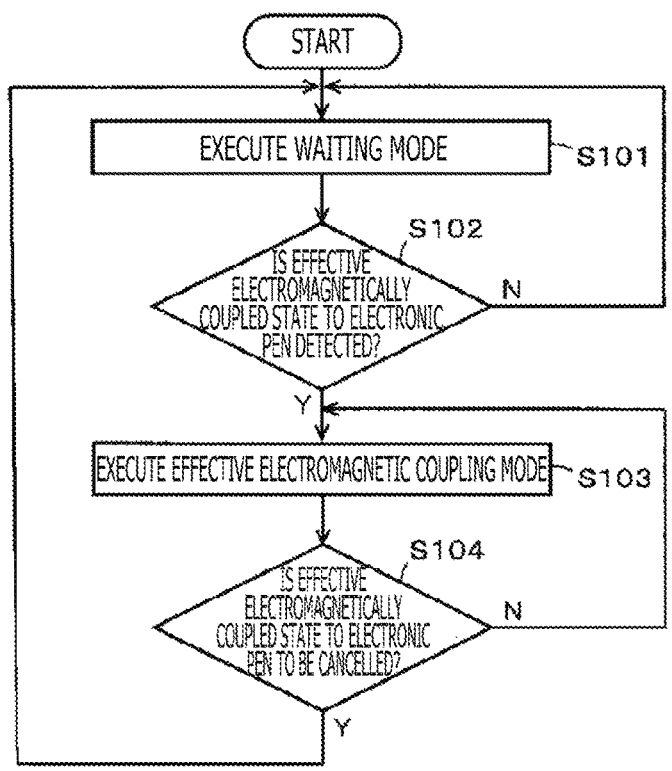
FIG. 9A
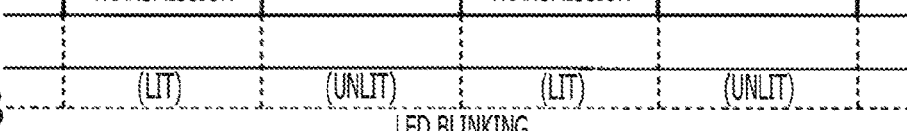
FIG. 9B
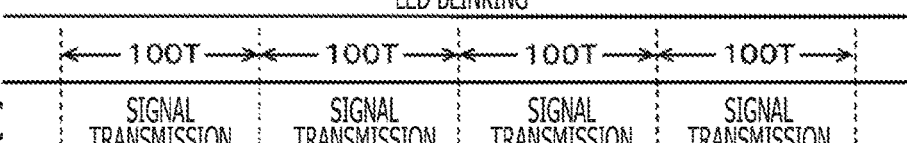
FIG. 9C
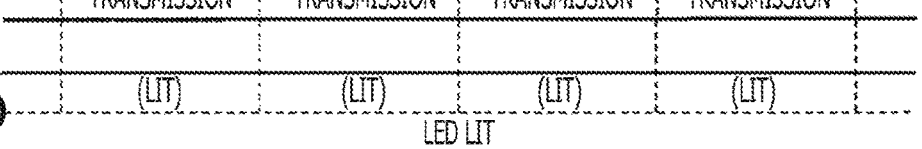
FIG. 9D

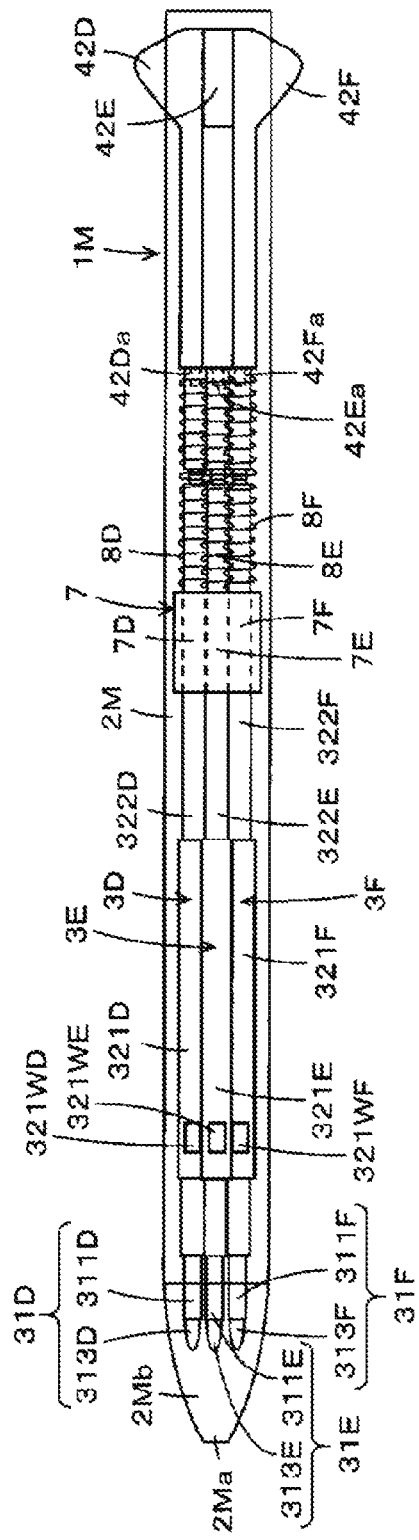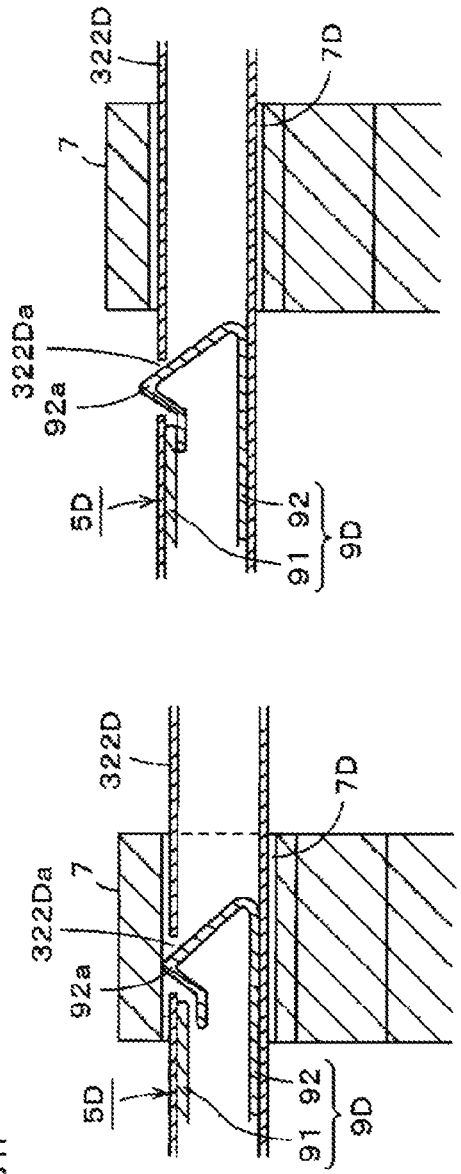

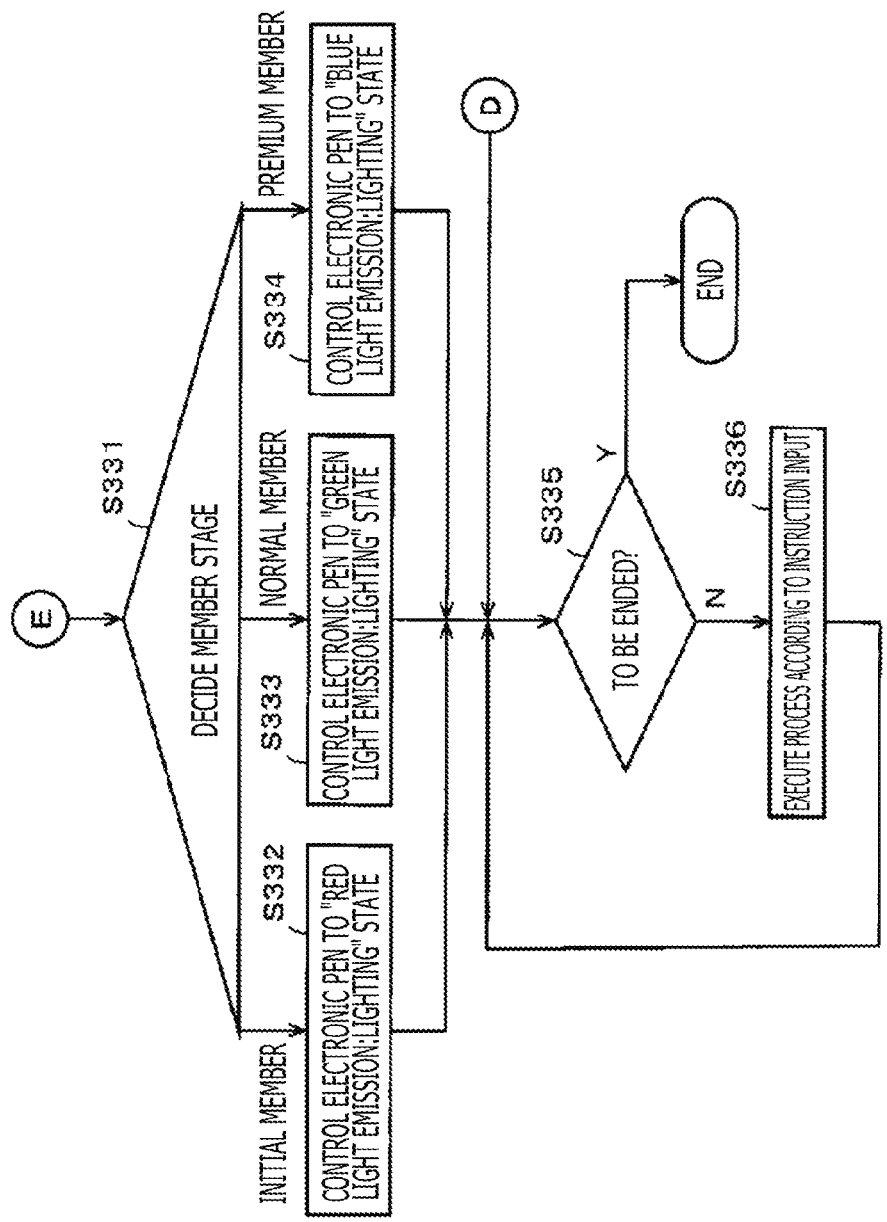

POSITION INDICATOR AND POSITION DETECTION APPARATUS

TECHNICAL FIELD

The present disclosure relates to a position detection apparatus of the electromagnetic induction type and a position indicator for use together with the position detection apparatus.

BACKGROUND ART

A position indicator is gripped by a user and used for position indication on a sensor of a position detection apparatus. The position detection apparatus detects the position of a sensor electrode that is electrically coupled to the position indicator to detect the indication position by the position indicator on the sensor of the position detection apparatus. As a method for detecting electric coupling between the sensor and the position indicator, various methods are known including a method for detecting capacitive coupling and a method for detecting electromagnetic coupling.

It is conventionally done to provide, in a position indicator of the type described, a light emitting element configured, for example, from a light emitting diode (LED) such that the light emitting element is controlled to emit light in response to various applications.

As uses of a position indicator in which light is emitted, confirmation of a manipulation of a power supply switch (for example, Patent Document 1 (Japanese Patent Laid-Open No. 2011-18090)), illumination on a pen tip from a light emitting element provided in the proximity of the pen tip (for example, Patent Document 2 (Japanese Patent Laid-Open No. 1999-184633)), and so forth are known. Since to cause a light emitting element to emit light is high in visibility to a user, this is utilized in various uses in addition to such confirmation of a manipulation or illumination as described above.

Incidentally, a power supply for driving a light emitting element in a position indicator to emit light is generally configured such that a primary cell is provided on the position indicator or a secondary cell or an electric double layer capacitor is provided to charge the position indicator through a charger. However, the method that uses a cell as the power supply to a light emitting element has a fundamental problem that, if the cell is placed into a cell exhaustion or charging shortage state, then a necessary power supply voltage cannot be obtained from the cell.

As a method for avoiding this problem, Patent Document 1 and Patent Document 2 disclose that a coil for receiving power and an accumulation circuit are provided in a position indicator and an electromagnetic wave is sent from a position detection apparatus to the position indicator to allow the position indicator to generate a power supply voltage through electromagnetic induction.

For example, Patent Document 3 (Japanese Patent Laid-Open No. 2005-010844) discloses, as a position indicator that uses an electromagnetic coupling method as a coupling method for position indication to a sensor of a position detection apparatus, a position indicator that includes a resonance circuit configured from a coil and a capacitor such that an alternating-current (AC) signal from the sensor of the position detection apparatus is received by the resonance circuit and the received AC signal is fed back from the position indicator to the sensor of the position detection apparatus to allow the position detection apparatus to detect the indication position by the position indicator. Further, it is disclosed that, in the position indicator of Patent Document 3, an electromagnetic wave from the position detection apparatus is received by a resonance circuit configured from a coil and a capacitor and a power supply voltage in the position indicator is generated from the received signal power.

PRIOR ART DOCUMENT

Patent Documents

Patent Document 1: Japanese Patent Laid-Open No. 2011-18090

Patent Document 2: Japanese Patent Laid-Open No. 1999-184633

Patent Document 3: Japanese Patent Laid-Open No. 2005-10844

BRIEF SUMMARY

Technical Problems

Due to the presence of such prior art documents as listed above, it is possible to configure a position indicator in which a light emitting element can emit light for various uses even if a cell is not provided as a power supply.

Incidentally, as a use of a light emitting element provided in a position detector to as to emit light, not only a use from such necessity in convenience in use of a position indicator itself as described above but also a use from the necessity for cooperation between the position detection apparatus and the position indicator are available. For example, Patent Document 2 states that, when an electronic wave outputted from the position indicator is received by the position detection apparatus, a light emission instruction signal is sent from the position detection apparatus to the position indicator such that the light emitting element emits light on the basis of the light emission instruction signal to notify a user through the light emitting element that the position indicator and the position detection apparatus are in a cooperative state.

In this manner, where the light emitting element in the position indicator is controlled to emit light in a use from the necessity for cooperation between the position detection apparatus and the position indicator, a control signal such as a light emission instruction signal is sent from the position detection apparatus to the position indicator, and the position indicator is configured to analyze the control signal such as the light emission instruction signal and control the light emitting element on the basis of a result of the analysis as described in Patent Document 2 listed above. In other words, conventionally the position indicator includes a control circuit for receiving a signal from the position detection apparatus and performing light emission control of the light emitting element and performs the light emission control of the light emitting element in the own position indicator.

Accordingly, it is conventionally necessary for the position indicator to include a receiver for receiving a signal from the position detection apparatus and a control circuit configured from a central processing unit (CPU) or the like and to secure a power supply voltage for the receiver and the control circuit and for driving the light emitting element to emit light. Therefore, the position indicator has problems that it must include a complicated circuit configuration and that also the problem of the power supply must be cleared.

Taking the foregoing into consideration, it is an object of the present disclosure to make it possible for a position indicator of a simple configuration to perform light emission control of a light emitting element provided in the position indicator under the control of a position detection apparatus.

Technical Solution

In order to solve the problems described above, the present disclosure provides a position indicator, including: a light emitting element; a resonance circuit including a coil which, in operation, transmits and receives a signal to and from a sensor of a position detection apparatus, and a capacitor connected in parallel to the coil; and a signal generation circuit which, in operation, accumulates power of the signal received from the sensor by the resonance circuit and generates a light emission driving controlling signal that drives and controls the light emitting element to emit light based on the accumulated power; in which the light emitting element is driven and controlled by the light emission driving controlling signal generated by the signal generation circuit to perform light emission control of the light emitting element by the position detection apparatus.

The position indicator of the disclosure having the configuration described above includes the resonance circuit configured from the coil and the capacitor, and the resonance circuit receives the signal from the sensor of the position detection apparatus. Further, the position indicator according to the present disclosure includes the signal generation circuit, and in this signal generation circuit, the resonance circuit accumulates power of the signal received from the sensor of the position detection apparatus and generates the light emission driving controlling signal that drives and controls the light emitting element to emit light based on the accumulated power. In the position indicator according to the present disclosure, the light emitting element is driven and controlled to emit light by the generated light emission driving controlling signal.

In the position indicator according to the present disclosure, only by providing a simple circuit that merely generates the light emission driving controlling signal in the signal generation circuit from the signal received from the position detection apparatus, the light emitting element provided in the position indicator can be driven and controlled to emit light in accordance with the signal from the position detection apparatus. In this case, the position indicator exhibits also an advantageous effect that a power supply such as a battery for causing the light emitting element to emit light need not be provided separately.

Further, the position indicator of claim 2 is configured such that, in the position indicator of claim 1, the signal from the sensor of the position detection apparatus includes a position detection signal that is detected as a feedback signal from the position indicator by the sensor and a light emission controlling signal that controls light emission of the light emitting element; and the signal generation circuit receives the signal including the position detection signal and the light emission controlling signal received by the resonance circuit and generates the light emission driving controlling signal based on the received signal including the position detection signal and the light emission controlling signal.

In the position indicator of claim 2, the resonance circuit receives the signal including the position detection signal and the light emission controlling signal for the light emitting element from the sensor of the position detection apparatus. Then, the signal generation circuit receives the signal received by the resonance circuit and including the position detection signal and the light emission controlling signal for the light emitting element and generates the light emission driving controlling signal. In particular, the position indicator according to the present disclosure receives both the position detection signal and the light emission controlling signal for the light emitting element included in the signal from the sensor received by the resonance circuit to generate the light emission controlling signal. Accordingly, the position indicator according to the present disclosure is simplified in configuration because the signal generation circuit need not distinguish the position detection signal and the light emission controlling signal for the light emitting element from each other to extract only the light emission controlling signal to generate the light emission driving controlling signal.

Further, it is necessary for the position detection apparatus to generate only the light emission controlling signal such that the signal generation circuit of the position indicator can accumulate the power of the light emission controlling signal and can drive and control the light emitting element to emit light based on the accumulated power and supply the light emission controlling signal to the resonance circuit of the position indicator. Therefore, there is an advantageous effect also that the configuration for light emission control of the light emitting element in the position detection apparatus may be simple.

Advantageous Effect

With the position indicator according to the present disclosure, only by providing a simple circuit that merely allows the signal generation circuit to generate the light emission driving controlling signal from the signal received from the position detection apparatus, the light emitting element provided in the position indicator can be driven and controlled to emit light by the signal from the position detection apparatus. In addition, the position indicator according to the present disclosure presents an advantageous effect also that there is no necessity to separately provide a power supply such as a battery for causing the light emitting element to emit light.

BRIEF DESCRIPTION OF THE DRAWINGS

FIGS. 1A and 1B are views depicting an example of a configuration of a first embodiment of a position indicator according to the present disclosure.

FIGS. 2A, 2B, and 2C are views illustrating an example of a configuration of an electronic pen cartridge used in the first embodiment of the position indicator according to the present disclosure.

FIG. 8 is a flow chart depicting an outline of a flow of software processing in a second embodiment of the position indicator according to the present disclosure.

FIGS. 9A, 9B, 9C, and 9D are views depicting a timing chart used for description of operation corresponding to the software processing of FIG. 8.

FIGS. 15A, 15B, and 15C are views illustrating an example of a configuration of a fifth embodiment of the position indicator according to the present disclosure.

FIG. 27 is a view depicting part of the flow chart illustrating the second different example of the light emission control mode in the embodiment of the position indicator according to the present disclosure.

DETAILED DESCRIPTION

Figure 3:
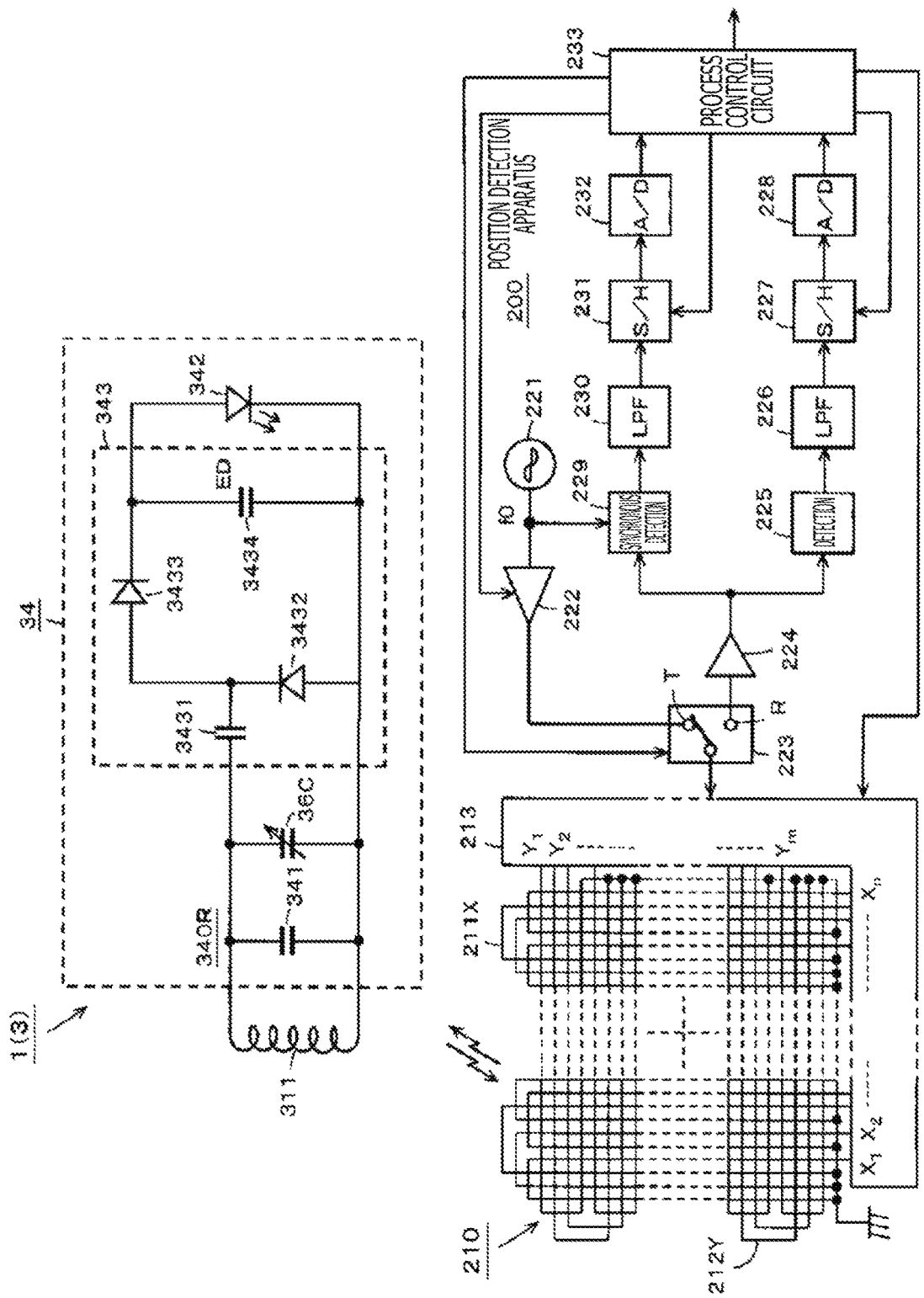
FIG. 3 is a view depicting an example of a configuration of an electronic circuit of the first embodiment of the position indicator according to the present disclosure together with an example of a circuit configuration of a position detection apparatus.

In the following, several embodiments of a position indicator according to the present disclosure are described with reference to the drawings.

First Embodiment

This first embodiment is an example of a case in which a position indicator is of the pen type including a tubular housing. In the following description, the position indicator of the pen type is referred to as electronic pen.

FIGS. 1A and 1B are views depicting an example of a configuration of a first embodiment of an electronic pen as the position indicator according to the present disclosure. The electronic pen 1 of the first embodiment has a knock type configuration wherein an electronic pen cartridge 3 configuring an electronic pen main body is accommodated in a hollow portion 2a of a tubular housing 2 and a pen tip of the electronic pen cartridge 3 is moved into and out of the housing 2 from an opening 2b at one end of the housing 2 in its longitudinal direction by a knock cam mechanism 4.

FIG. 1A depicts a state in which the entirety of the electronic pen cartridge 3 including a pen tip side of the electronic pen cartridge 3 (tip end of a pen tip portion 313 of a core body portion 31 hereinafter described) is accommodated in the hollow portion 2a of the housing 2 to protect the pen tip. FIG. 1B depicts a state in which at least the tip end of the pen tip of the electronic pen cartridge 3 is projected from the opening 2b of the housing 2 by the knock cam mechanism 4. It is to be noted that, in the example of FIGS. 1A and 1B, since the housing 2 of the electronic pen 1 is configured from a transparent synthetic resin, it is depicted in a state in which the inside thereof can be seen therethrough.

The electronic pen 1 of the present embodiment is configured so as to be compatible with a knock type ballpoint pen on the market. In particular, the housing 2 and the knock cam mechanism 4 provided in the housing 2 have a configuration same as that and have a dimensional relation same as that of a known knock type ballpoint pen on the market. In other words, for the housing 2 and the knock cam mechanism 4, a housing and a knock cam mechanism of a knock type ballpoint pen on the market can be used as they are. Further, the electronic pen cartridge 3 has compatibility with a replacement core 6 of a ballpoint pen in that it is accommodated in the housing 2 in place of the replacement core 6 (refer to FIG. 2A) of the ballpoint pen such that the pen tip can be configured for movement into and out of the housing 2 by the knock cam mechanism 4.

As depicted in FIGS. 1A and 1B, the knock cam mechanism 4 has a well-known configuration configured from a combination of a cam main body 41, a knock bar 42 and a rotatable element 43. The cam main body 41 is formed on an inner wall face of the tubular housing 2. The knock bar 42 is configured such that an end portion 42a thereof projects from an opening 2c at a side opposite to a pen tip side of the housing 2 such that it can be acted upon by a knocking manipulation of a user. The rotatable element 43 has a fitting portion 43a with which an end portion of the electronic pen cartridge 3 at a side opposite to a pen tip side is to be fitted.

If the end portion 42a of the knock bar 42 is depressed in the state of FIG. 1A, then the electronic pen cartridge 3 is locked to a state of FIG. 1(B) in the housing 2 by the knock cam mechanism 4 and is placed into a state in which it projects at the pen tip side thereof from the opening 2b of the housing 2. Then, if the end portion 42a of the knock bar 42 is depressed again in the state of FIG. 1B, then the lock state is cancelled by the knock cam mechanism 4, and the position of the electronic pen cartridge 3 in the housing 2 returns to a state of FIG. 1A by a return spring 5. Since a detailed configuration and operation of the knock cam mechanism 4 are well-known, description of the same is omitted here.

[Embodiment of Electronic Pen Cartridge]

FIGS. 2A, 2B, and 2C are views depicting an example of a configuration of the electronic pen cartridge 3 for comparison with a replacement core of a knock type ballpoint pen on the market. In particular, FIG. 2A depicts a replacement core 6 of a knock type ballpoint pen on the market, and FIG. 2B depicts an example of a configuration of the electronic pen cartridge 3 of the present embodiment. Meanwhile, FIG. 2C is a view illustrating a configuration of part of the electronic pen cartridge 3 of the present embodiment depicted in FIG. 2B.

The replacement core 6 of the knock type ballpoint pen on the market has a well-known configuration in which a pen tip portion 61 at an end of which a ball is disposed and an ink accommodation portion 62 are coupled by a coupling portion 63 into a unitary member as depicted in FIG. 2A. The coupling portion 63 has a diameter equal to that of the ink accommodation portion 62.

On the other hand, the electronic pen cartridge 3 of the present embodiment has a configuration in which a core body portion 31 and a tubular body portion 32 are coupled into a unitary member as depicted in FIG. 2B. The core body portion 31 is configured such that, as depicted in FIG. 2C, a coil 311 is wound around part of the magnetic core, in this example the ferrite core 310, and the pen tip portion 313 is formed such that a portion of the ferrite core 310 at which the coil 311 is not wound is covered with a protective member 312.

In the present example, the coil 311 of the core body portion 31 is wound over a portion of the ferrite core 310 having a length approximately one half the overall length of the ferrite core 310 from a portion of the ferrite core 310 in the proximity of one end portion. Further, in the present example, the remaining portion of the ferrite core 310 having a length approximately one half and having no coil 311 wound thereon is formed as the pen tip portion 313 covered with the protective member 312 made of, for example, resin. For the protective member 312 of the pen tip portion 313, a resin material that is relatively hard but has flexibility, for example, POM (Polyoxymethylene) is used.

In this case, the pen tip portion 313 of the core body portion 31 of the electronic pen cartridge 3 is configured such that the diameter and the length thereof are substantially equal to a diameter R1 and a length L1 of the pen tip portion 61 of the replacement core 6 of the ballpoint pen as depicted in FIGS. 2A and 2B, respectively. Further, the portion of the core body portion 31 of the electronic pen cartridge 3 around which the coil 311 is wound is configured such that it has a diameter substantially equal to a diameter R2 (R2>R1) of the ink accommodation portion 62 of the replacement core 6 of the ballpoint pen.

Meanwhile, the tubular body portion 32 is configured from an insulating material, for example, a resin material and is configured from a first tubular body portion 321 in which an electronic circuit part is disposed, and a second tubular body portion 322 in which a writing pressure detection part is disposed. Further, as depicted in FIGS. 2A and 2B, the length (total length) of the core body portion 31 and the tubular body portion 32 in a coupled state is selected equal to the overall length L2 of the replacement core 6 of the ballpoint pen.

A printed board 33 is disposed in the first tubular body portion 321 of the tubular body portion 32 as depicted in FIG. 2C, and on the printed board 33, an electronic circuit 34 (not depicted in FIG. 2C. Refer to FIG. 3) is provided which includes a capacitor 341 that configures a resonance circuit together with the coil 311, an LED 342 as an example of the light emitting element, and a signal generation circuit that generates a light emission driving controlling signal for driving the LED 342 to emit light.

On a side circumferential face of the first tubular body portion 321, a window portion 321W as an example of a light radiation portion for radiating emitted light from the LED 342 to the outside therethrough is formed as depicted in FIG. 2B. This window portion 321W is configured from a resin material having a light passing property and a light diffusion effect. In the present example, taking it into consideration that a user who grips and uses the electronic pen 1 will watch the pen tip side, the window portion 321W is provided at a location proximate to the coupling portion of the first tubular body portion 321 to the core body portion 31. Further, the LED 342 is disposed such that it is positioned corresponding to the window portion 321W on the printed board 33 in the first tubular body portion 321.

It is to be noted that, although the first tubular body portion 321 in the example of FIG. 2B has the window portion 321W formed as a single rectangular window portion thereon, a plurality of rectangular window portions may be formed in ring arrangement along an outer periphery of the first tubular body portion 321, or such a plurality of rectangular window portions may be formed as a single ring-shaped window portion in which they are continued to each other. This similarly applies also to the window portion of any other example hereinafter described.

The core body portion 31 and the first tubular body portion 321 of the tubular body portion 32 are configured integrally in a state in which, for example, part of the ferrite core 310 of the core body portion 31 is inserted in and coupled to the first tubular body portion 321. In this case, upon coupling between the core body portion 31 and the first tubular body portion 321 of the tubular body portion 32, a winding starting end 311a and a winding ending end 311b of the coil 311 are electrically connected to one end and the other end of the capacitor 341, respectively, provided on the printed board 33 in the first tubular body portion 321 (refer to FIG. 2C).

The second tubular body portion 322 is configured, in the present example, from a tubular body of a diameter equal to the diameter R2 of the ink accommodation portion 62 of the replacement core 6 of the ballpoint pen on the market. In the example of FIG. 2B, the second tubular body portion 322 is configured from two divisional parts of a long portion 322a and a short portion 322b, and in the present example, a writing pressure detector 36 is provided in a coupling portion 35 between the long portion 322a and the short portion 322b.

In particular, as depicted in FIG. 2C, in the present example, the long portion 322a and the short portion 322b are coupled to each other at the coupling portion 35 through a connection bar member 351 and a coil spring 352. In this case, the long portion 322a and the short portion 322b are configured such that, although they are normally biased elastically by the coil spring 352 such that they are spaced away from each other in the axial direction thereof, they are locked at a predetermined position by the connection bar member 351 such that they are not displaced in the axial direction any more. Further, the electronic pen cartridge 3 is configured such that the overall length thereof in the locked state is equal to the overall length L2 of the replacement core 6 of the ballpoint pen described hereinabove.

Further, as depicted in FIG. 2C, in the present embodiment, the writing pressure detector 36 is provided on the long portion 322a. Further, the connection bar member 351 is configured such that one end 351a side thereof acts as a pressing portion for the writing pressure detector 36.

The writing pressure detector 36 of the present example can be configured as a variable capacitor whose capacitance varies in response to a writing pressure, which uses writing pressure detection means having a well-known configuration disclosed, for example, in Patent Document: Japanese Patent Laid-Open No. 2011-18090. It is to be noted that alto it is possible to otherwise configure the writing pressure detector 36 using such a semiconductor element that varies the capacitance in response to a writing pressure as disclosed, for example, Japanese Patent Laid-Open No. 2013-161307.

If pressure is applied to the core body portion 31 in the state in which the electronic pen cartridge 3 is accommodated in the housing 2, then the electronic pen cartridge 3 is acted upon by force tending to move the long portion 322a side thereof entirely toward the short portion 322b side against the elastic force of the coil spring 352, and the capacitance of the writing pressure detector 36 becomes that according to the writing pressure.

The electronic pen cartridge 3 having such a configuration as described above is accommodated into the housing 2 by fitting the short portion 322b of the tubular body portion 32 thereof into the fitting portion 43a of the rotatable element 43 of the knock cam mechanism 4. In this state, the electronic pen cartridge 3 is entirely accommodated in the housing 2 including the core body portion 31 thereby to protect the core body portion 31 of the electronic pen cartridge 3.

Then, in the electronic pen 1 of the present embodiment, when a user uses the electronic pen 1 together with a position detection apparatus, the user would depress the end portion 42a of the knock bar 42 to cause the tip end of the pen tip portion 313 of the core body portion 31 to project from the opening 2b of the housing 2 as depicted in FIG. 1B. Consequently, the protection of the core body portion 31 of the electronic pen cartridge 3 is cancelled. Then, after the use of the electronic pen 1 comes to an end, the user would depress the end portion 42a of the knock bar 42 again to cause the electronic pen cartridge 3 to be entirely accommodated into the hollow portion 2a of the housing 2 thereby to protect the core body portion 31.

[Circuit Configuration of Electronic Pen 1 and Circuit Configuration of Position Detection Apparatus Used Together with Electronic Pen 1]

FIG. 3 depicts an example of a circuit configuration of the electronic circuit 34 of the electronic pen 1 and an example of a circuit configuration of a position detection apparatus 200 that performs signal transfer through electromagnetic coupling to the electronic pen 1.

The electronic pen 1 in the present embodiment is configured such that it is coupled by electromagnetic induction coupling to a conductor of a sensor of the position detection apparatus 200 to receive a position detection signal and a light emission controlling signal from the sensor of the position detection apparatus 200 and transmit a signal, in which writing pressure information detected through the writing pressure detector 36 is reflected on the received position detection signal, to the sensor of the position detection apparatus 200 to feed back the signal.

In particular, in the electronic circuit 34 of the electronic pen cartridge 3, the capacitor 341 is connected in parallel to the coil 311, and a variable capacitor 36C configured from the writing pressure detector 36 is connected in parallel to the coil 311 to configure a resonance circuit 340R.

On the other hand, on the position detection apparatus 200, a sensor 210 in which an X-axis direction loop coil group 211X and a Y-axis direction loop coil group 212Y are layered as position detection coils is provided as depicted in FIG. 3. The loop coil groups 211X and 212Y of the sensor 210 are each configured, for example, from m rectangular loop coils. The loop coils configuring the loop coil groups 211X and 212Y are arranged such that they are lined up at equal intervals and are successively overlapped with each other.

Each of the loop coil groups 211X and 212Y of the sensor 210 can electromagnetically couple to the resonance circuit 340R of the electronic circuit 34 of the electronic pen cartridge 3 to perform transfer of a signal. In the present embodiment, the position detection apparatus 200 sends out a signal including a position detection signal and a light emission controlling signal for the LED 342 to the electronic pen 1 from the sensor 210. The signal send out from the sensor 210 is an AC signal of a predetermined frequency f0.

The resonance circuit 340R of the electronic pen 1 operates so as to receive an AC signal from the sensor 210 of the position detection apparatus 200 through electromagnetic coupling and feed back the received AC signal the sensor 210 of the position detection apparatus 200. However, since the resonance circuit 340R includes the variable capacitor 36C configured from the writing pressure detector 36, when a writing pressure is detected by the writing pressure detector 36, the resonance circuit 340R indicates a resonance frequency (phase) according to the variation of the capacitance of the variable capacitor 36C. Therefore, the signal fed back to the sensor 210 of the position detection apparatus 200 from the resonance circuit 340R includes information of the variation amount (phase variation amount) of the resonance frequency of the resonance circuit 340R. The position detection apparatus 200 detects information of the writing pressure detected by the writing pressure detector 36 by detecting the information of the variation amount of the resonance frequency (phase variation amount) included in the signal received from the resonance circuit 340R as hereinafter described.

Further, in the electronic circuit 34 of the electronic pen cartridge 3, a signal generation circuit 343 is connected to the resonance circuit 340R, and the LED 342 as an example of the light emitting element is connected to the signal generation circuit 343. In the signal generation circuit 343, the resonance circuit 340R accumulates power of a signal received from the sensor 210, and a light emission driving controlling signal (light emission driving controlling voltage ED) for controlling and driving the light emitting element to emit light is generated on the basis of the accumulated power.

As depicting in FIG. 3, in the present embodiment, the signal generation circuit 343 has a configuration of a half wave double voltage rectification circuit and includes capacitors 3431 and 3434 and diodes 3432 and 3433 for rectification. In particular, the coil 311 configuring the resonance circuit 340R is connected at one end thereof to the cathode of the diode 3432 through the capacitor 3431, and the diode 3432 is connected at the anode thereof to the other end of the coil 311. Further, the connection point between the capacitor 3431 and the cathode of the diode 3432 is connected to the anode of the diode 3433, and the diode 3433 is connected at the cathode thereof to the other end of the coil 311 through the capacitor 3434. Furthermore, the LED 342 is connected between one end and the other end of the capacitor 3434 of the signal generation circuit 343.

In the signal generation circuit 343 having such a configuration as described above, an AC signal from the sensor 210 received by the resonance circuit 340R is rectified by the diodes 3432 and 3433 and the capacitor 3434 is charged by the rectified current to accumulate the power of the AC signal from the sensor 210 into the capacitor 3434. Then, in the present embodiment, the voltage obtained across the capacitor 3434 is supplied as the light emission driving controlling voltage ED to the LED 342.

Accordingly, the LED 342 starts emission of light when the light emission driving controlling voltage ED that is the voltage across the capacitor 3434 becomes equal to or higher than the predetermined value. Then, if the value of the light emission driving controlling voltage ED increases from the predetermined value, then the LED 342 emits light with intensity according to the magnitude of the value of the light emission driving controlling voltage ED.

Now, a configuration of the position detection apparatus 200 side is described. As depicted in FIG. 3, the position detection apparatus 200 includes a selection circuit 213 to which the X-axis direction loop coil group 211X and the Y-axis direction loop coil group 212Y that configure the sensor 210 are connected. The selection circuit 213 successively selects one of the loop coils of one of the two loop coil groups 211X and 212Y.

Further, the position detection apparatus 200 includes an oscillator 221, a current driver 222, a switched connection circuit 223, a reception amplifier 224, a detector 225, a low-pass filter 226, a sample and hold circuit 227, an analog-to-digital (A/D) conversion circuit 228, a synchronous detector 229, another low-pass filter 230, another sample and hold circuit 231, another A/D conversion circuit 232, and a process control circuit 233. The process control circuit 233 is configured, for example, from a microcomputer or a microprocessor.

The oscillator 221 generates an AC signal of the frequency f0. The oscillator 221 supplies the generated AC signal to the current driver 222 and the synchronous detector 229. The current driver 222 converts the AC signal supplied thereto from the oscillator 221 into current and sends out the current to the switched connection circuit 223. The current driver 222 receives a control signal from the process control circuit 233 to control the gain thereof. Consequently, the amplitude of the AC signal to be outputted from the current driver 222 is controlled so as to have a magnitude according to the control signal from the process control circuit 233.

The switched connection circuit 223 switches the connection destination (transmission side terminal T or reception side terminal R) to which a loop coil selected by the selection circuit 213 is to be connected under the control of the process control circuit 233 hereinafter described. Of the connection destinations, to the transmission side terminal T, the current driver 222 is connected, and to the reception side terminal R, the reception amplifier 224 is connected.

When the switched connection circuit 223 is connected to the transmission side terminal T, an AC signal from the oscillator 221 flows through the current driver 222 to the loop coil selected by the selection circuit 213 to generate an electromagnetic field from the sensor 210. Where the electronic pen 1 exists in the proximity of the sensor 210, induced current is generated in the resonance circuit 340R by the electromagnetic field, and the resonance circuit 340R receives the AC signal of the frequency f0 from the sensor 210.

Then, if the switched connection circuit 223 is switched from the transmission side terminal T to the reception side terminal R, then the resonance circuit 340R of the electronic pen 1 operates so as to feed back the AC signal received from the sensor 210 to the sensor 210. At this time, as described hereinabove, the resonance frequency of the resonance circuit 340R has a value having a variation corresponding to the capacitance of the variable capacitor 36C configured from the writing pressure detector 36 from the frequency f0.

In the sensor 210, an induced voltage according to the fed back signal is generated in a loop coil in the proximity of the electronic pen 1. The induced voltage generated in the loop coil can be detected by the position detection apparatus 200 when the selection circuit 213 is in a state in which it selects the loop coil. Then, the induced voltage generated in the loop coil selected by the selection circuit 213 is sent to the reception amplifier 224 through the selection circuit 213 and the reception side terminal R of the switched connection circuit 223. The reception amplifier 224 amplifies the induced voltage supplied from the loop coil and sends out the amplified induced voltage to the detector 225 and the synchronous detector 229.

The detector 225 detects the induced voltage generated in the loop coil, namely, the reception signal, and sends out the detected reception signal to the low-pass filter 226. The low-pass filter 226 has a cutoff frequency sufficiently lower than the frequency f0 described hereinabove, and converts the output signal of the detector 225 into a direct-current (DC) signal and sends out the DC signal to the sample and hold circuit 227. The sample and hold circuit 227 holds a voltage value of an output signal of the low-pass filter 226 at a predetermined timing, in particular, at a predetermined timing within the reception period, and sends out the held voltage value to the A/D conversion circuit 228. The A/D conversion circuit 228 converts an analog output of the sample and hold circuit 227 into a digital signal and outputs the digital signal to the process control circuit 233.

On the other hand, the synchronous detector 229 synchronously detects the output signal of the reception amplifier 224 with the AC signal from the oscillator 221 and sends out a signal of a level according to a phase difference between the signals to the low-pass filter 230. The low-pass filter 230 has a cutoff frequency sufficiently lower than the frequency f0, and converts the output signal of the synchronous detector 229 into a DC signal and sends out the DC signal to the sample and hold circuit 231. The sample and hold circuit 231 holds a voltage value of the output signal of the low-pass filter 230 at a predetermined timing and sends out the held voltage value to the A/D conversion circuit 232. The A/D conversion circuit 232 converts the analog output of the sample and hold circuit 231 into a digital signal and outputs the digital signal to the process control circuit 233.

The process control circuit 233 controls the components of the position detection apparatus 200. In particular, the process control circuit 233 controls selection of a loop coil by the selection circuit 213, switching of the switched connection circuit 223 and timings of the sample and hold circuits 227 and 231. The process control circuit 233 causes a radio wave to be transmitted with a fixed transmission duration from the X-axis direction loop coil group 211X and the Y-axis direction loop coil group 212Y on the basis of input signals from the A/D conversion circuits 228 and 232.

In each loop coil of the X-axis direction loop coil group 211X and the Y-axis direction loop coil group 212Y, an induced voltage is generated from a radio wave transmitted from the electronic pen 1 as described hereinabove. The process control circuit 233 calculates coordinate values of an indication position in the X-axis direction and the Y-axis direction by the electronic pen 1 on the basis of the level of the voltage value of the induced voltage generated in each loop coil. Further, the process control circuit 233 detects a writing pressure applied to the core body of the electronic pen 1 on the basis of the level of a signal according to a phase difference between the transmitted radio wave and the received radio wave.

In this manner, in the position detection apparatus 200, the position of the electronic pen 1 approaching the same can be detected by the process control circuit 233. Besides, by detecting the phase of the received signal, information of the writing pressure of the electronic pen 1 can be obtained.

[Example of Operation Sequence of Position Detection Apparatus 200 and Electronic Pen 1]

In the following, detection operation by the position detection apparatus 200 of an indication position by the electronic pen 1 light emission controlling operation of the LED 342 of the electronic pen 1 according to a light emission controlling signal from the position detection apparatus 200 are described.

Figure 4:
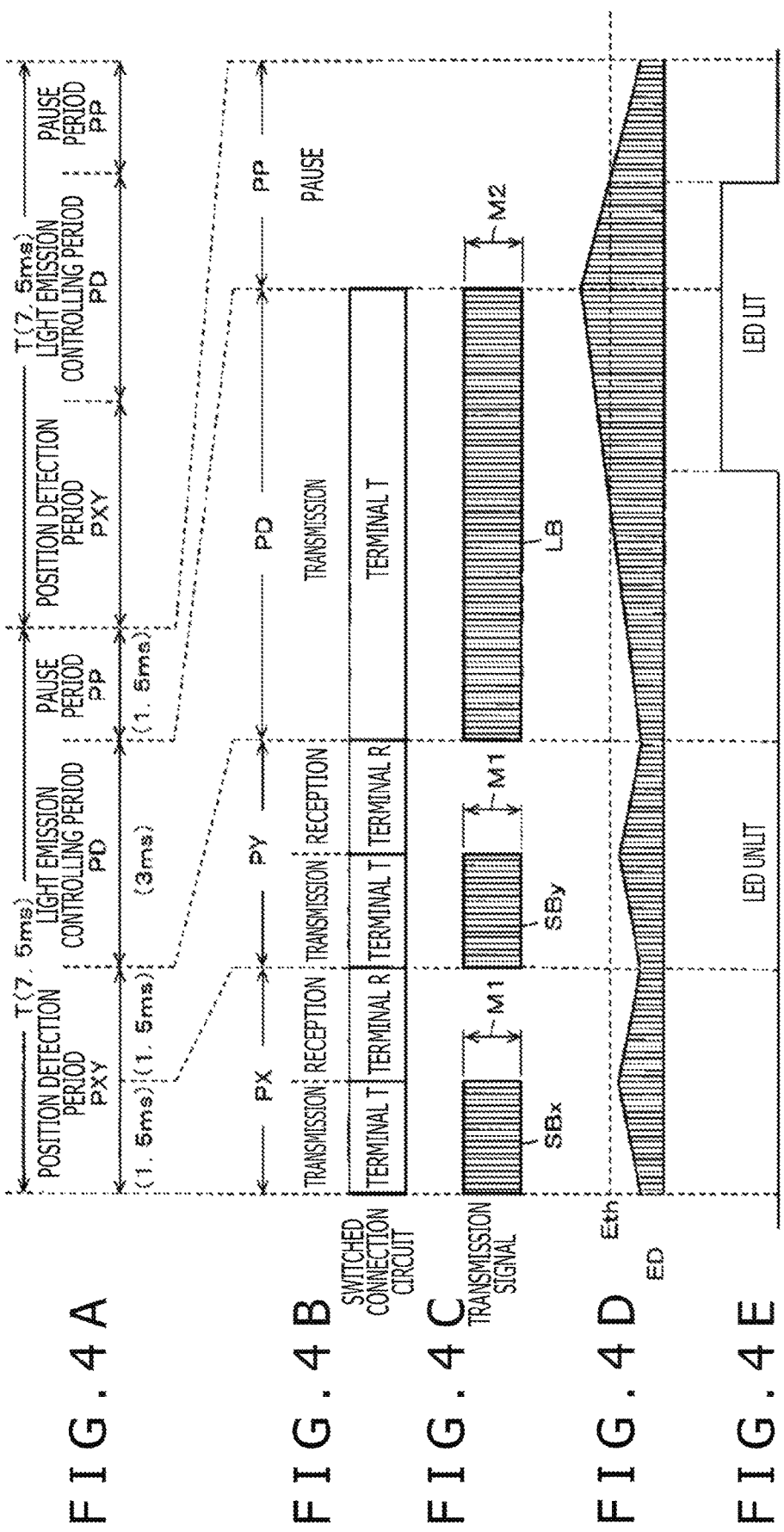
FIGS. 4A, 4B, 4C, 4D, and 4E are views depicting a timing chart illustrating operation of part of the first embodiment of the position indicator according to the present disclosure.

FIGS. 4A, 4B, 4C, 4D, and 4E depict a timing chart for illustrating an example of an operation sequence of the position detection apparatus 200 and the electronic pen 1. In the present embodiment, the process control circuit 233 of the position detection apparatus 200 performs processing control such that position detection operation and light emission controlling processing operation of the LED 342 of the electronic pen 1 are repeated in a cycle T as depicted in FIG. 4A.

One cycle T is configured from a position detection period PXY, a light emission controlling period PD and a pause period PP, and they are set, for example, to the cycle T=7.5 milliseconds, position detection period PXY=3 milliseconds, light emission controlling period PD=3 milliseconds, and pause period PP=1.5 milliseconds. The position detection period PXY is divided into two portions including a former half of an X-coordinate position detection period PX of 1.5 milliseconds and a latter half of a Y-coordinate position detection period PY of 1.5 milliseconds.

Further, in the position detection apparatus 200, within the former half period of the X-coordinate position detection period PX, the process control circuit 233 controls the switched connection circuit 223 to be switched to the transmission side terminal T side as depicted in FIG. 4B and controls the selection circuit 213 to successively select the loop coils of the X-axis direction loop coil group 211X.

Accordingly, in the position detection apparatus 200, an AC signal having the frequency f0 from the oscillator 221 and having a predetermined amplitude M1 through the current driver 222 is supplied as a position detection signal SBx for X-coordinate detection to the sensor 210 during signal duration that extends over the overall former half period of the X-coordinate position detection period PX as depicted in FIG. 4C. At this time, since, in the sensor 210, the loop coils of the X-axis direction loop coil group 211X are controlled so as to be successively selected by the selection circuit 213 under the control of the process control circuit 233, the position detection signal SBx is successively supplied to the loop coils of the X-axis direction loop coil group 211X. As a signal from the sensor 210 to the electronic pen 1, the position detection signal SBx is such a burst signal as depicted in FIG. 4C.

If the latter half period of the X-coordinate position detection period PX is entered, then the switched connection circuit 223 is switched to the reception side terminal R as depicted in FIG. 4B by the process control circuit 233, and the selection circuit 213 is controlled so as to successively select the loop coils of the X-axis direction loop coil group 211X. At this time, the loop coils of the X-axis direction loop coil group 211X of the sensor 210 of the position detection apparatus 200 are placed into a state in which they can receive a feedback signal from the resonance circuit 340R of the electronic pen 1 by which the position detection signal SBx is received. Then, since the selection circuit 213 is selectively controlled by the process control circuit 233, a voltage induced in each loop coil of the X-axis direction loop coil group 211X is supplied to the reception amplifier 224 through the switched connection circuit 223.

The signal supplied to the reception amplifier 224 is processed in such a manner as described above, and the process control circuit 233 detects the level of the induced voltage of each loop coil of the X-axis direction loop coil group 211X. In this case, when the electronic pen 1 does not exist close to the sensor 210, then the process control circuit 233 does not detect an induced voltage equal to or higher than the predetermined level from any of the loop coils of the X-axis direction loop coil group 211X.

Then, if the electronic pen 1 is brought close to the sensor 210, then the level of the feedback signal induced in a loop coil in the proximity of the electronic pen 1 becomes equal to or higher than the predetermined value. The process control circuit 233 of the position detection apparatus 200 checks, within the reception period of the X-coordinate position detection period PX, the induced voltage of each loop coil of the X-axis direction loop coil group 211X to supervise whether or not a loop coil whose level is equal to or higher than the predetermined level is detected. Then, if the process control circuit 233 detects a loop coil whose level is equal to or higher than the predetermined value, then it decides that the electronic pen 1 is brought close to the sensor 210 of the position detection apparatus 200 and the resonance circuit 340R of the electronic pen 1 and the position detection apparatus 200 are in an electromagnetically coupled state. This state is a state in which the electronic pen 1 can issue a position instruction to the sensor 210 of the position detection apparatus 200.

Then, when the resonance circuit 340R of the electronic pen 1 and the position detection apparatus 200 are in an electromagnetically coupled state, the process control circuit 233 detects the X coordinate position of the electronic pen 1 on the sensor 210 on the basis of the induced voltage of each loop coil of the X-axis direction loop coil group 211X and detects a writing pressure applied to the electronic pen 1 from a frequency displacement (phase displacement) of the detected induced voltage.

Then, in the Y-coordinate position detection period PY, the switched connection circuit 223 is switched to the transmission side terminal T within the former half period of the Y-coordinate position detection period PY and is switched to the reception side terminal R within the latter half period of the Y-coordinate position detection period PY as depicted in FIG. 4B by the process control circuit 233 similarly. Further, by the process control circuit 233, the selection circuit 213 is controlled to successively select the loop coils in the Y-axis direction loop coil group 212Y within each of the former half period and the latter half period of the Y-coordinate position detection period PY.

Then, in the position detection apparatus 200, also within the Y-coordinate position detection period PY, an AC signal that has the frequency f0 and has the predetermined amplitude M1 through a current driver from the oscillator 221 is successively supplied as a position detection signal SBy for Y-coordinate detection to the loop coils of the Y-axis direction loop coil group 212Y of the sensor 210 within the former half period as depicted in FIG. 4C similarly as in the X-coordinate position detection period PX. As a signal from the sensor 210 to the electronic pen 1, the position detection signal SBy is such a burst signal as depicted in FIG. 4C.

If the latter half period of the Y-coordinate position detection period PY is entered, then the loop coils of the Y-axis direction loop coil group 212Y of the sensor 210 of the position detection apparatus 200 are placed into a state in which they can receive a feedback signal from the resonance circuit 340R of the electronic pen 1 by which the position detection signal SBy is received. Then, the selection circuit 213 is selectively controlled by the process control circuit 233 such that a voltage induced in each loop coil of the Y-axis direction loop coil group 212Y is supplied to the reception amplifier 224 through the switched connection circuit 223.

Then, the process control circuit 233 supervises, similarly as within the latter half period of the X-coordinate position detection period PX, the level of the induced voltage of each loop coil of the Y-axis direction loop coil group 212Y to decide that the resonance circuit 340R of the electronic pen 1 and the position detection apparatus 200 are in a state in which they are electromagnetically coupled. Then, if it is decided that the resonance circuit 340R of the electronic pen 1 and the position detection apparatus 200 are in an electromagnetically coupled state, the process control circuit 233 detects the Y-coordinate position of the electronic pen 1 on the sensor 210 on the basis of the induced voltage of each loop coil of the Y-axis direction loop coil group 212Y and detects a writing pressure applied to the electronic pen 1 from a frequency displacement (phase displacement) of the detected induced voltage.

Then, within the light emission controlling period PD following the position detection period PXY, the switched connection circuit 223 is switched to the transmission side terminal T side as depicted in FIG. 4B by the process control circuit 233 and the selection circuit 213 is controlled by the process control circuit 233 so as to successively select the loop coils of the X-axis direction loop coil group 211X.

Accordingly, in the position detection apparatus 200, an AC signal from the oscillator 221, which has the frequency f0 and has a predetermined amplitude M2 according to control of the process control circuit 233 through the current driver 222, is supplied as a light emission controlling signal LB to the sensor 210 within a signal duration extending over the overall light emission controlling period as depicted in FIG. 4C. At this time, in the sensor 210, the loop coils of the X-axis direction loop coil group 211X and/or the Y-axis direction loop coil group 212Y are successively selected and controlled by the selection circuit 213 under the control of the process control circuit 233. Accordingly, although the light emission controlling signal LB is successively supplied to the loop coils of the X-axis direction loop coil group 211X and/or the Y-axis direction loop coil group 212Y, as a signal from the sensor 210 to the electronic pen 1, this light emission controlling signal LB is such a burst signal as depicted in FIG. 4C.

Within the pause period PP following the light emission controlling period PD, the switched connection circuit 223 is placed into a state in which it is not connected to any of the terminal T and the r terminal R. Alternatively, the switched connection circuit 223 may be kept connected to the terminal R side. However, where the switched connection circuit 223 is kept connected to the terminal R side, the process control circuit 233 does not perform any operation for reception. Consequently, the position detection apparatus 200 is placed in the pause period PP in regard to processing for transmission and reception.

In the example of FIGS. 4A, 4B, 4C, 4D, and 4E, the amplitude M1 of the position detection signal SB and the amplitude M2 of the light emission controlling signal LB are equal to each other. However, the position detection signal SB and the light emission controlling signal LB are different from each other in that, while the signal duration of the burst signal of the position detection signal SB is 0.75 milliseconds, that of the light emission controlling signal LB is 3 milliseconds and is longer than that of the position detection signal SB.

Since the signal duration of the light emission controlling signal LB is longer than that of the position detection signal SB, in the present embodiment, if the electronic pen 1 is brought close to the sensor 210 of the position detection apparatus 200, then the LED 342 as a light emitting element of the electronic pen 1 is driven to emit light by the light emission controlling signal LB from the sensor 210 of the position detection apparatus 200.

In particular, in the electronic circuit 34 of the electronic pen 1, the resonance circuit 340R receives a signal from the sensor 210 of the position detection apparatus 200 through electromagnetic coupling and feeds back the received signal to the sensor 210 as depicted in FIG. 3.

At this time, an AC signal from the sensor 210 received by the resonance circuit 340R is accumulated into the capacitor 3434 through the diodes 3432 and 3433 for rectification of the signal generation circuit 343. The light emission driving controlling voltage ED that is a voltage across the capacitor 3434 rises through the accumulation operation (charging operation) while the burst signal as the light emission controlling signal LB exists, but decreases through a discharging operation after the burst signal disappears as depicted in FIG. 4D.

Therefore, depending upon the position detection signal SB whose signal duration is shorter, the light emission driving controlling voltage ED obtained across the capacitor 3434 does not exceed a threshold value Eth for the driving voltage for causing the LED 342 to emit light. On the other hand, if the electronic pen 1 receives the light emission controlling signal LB having a longer signal duration than that of the position detection signal SB, then the light emission driving controlling voltage ED that is a voltage across the capacitor 3434 exceeds the threshold value Eth for the driving voltage for causing the LED 342 to emit light as depicted in FIG. 4D. Consequently, the LED 342 is placed into a state in which it is driven to emit light (LED lit state) (refer to FIG. 4E).

Accordingly, when the electronic pen 1 comes to be positioned close to the sensor 210 of the position detection apparatus 200, then the light emission driving controlling voltage ED that is a voltage across the capacitor 3434 exceeds, after every cycle T, the threshold value Eth for the driving voltage for causing the LED 342 to emit light as depicted in FIG. 4D, and the LED 342 is placed into a lit state after every cycle T. Since the cycle T is 7.5 milliseconds, it seems to the human eyes that the LED 342 is in a lit state.

In this manner, in the embodiment described above, if the electronic pen 1 is brought close to the sensor 210 of the position detection apparatus 200, then the LED 342 as a light emitting element on the electronic pen 1 is turned on and emits light. Consequently, the user can know that the electronic pen 1 is electromagnetically coupled to the sensor 210 of the position detection apparatus 200 and therefore is in a state in which it can indicate a position.

Then, since the magnitude of electric energy of a signal from the sensor 210 received by the resonance circuit 340R has a value according to the distance between the electronic pen 1 and the sensor 210, the light emission intensity of the LED 342 of the electronic pen 1 has a value according to the distance between the electronic pen 1 and the sensor 210.

Accordingly, if the electronic pen 1 is brought close to the sensor 210, then the LED 342 provided on the electronic pen cartridge 3 of the electronic pen 1 emits light even in a state in which the electronic pen cartridge 3 is fully accommodated in the housing 2 and the core body portion 31 does not project from the opening 2b of the housing 2 by an action of the knock cam mechanism 4. Then, in a state in which the core body portion 31 of the electronic pen cartridge 3 projects from the opening 2b of the housing 2 by an action of the knock cam mechanism 4, the LED 342 is placed into a state in which it emits light with a maximum light emission intensity.

In this case, the electronic pen 1 need not have a power supply such as a battery for obtaining a driving voltage for causing the LED 342 to emit light, but may merely have a configuration that includes the signal generation circuit 343 for accumulating power of a signal received from the sensor 210 by the resonance circuit 340R to generate a light emission driving controlling signal capable of driving the LED 342 to emit light. Accordingly, the electronic pen is advantageous in that it has a much simplified configuration and that a battery such as a cell is not required and there is no necessity to worry about securing of a power supply voltage by checking the battery such as a cell.

Further, in the electronic pen 1 as a position indicator according to the embodiment described above, a control circuit is not required which analyzes a control instruction signal from the position detection apparatus 200 and generates a light emission driving controlling signal in response to a result of the analysis. Therefore, also a circuit for acquiring or generating a power supply voltage for the control circuit is not required. Furthermore, in the electronic pen 1, since the light emitting element is controlled for light emission driving directly by a light emission driving controlling signal generated by the signal generation circuit, it is not necessary to provide a circuit for driving the light emitting element to emit light and provide such a configuration as to control the light emission driving circuit and also a circuit for acquiring or generating a power supply voltage for the light emission driving circuit and the control circuit is not required. Accordingly, the electronic circuit of the electronic pen 1 is advantageous in that it can be formed in a very simple configuration.

Modifications to First Embodiment

<Different Example of Light Emission Controlling Signal in Light Emission Controlling Period PD>

FIRST EXAMPLE

Although, in the example described above, the amplitude M2 of the light emission controlling signal LB is selected to M2=M1 equal to the amplitude M1 of the position detection signals SBx and SBy, it may be set otherwise to M2>M1 by the process control circuit 233 controlling the gain of the current driver 222. On the other hand, where the signal duration is longer than that of the position detection signals SBx and SBy as in the example described above, if the amplitude M2 can exceed the threshold value Eth described above, it may be set to M2<M1 by the process control circuit 233 controlling the gain of the current driver 222. In particular, in the position detection apparatus 200, the process control circuit 233 controls the values of the amplitude of an AC signal from the oscillator 221 and the signal duration of the transmission signal (burst signal) from the sensor 210 such that the electronic pen 1 can generate a light emission driving controlling voltage ED that exceeds the threshold value Eth for the driving voltage for causing the LED 342 to emit light.

SECOND EXAMPLE

Further, in the example described above, the signal duration of the light emission controlling signal LB in the form of a burst signal from the sensor 210 of the position detection apparatus 200 is set so as to be longer than the signal duration of the position detection signal SB and also the amplitudes M1 and M2 of the burst signal are taken into consideration. However, in order to make it possible for the signal generation circuit 343 of the electronic pen 1 to generate a light emission driving controlling voltage ED from a burst signal as the light emission controlling signal LB, not only the signal duration or the amplitude of a burst signal as the light emission controlling signal LB but also the repeat cycle of the burst signal as the light emission controlling signal LB may be different from those of the position detection signal SB.

An example depicted in FIGS. 5A, 5B, 5C, 5D, and 5E are views depicting a timing chart where a signal to be transmitted from the sensor 210 of the position detection apparatus 200 within the light emission controlling period PD is a light emission controlling signal LBa in which the repeat cycle of the burst signal formed from an AC signal of the frequency f0 is made different from that of the position detection signal SB.

Figure 5:
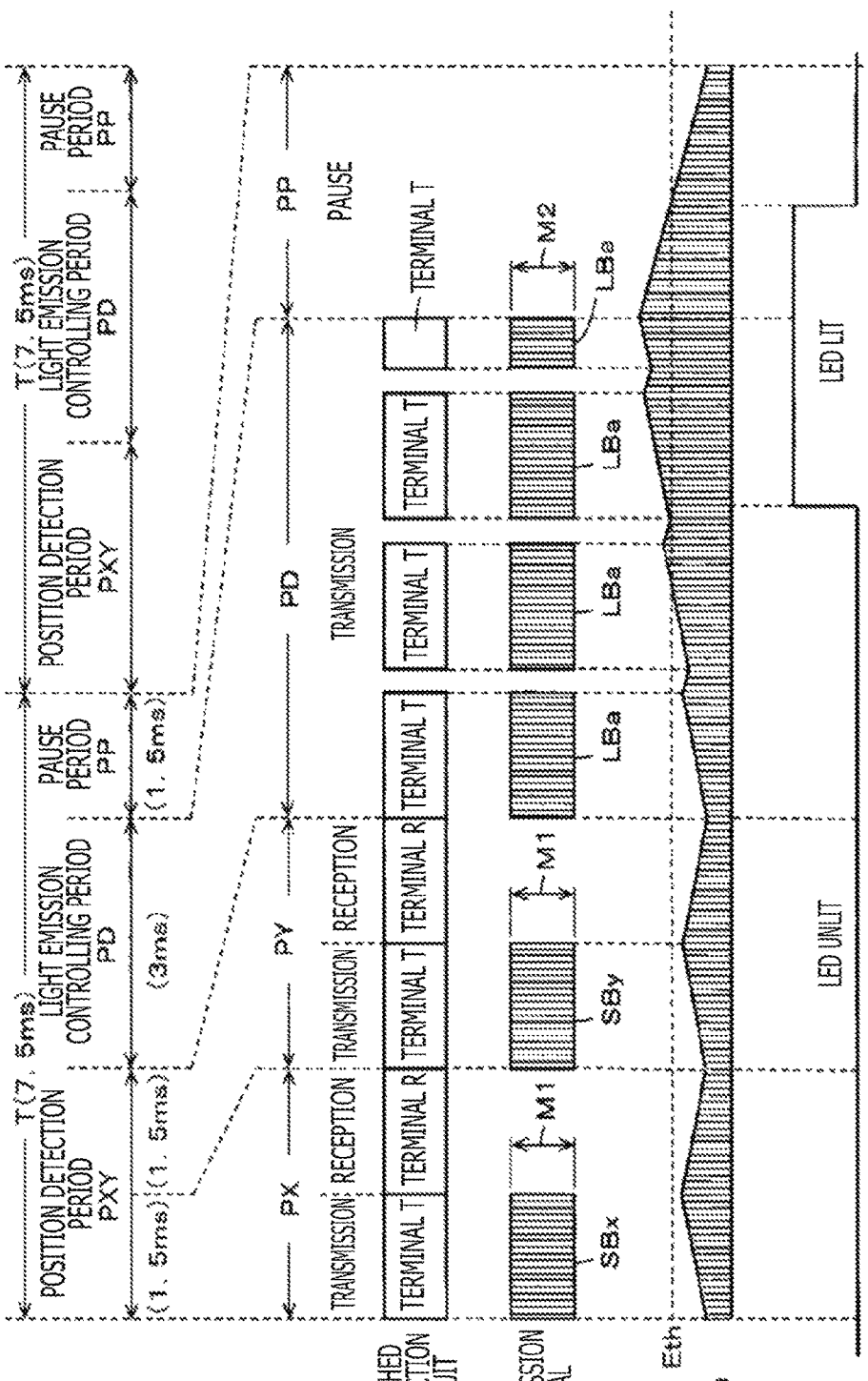
FIGS. 5A, 5B, 5C, 5D, and 5E are views depicting a timing chart illustrating operation of part of a modification to the first embodiment of the position indicator according to the present disclosure.

Also in the example of FIGS. 5A, 5B, 5C, 5D, and 5E, the position detection apparatus 200 repeats a position detection period PXY, a light emission controlling period PD and a pause period PP in a cycle T of, for example, 7.5 milliseconds as depicted in FIG. 5A. Accordingly, in the example of FIGS. 5A, 5B, 5C, 5D, and 5E, operation within the position detection period PXY is similar to that in the case of the example of FIGS. 4A, 4B, 4C, 4D, and 4E as depicted in FIGS. 5B to 5D.

Further, within the light emission controlling period PD of the example of FIGS. 5A, 5B, 5C, 5D, and 5E, the switched connection circuit 223 is not connected to the terminal T side over the overall light emission controlling period PD but is connected to the terminal T side only within periods of 1.5 milliseconds equal to the transmission period within the position detection period PXY as depicted in FIG. 5B, and besides the repeat cycle of a period within which the switched connection circuit 223 is connected to the terminal T side is set shorter than the repeat cycle (1.5 milliseconds) of the position detection period PXY.

In particular, in this example, although the signal duration of the burst signal configuring the light emission controlling signal LBa is same as that of the position detection signals SBx and SBy, the repeat cycle of the light emission controlling signal LBa is shorter than the repeat cycle of the position detection signal SBx and the position detection signal SBy. It is to be noted that, since the light emission controlling period PD is 3 milliseconds, in the present example, the signal duration of the last light emission controlling signal LBa of the light emission controlling period PD is equal to or shorter than 1.5 milliseconds as depicted in FIGS. 5B and 5C.

Here, within the light emission controlling period PD, when the switched connection circuit 223 is not connected to the terminal T side, it may be kept connected to the terminal R side or may be placed in a state in which it is not connected to any of the terminal T and the terminal R. It is to be noted that, also where the switched connection circuit 223 is kept connected to the terminal R side, the process control circuit 233 does not perform operation for reception within the light emission controlling period PD.

In the position detection apparatus 200, if the switched connection circuit 223 is switching controlled within the light emission controlling period PD as in the example of FIGS. 5A, 5B, 5C, 5D, and 5E, then within the light emission controlling period PD, a burst signal of signal duration of 1.5 milliseconds is sent out as a light emission controlling signal LBa from the sensor 210 repetitively in a shorter period of time than the repeat cycle (1.5 milliseconds) of the position detection period PXY as depicted in FIG. 5D.

As described above, in the example of FIGS. 5A, 5B, 5C, 5D, and 5E, by setting the repeat cycle of the burst signal shorter than that within the position detection period PXY, the signal generation circuit 343 of the electronic circuit of the electronic pen cartridge generates a light emission driving controlling signal capable of causing the threshold value Eth to be exceeded within the light emission controlling period PD to place the LED 342 into a light emitting lit state as depicted in FIGS. 5D and 5E.

It is to be noted that, while, in the case of the example of FIGS. 5A, 5B, 5C, 5D, and 5E, the duration at the terminal T side of the light emission controlling period PD is set to 1.5 milliseconds equal to that of the position detection period, they need not necessarily be equal to each other. Also the amplitude of the burst signal as the light emission controlling signal LBa within the light emission controlling period PD need not be equal to the amplitude M1 within the position detection period. The point is that only it is necessary for the electronic pen 1 to be able to generate a light emission driving controlling signal, which is capable of causing the threshold value Eth to be exceeded to place the LED 342 into a light emission lit state, from the light emission controlling signal LBa within the light emission controlling period PD.

THIRD EXAMPLE

In the example described above, the position detection apparatus 200 is configured such that it sends out a position detection signal and a light emission controlling signal as time division signals from the sensor 210 within the position detection period PXY and the light emission controlling period PD that are separate from each other. However, the position detection signal and the light emission controlling signal to be sent out from the sensor 210 of the position detection apparatus 200 may not be formed as separate signals from each other but may be formed as a single signal.

Figure 6:
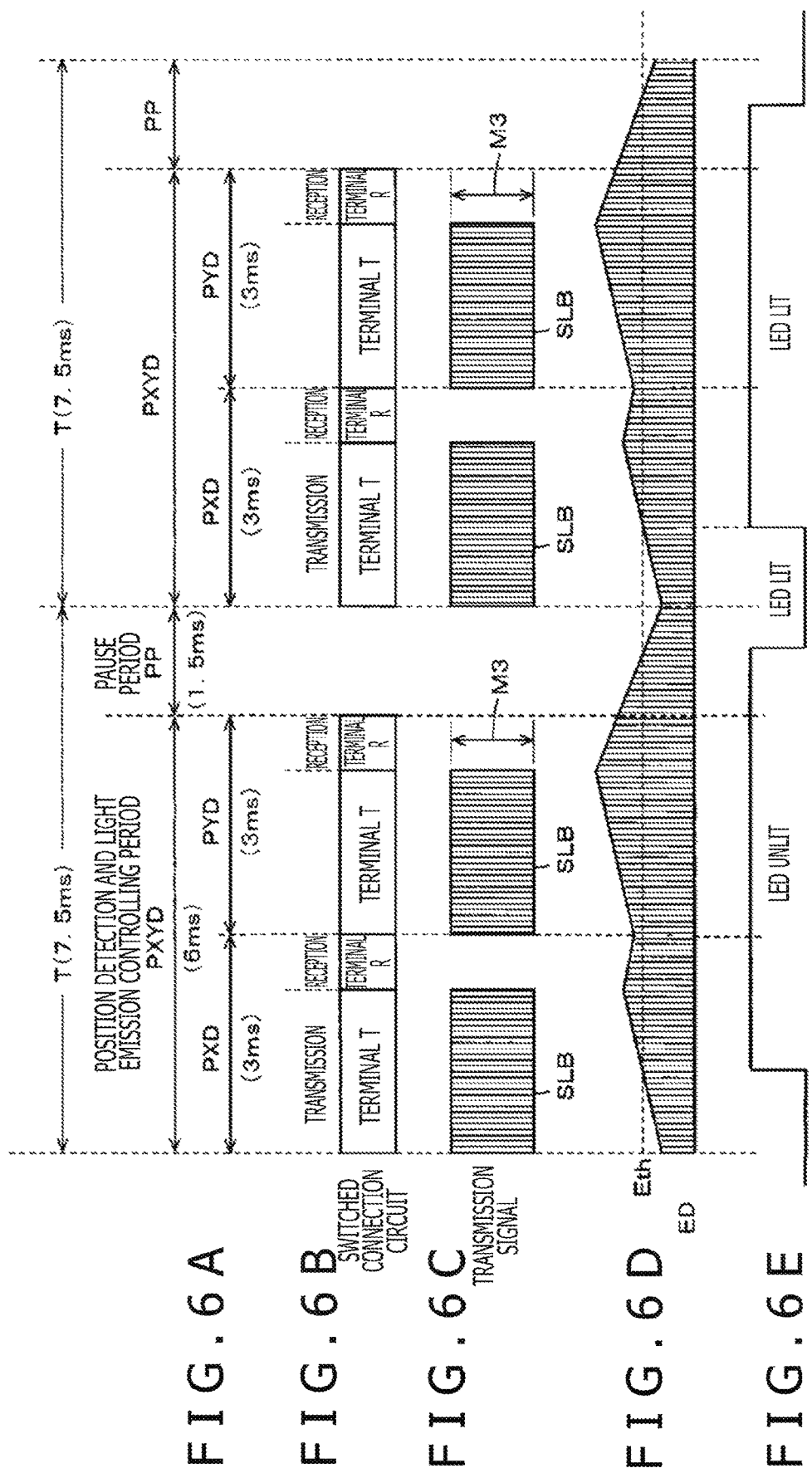
FIGS. 6A, 6B, 6C, 6D, and 6E are views depicting a timing chart illustrating operation of part of another modification to the first embodiment of the position indicator according to the present disclosure.

FIGS. 6A, 6B, 6C, 6D, and 6E depict a timing chart illustrating an example of an operation sequence of the position detection apparatus 200 and the electronic pen 1 in the case of the third example. In this example, the process control circuit 233 of the position detection apparatus 200 performs processing control such that a position detection operation and a light emission controlling processing operation of the LED 342 of the electronic pen 1 are repeated in a cycle T of, for example, 7.5 milliseconds as depicted in FIG. 6A similarly as in the example described above. However, different from the example described above, an independent light emission controlling period PD does not exist.

In particular, as depicted in FIG. 6A, in this third example, it is assumed that one cycle of processing for position detection and light emission control of the position detection apparatus 200 is configured from a position detection and light emission controlling period PXYD and a pause period PP. Further, the position detection and light emission controlling period PXYD is configured from an X-coordinate position detection and light emission controlling period PXD of the former half and a Y-coordinate position detection and light emission controlling period PYD of the latter half.

For example, it is assumed that, where one cycle is 7.5 milliseconds similarly as in the example described above, one cycle T is configured from a position detection and light emission controlling period PXYD of 6 milliseconds and a pause period PP of 1.5 milliseconds as depicted in FIG. 6A. Further, 3 milliseconds of the former half of the position detection and light emission controlling period PXYD are set as X-coordinate position detection and light emission controlling period PXD, and 3 milliseconds of the latter half are set as Y-coordinate position detection and light emission controlling period PYD.

Further, within each of the X-coordinate position detection and light emission controlling period PXD and the Y-coordinate position detection and light emission controlling period PYD, the switched connection circuit 223 is switched to the transmission side terminal T within a period of 2.25 milliseconds from the start point of 3 milliseconds and switched to the reception side terminal R within the remaining period of 0.75 milliseconds, as depicted in FIG. 6B, by the process control circuit 233.

Further, within the X-coordinate position detection and light emission controlling period PXD, the selection circuit 213 is controlled by the process control circuit 233 such that it successively selects the loop coils of the X-axis direction loop coil group 211X within each of a period within which the switched connection circuit 223 is switched to the transmission side terminal T and another period within which the switched connection circuit 223 is switched to the reception side terminal R. On the other hand, within the Y-coordinate position detection and light emission controlling period PYD, the selection circuit 213 is controlled by the process control circuit 233 similarly such that it successively selects the loop coils of the Y-axis direction loop coil group 212Y within each of a period within which the switched connection circuit 223 is switched to the transmission side terminal T and another period within which the switched connection circuit 223 is switched to the reception side terminal R.

It is to be noted that, in the position detection apparatus, the pause period PP is a period within which both the transmission operation and the reception operation are paused similarly as in the example described hereinabove.

In the position detection apparatus 200, within a period within which the switched connection circuit 223 is switched to the transmission side terminal T within both the X-coordinate position detection and light emission controlling period PXD and the Y-coordinate position detection and light emission controlling period PYD, as depicted in FIG. 6C, an AC signal from the oscillator 221 having the frequency f0 and having an amplitude M3 through control of the current driver by the process control circuit 233 is supplied as a position detection and light emission controlling signal SLB to the sensor 210 within a signal duration extending over 2.25 milliseconds within the X-coordinate position detection and light emission controlling period PXD and the Y coordinate position detection and light emission controlling period PYD. At this time, the position detection and light emission controlling signal SLB from the sensor 210 to the electronic pen 1 is a burst signal as depicted in FIG. 6C.

Then, the position detection apparatus 200 detects a voltage induced in each of the loop coils of the X-axis direction loop coil group 211X within a reception period within which the switched connection circuit 223 is switched to the terminal R within the X-coordinate position detection and light emission controlling period PXD to detect the indication position of the electronic pen 1 and performs a detection process of a writing pressure applied to the electronic pen 1 similarly as in the example described hereinabove. Further, within a reception period within which the switched connection circuit 223 is switched to the terminal R within the Y-coordinate position detection and light emission controlling period PYD, the position detection apparatus 200 detects the voltage induced in each of the loop coils of the Y-axis direction loop coil group 212Y to detect the indication position of the electronic pen 1 and performs a detection process of a writing pressure applied to the electronic pen 1.

On the other hand, the resonance circuit 340R of the electronic pen cartridge of the electronic pen 1 receives the position detection and light emission controlling signal SLB from the sensor 210 of the position detection apparatus 200 and feeds back the position detection and light emission controlling signal SLB to the sensor 210. Further, in the electronic circuit 34 of the electronic pen cartridge of the electronic pen 1, the position detection and light emission controlling signal SLB received by the resonance circuit 340R is rectified by the diodes 3432 and 3433 for rectification of the signal generation circuit 343, and the capacitor 3434 is charged with the rectification current to accumulate the power of the burst signal SLB into the capacitor 3434 (refer to FIG. 6D).

The light emission driving controlling voltage ED as the voltage across the capacitor 3434 rises by the accumulation operation (charging operation) while the position detection and light emission controlling signal SLB continues to exist as depicted in FIG. 6D, but drops by a discharging operation after the position detection and light emission controlling signal SLB disappears.

Then, in the example of FIGS. 6A, 6B, 6C, 6D, and 6E, the light emission driving controlling voltage ED as the voltage across the capacitor 3434 exceeds the threshold value Eth for the driving voltage for causing the LED 342 to emit light as depicted in FIG. 6D within each of the position detection and light emission controlling periods PXYD. Accordingly, also in the present example, if the electronic pen 1 comes close to the sensor 210 of the position detection apparatus 200, then the signal generation circuit 343 can generate a light emission driving controlling voltage ED for driving the LED 342 to emit light as depicted in FIG. 6E.

It is to be noted that the position detection and light emission controlling signal SLB of the example of FIGS. 6A, 6B, 6C, 6D, and 6E is one example and can control the lighting period of the LED 342 by changing one, two or more of the amplitude, signal duration and repeat cycle. Further, the lengths of the one cycle T, position detection and light emission controlling period PXYD and pause periods PP of the example of FIGS. 6A, 6B, 6C, 6D, and 6E are an example and can be set to various values.

<Different Example of Signal Generation Circuit of Electronic Circuit of Electronic Pen Cartridge 3>

While the signal generation circuit 343 of the electronic circuit 34 of the electronic pen cartridge of the embodiment described above uses a half wave double voltage rectification circuit, the signal generation circuit 343 is not limited to this and can be formed using various other rectification circuits.

Figure 7:
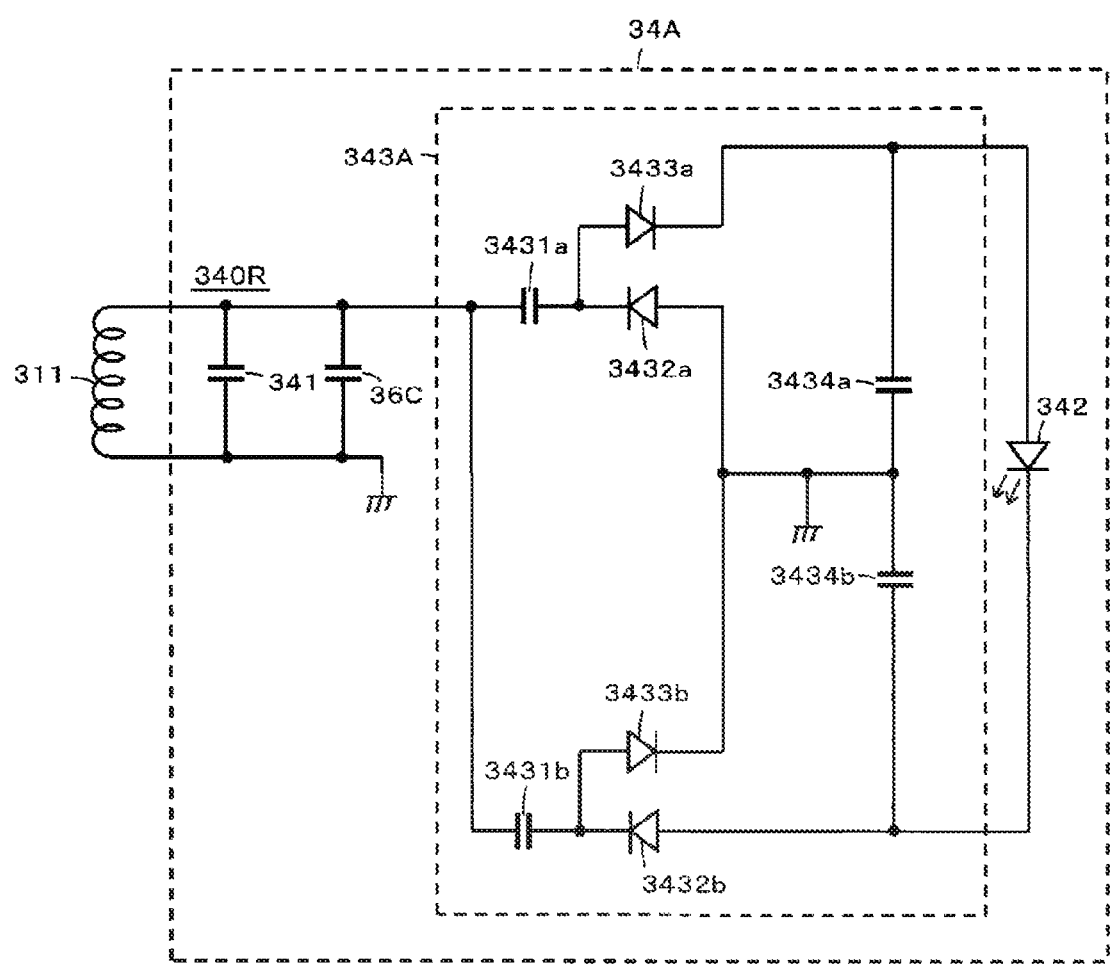
FIG. 7 is a circuit diagram of another example of a configuration of the electronic circuit of the first embodiment of the position indicator according to the present disclosure.

FIG. 7 depicts an example of an electronic circuit 34A including a signal generation circuit 343A in which two sets of half wave rectification circuits of the example described above are connected in series so as to have a configuration of a full-wave voltage double rectification circuit. In FIG. 7, like portions to those of the electronic circuit 34 depicted hereinabove with reference to FIG. 3 are denoted by like reference characters.

In the electronic circuit 34A of the example of FIG. 7, similarly to the example of FIG. 3, the resonance circuit 340R is configured from a parallel circuit of a coil 311, a capacitor 341 and a variable capacitor 36C configured from a writing pressure detector 36. However, in the present example, the coil 311 is grounded at one end side thereof.

Further, in the present example, a light emission driving controlling voltage ED for driving the LED 342 to emit light is generated by a signal generation circuit 343A from a light emission controlling signal from the sensor 210 received by the resonance circuit 340R.

Further, in the present example, the signal generation circuit 343A is configured such that a first half wave double voltage rectification circuit configured capacitors 3431a and 3434a and diodes 3432a and 3433a for rectification and having a configuration similar to that of the signal generation circuit 343 of the example of FIG. 3 and a second half wave double voltage rectification circuit configured from capacitors 3431b and 3434b and diodes 3432b and 3433b for rectification and having a configuration similar to that of the signal generation circuit 343 of the example of FIG. 3 are connected in series. In this case, the anode of the diode 3432a and the cathode of the diode 3433b are connected to each other, and the connection point is grounded. Further, the capacitor 3434a and the capacitor 3434b are connected in series, and the connection point between the capacitor 3434a and the capacitor 3434b is grounded. Further, the LED 342 is connected in parallel to the series circuit of the capacitor 3434a and the capacitor 3434b.

In the example of FIG. 7, since a light emission controlling signal is double wave rectified from an AC signal of the frequency f0 to generate the light emission driving controlling voltage ED for the LED 342, the light emission driving controlling voltage ED can be generated more efficiently from the light emission controlling signal from the sensor 210.

Second Embodiment

In the first embodiment described above, the position detection apparatus 200 outputs a same light emission controlling signal, which is sent out from the sensor 210 thereof, irrespective of whether or not electromagnetic coupling is established. However, the position detection apparatus 200 may change and control the light emission controlling signal to be sent out from the sensor 210 to the electronic pen 1 in response to an electromagnetic coupling state between the electronic pen 1 and the sensor 210 of the position detection apparatus 200. The second embodiment is an example of a case in which the position detection apparatus 200 is configured in this manner.

The hardware configuration of the position detection apparatus 200 and the electronic pen 1 in the second embodiment is quite similar to that of the first embodiment described above. In the present second embodiment, the software processing by the process control circuit 233 of the position detection apparatus 200 is different from that in the first embodiment.

FIG. 8 is a flow chat depicting an outline of a flow of software processing by the process control circuit 233 in the present second embodiment. It is to be noted that the following description is given of an example of a case in which the position detection apparatus 200 time-divisionally sends out position detection signals SBx and SBy and a light emission controlling signal LB from the sensor 210 within a period of a cycle T as depicted in FIGS. 4A, 4B, 4C, 4D, and 4E.

In particular, in the present second embodiment, the process control circuit 233 first executes a waiting mode before the sensor 210 is placed into an electromagnetically coupled state to the electronic pen 1 (S101)

In this waiting mode, in the present example, the position detection signals SBx and SBy and the light emission controlling signal LB are not sent out within all periods of the cycle T, but a signal sending out period within which the position detection signals SBx and SBy and the light emission controlling signal LB are sent out and a pause period within which they are not sent out are repeated after every period equal to a plurality of times the cycle T, for example, after every period equal to 100 times the cycle T (100 T=750 milliseconds) (refer to FIG. 9A).

Accordingly, if the electronic pen 1 comes close to the sensor 210 of the position detection apparatus 200 that is in the waiting mode, namely, if an electronic pen closely positioned state in the waiting mode is established, then in the electronic pen cartridge 3 of the electronic pen 1, the LED 342 is placed into a lit state within a signal sending out period but is placed into an unlit state within a pause period. Therefore, to the human eyes, the LED 342 looks in a blinking state (refer to FIG. 9B).

It is to be noted that the "electronic pen closely positioned state in the waiting mode" signifies a state in which, although an electronic pen 1B and the sensor 210 are in an electromagnetically coupled state, since the level of the feedback signal from the electronic pen 1B is low, the sensor 210 cannot accurately detect the position indicated by the electronic pen 1B.

The process control circuit 233 of the position detection apparatus 200, in the waiting mode, supervises the voltage induced in the loop coils of the sensor 210 as described hereinabove to decide whether or not the electronic pen 1 further comes close to the sensor 210 from the electronic pen closely positioned state until the electronic pen 1 and the sensor 210 are placed into an electromagnetic coupling state effective for position detection (hereinafter referred to as effective electromagnetically coupled state) (S102). It is to be noted that, in the present second embodiment, the effective electromagnetically coupled state signifies a state in which the position of the electronic pen 1B on the sensor can be detected accurately.

Then, if it is decided at S102 that the electronic pen 1 and the sensor 210 are not in an effective electromagnetically coupled state, then the process control circuit 233 returns the processing to S101 to repeat S101 and S102.

On the other hand, if it is decided at S102 that the electronic pen 1 and the sensor 210 are in an effective electromagnetically coupled state, then the process control circuit 233 changes the mode from the waiting mode to an effective electromagnetic coupling mode and sends out position detection signals SBx and SBy and a light emission controlling signal LB within all periods of the cycle T (S103; FIG. 9C).

In the electromagnetic coupling mode, a light emission controlling signal is sent out within all periods of the cycle T, and therefore, the LED 342 of the electronic pen cartridge 3 of the electronic pen 1 looks in a blinking state as described hereinabove (refer to FIG. 9D).

In the effective electromagnetic coupling mode, the process control circuit 233 of the position detection apparatus 200 decides whether or not the electronic pen 1 is spaced away from the sensor 210 until the effective electromagnetic coupling state between the electronic pen 1 and the sensor 210 is cancelled (S104).

Then, if it is decided at S104 that the effective electromagnetic coupling state between the electronic pen 1 and the sensor 210 is not cancelled, then the process control circuit 233 returns the processing to S103 to repeat S103 and S104.

On the other hand, if it is decided at S104 that the effective electromagnetic coupling state between the electronic pen 1 and the sensor 210 is cancelled, then the process control circuit 233 returns the processing to S101, at which it changes the mode from the effective electromagnetic coupling mode to the waiting mode and then repeats the processes beginning with S101.

As described above, in the present second embodiment, when the electronic pen cartridge 3 of the electronic pen 1 receives a signal from the sensor 210 of the position detection apparatus 200, if the electronic pen 1 is in a state before it establishes effective electromagnetic coupling to the sensor 210, the LED 342 blinks, but if the electronic pen 1 establishes an effective electromagnetic coupling state to the sensor 210, then the LED 342 exhibits a lit state.

Accordingly, the user of the electronic pen 1 can readily grasp an electromagnetic coupling state to the sensor 210 from the light emission mode of a blinking state or a lit state of the LED 342, which is convenient.

It is to be noted that, while, in the example described above, also sending out of the position detection signal SB is stopped within a pause period, only the light emission controlling signal LB may be stopped.

Further, while the example of the second embodiment described above is an example of a case in which the position detection signals SBx and SBy and the light emission controlling signal LB depicted in FIGS. 5A, 5B, 5C, 5D, and 5E are views are time-divisionally sent out from the sensor 210 within a period of the cycle T depicted in FIGS. 4A, 4B, 4C, 4D, and 4E, the example of the second embodiment can be applied also to a case of a first example of a different example of a light emission controlling signal within the light emission controlling period PD within which the position detection signals SBx and SBy and the light emission controlling signal LBa depicted in FIGS. 5A, 5B, 5C, 5D, and 5E are sent out time-divisionally. Further, the second embodiment can be applied also the cases of the second example and the third example of the different example of a light emission controlling signal within the light emission controlling period PD.

Modifications to Second Embodiment

In the example of the second embodiment described above, the process control circuit 233 provides, in the waiting mode, a signal sending out period and a pause period such that the LED 342 of the electronic pen 1 is caused to blink but does not provide, in the effective electromagnetic coupling mode, the pause period such that the LED 342 lights up thereby to allow the user to grasp both modes. In other words, it is made possible for the two modes to be grasped by the user depending upon the difference in light emission mode between blinking and lighting up of the LED 342. However, the difference in light emission mode of the LED 342 for allowing the user to grasp the waiting mode and the effective electromagnetic coupling mode is not limited to blinking and lighting up.

For example, although, also in the waiting mode, the position detection signals SBx and SBy and the light emission controlling signal LB are sent out in all periods of the cycle T similarly as in the effective electromagnetic coupling mode, the amplitude MA of the position detection signals SBx and SBy and the light emission controlling signal LB in the waiting mode is made different from the amplitude MB of the position detection signals SBx and SBy and the light emission controlling signal LB in the effective electromagnetic coupling mode are made different from each other so as to satisfy the amplitude MA<amplitude MB.

In this way, from the difference between the light emission intensity of the LED 342 of the electronic pen 1 in the waiting mode and the light emission intensity of the LED 342 of the electronic pen 1 in the effective electromagnetic coupling mode, the user can grasp the two modes. Further, since the amplitude MA<amplitude MB is satisfied, the light emission intensity of the LED 342 of the electronic pen 1 in the effective electromagnetic coupling mode is higher than that in the waiting mode, and therefore, when the electronic pen 1 is used, the LED 342 glows brightly on the sensor 210. Therefore, there is an advantageous effect that the pen tip side of the electronic pen 1 becomes brighter and the convenience in use is improved.

It is to be noted that, in the case of the present modification, only the light emission controlling signal LB may be used as signals whose amplitude is to be changed and control in the waiting mode and the effective electromagnetic coupling mode.

Also the present modification to the second embodiment can be applied to any of the first to the third examples of the different example of the light emission controlling signal within the light emission controlling period PD.

Third Embodiment

In the first embodiment and the second embodiment described above, a case is supposed in which, as a light emitting element of an electronic pen, a single light emitting is used and is configured from an LED of a particular single color including white. However, as a light emitting element to be provided on an electronic pen, a plurality of light emitting elements may be used. In the present third embodiment, an electronic pen includes three LEDs whose emission light colors are, for example, three primary colors of red, green and blue such that various emission light colors may be exhibited, and the emission light color by the three LEDs (including an emission light color by synthesis) is changeably controlled by a light emission controlling signal from a position detection apparatus.

Figures 10A, 10B:
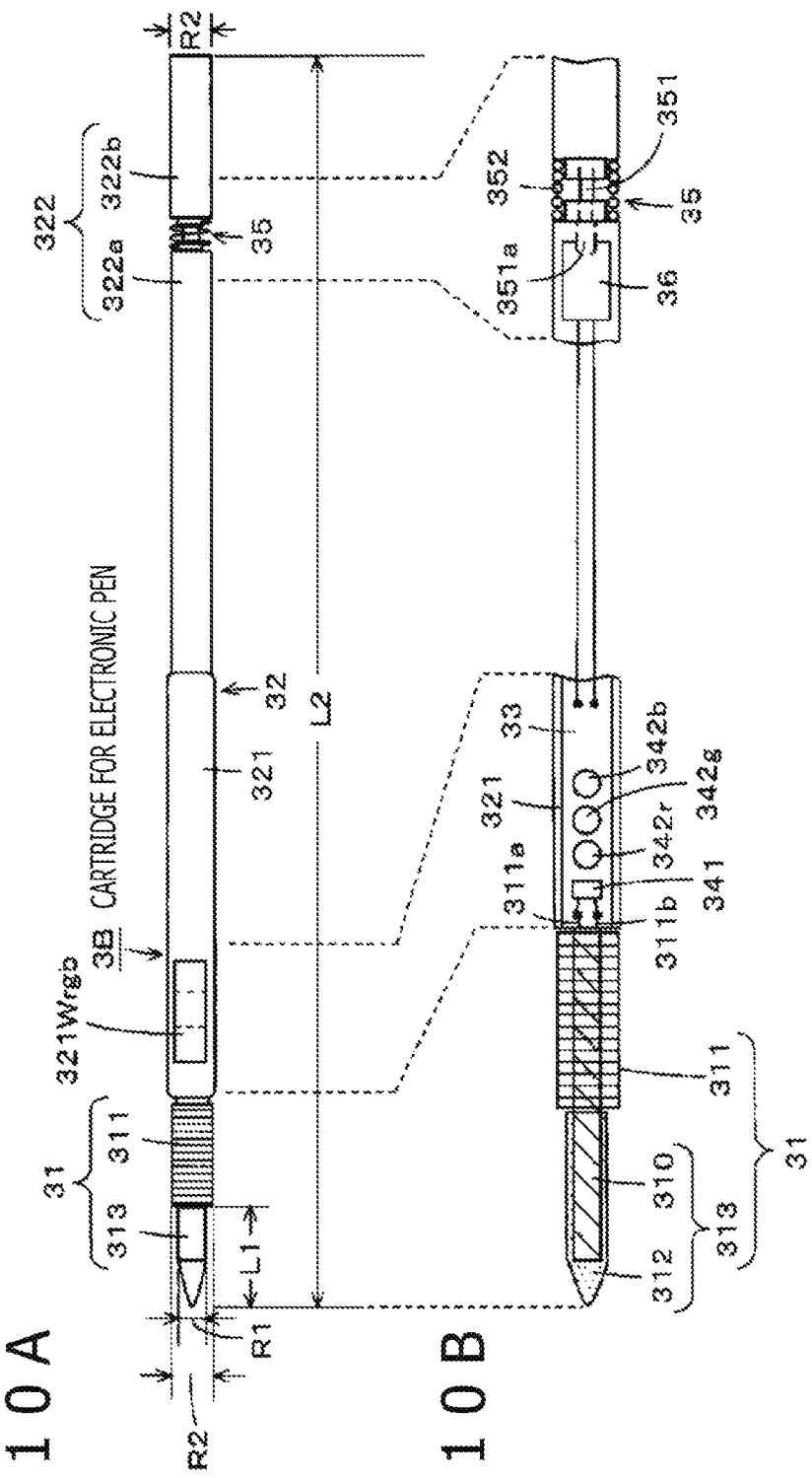
FIGS. 10A and 10B are views illustrating an example of a configuration of an electronic pen cartridge used in a third embodiment of the position indicator according to the present disclosure.

FIGS. 10A and 10B are views depicting an example of a configuration of an electronic pen cartridge 3B of an electronic pen 1B in the case of the present third embodiment, and like portions to those of the electronic pen cartridge 3 of the electronic pen 1 of the first embodiment depicted in 2A, 2B, and 2C are denoted by like reference characters.

In the electronic pen cartridge 3B of the electronic pen 1B in the third embodiment, three LEDs 342r, 342g and 342b whose emission light colors are the three primary colors of red, green and blue, respectively, are provided on the printed board 33 in the first tubular body portion 321 of the tubular body 32 as depicted in FIG. 10B. Further, on an outer circumferential portion of the first tubular body portion 321 of the tubular body 32, window portion 321Wrgb for making it possible to radiate generated light of the three LEDs 342r, 342g and 342b therethrough are formed corresponding to the LEDs 342r, 342g and 342b as depicted in FIG. 10A.

Figure 11:
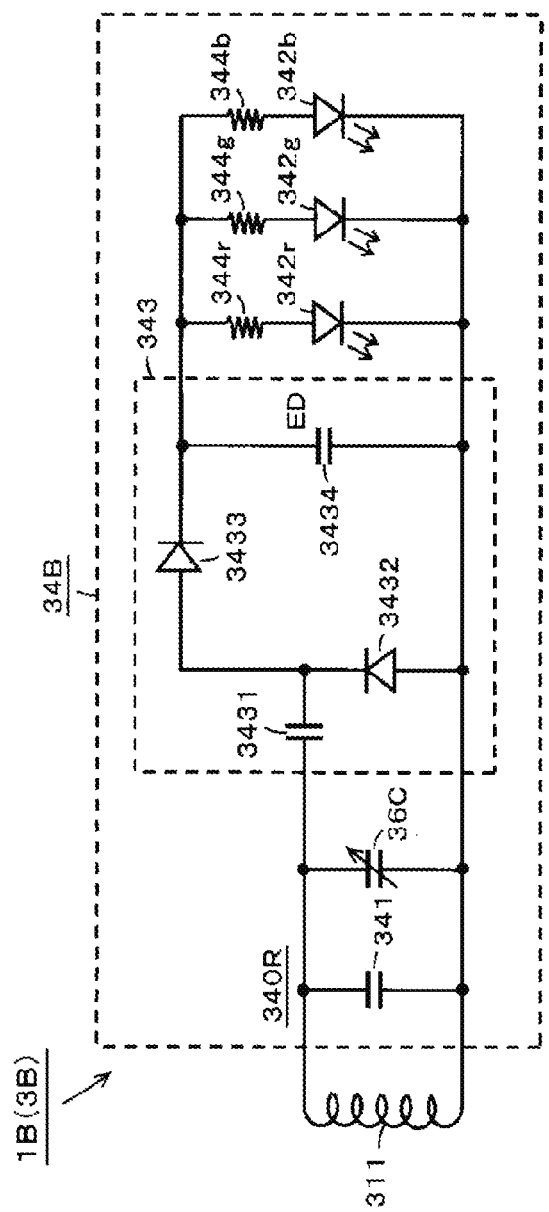
FIG. 11 is a circuit diagram of an example of an electronic circuit of the third embodiment of the position indicator according to the present disclosure.

Further, in the electronic pen cartridge 3B of the electronic pen 1B in the present third embodiment, an electronic circuit 34B is configured in such a manner as depicted in FIG. 11. The other part of the electronic pen cartridge 3B is configured similarly to that of the electronic pen cartridge 3 of the electronic pen 1 of the first embodiment depicted in FIGS. 2A, 2B, and 2C.

Now, the electronic circuit 34B depicted in FIG. 11 is described. Although the electronic circuit 34B of the present example is merely different in that it includes the three LEDs 342r, 342g and 342b to which a light emission driving controlling voltage ED accumulated in the capacitor 3434 of the signal generation circuit 343 is supplied, it is similar in configuration of the other part to that of the electronic circuit 34 provided in the electronic pen cartridge 3 of the electronic pen 1 of the first embodiment depicted in FIGS. 2A, 2B, and 2C.

In particular, in the electronic circuit 34B of the present third embodiment, a series circuit of a resistor 344r and an LED 342r, another series circuit of a resistor 344g and an LED 342g and a further series circuit of a resistor 344b and an LED 342b are connected in parallel to the capacitor 3434.

In this electronic circuit 34B, where a threshold voltage with which the LED 342r whose emission light color is red is driven to emit light is represented by Ethr, the threshold voltage for the LED 342g whose emission light color is green is driven to emit light is represented by Ethg and the threshold voltage for the LED 342b whose emission light color is blue is driven to emit light is represented by Ethb, the resistance values of the resistors 344r, 344g and 344b are selected so as to satisfy Ethr<Ethg<Ethb.

Accordingly, when the light emission driving controlling voltage ED that is an accumulation voltage of the capacitor 3434 satisfies Ethr≤ED<Ethg, then only the LED 342r whose emission light color is red emits light. On the other hand, when the light emission driving controlling voltage ED of the capacitor 3434 satisfies Ethg≤ED<Ethb, the LED 342r whose emission light color is red and the LED 342g whose emission light color is blue emit light, whereupon a yellow emission light color is obtained as the composite color then. Further, when the light emission driving controlling voltage ED of the capacitor 3434 satisfies Ethb≤ED, then all of the LED 342r whose emission light color is red, the LED 342g whose emission light color is green and the LED 342b whose emission light color is blue emit light, whereupon a white emission light color is obtained as the composite color then.

Meanwhile, in the present third embodiment, the position detection apparatus 200 is configured such that a light emission controlling signal according to an electromagnetic coupling state between the sensor 210 of the position detection apparatus 200 and the electronic pen 1B and a contact state of the electronic pen 1B with the sensor 210 is supplied by software processing by the process control circuit 233.

In particular, the process control circuit 233 of the position detection apparatus 200 in the present third embodiment includes a waiting mode and an electromagnetic coupling mode similarly as in the second embodiment described hereinabove. Further, the process control circuit 233 of the position detection apparatus 200 in the present third embodiment is configured such that it detects a writing pressure value applied to the electronic pen 1B, which is detected from a feedback signal from the electronic pen 1B, to detect whether or not the electronic pen 1B contacts with the sensor 210 and establishes, when the electronic pen 1B is in contact with the sensor 210, an electronic pen contact mode. Here, the process control circuit 233 decides whether or not the electronic pen 1B contacts with the sensor 210 depending upon whether or not the writing pressure of the electronic pen 1B is equal to or higher than a predetermined value that is equal to or higher than 0.

Then, as hereinafter described, in the position detection apparatus 200 of the present third embodiment, a period of the cycle T is divided into a position detection period PXY, a light emission controlling period PD and a pause period and position detection signals SBx and SBy and a light emission controlling signal are sent out time-divisionally from the sensor 210 similarly as in the case of the first embodiment depicted in FIGS. 4A, 4B, 4C, 4D, and 4E. However, in the position detection apparatus 200 of the present third embodiment, the light emission controlling signal to be sent out within the light emission controlling period PD is changeably controlled in response to the waiting mode, electromagnetic coupling mode and contact mode described hereinabove. By this, composite emission light color by the three LEDs 342r, 342g and 342b as the light emitting element of the electronic pen cartridge 3B of the electronic pen 1B are changeably controlled in response to the waiting mode, electromagnetic coupling mode and contact mode described hereinabove.

Figure 12:
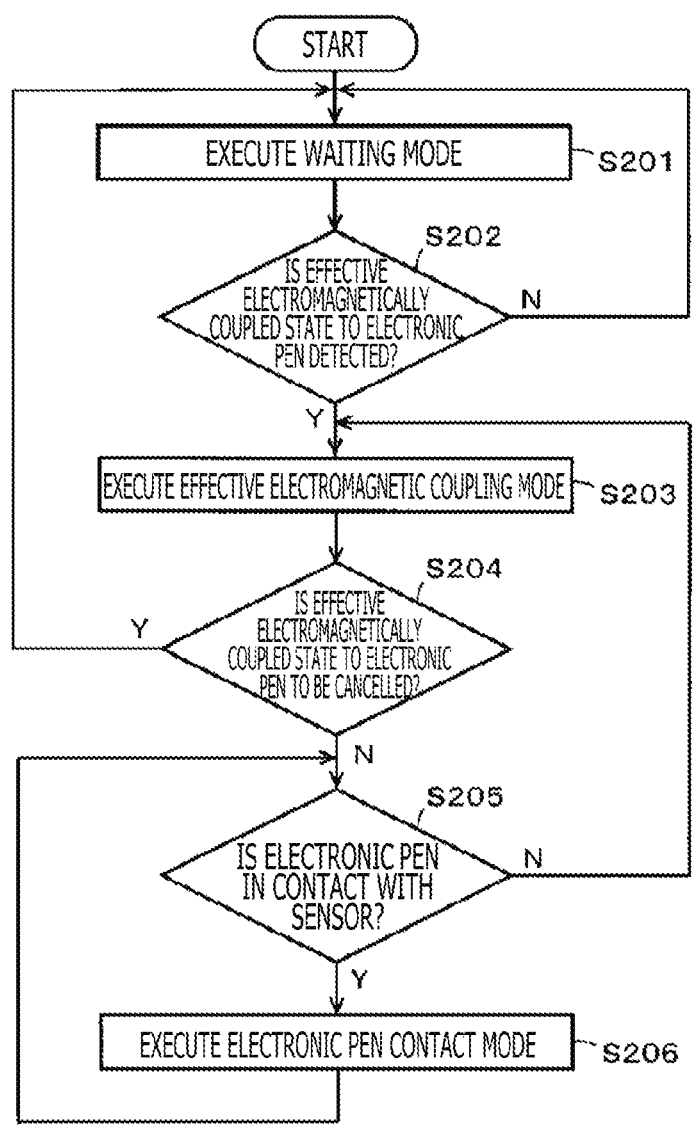
FIG. 12 is a flow chart depicting an outline of a flow of software processing in the third embodiment of the position indicator according to the present disclosure.
Figure 13:
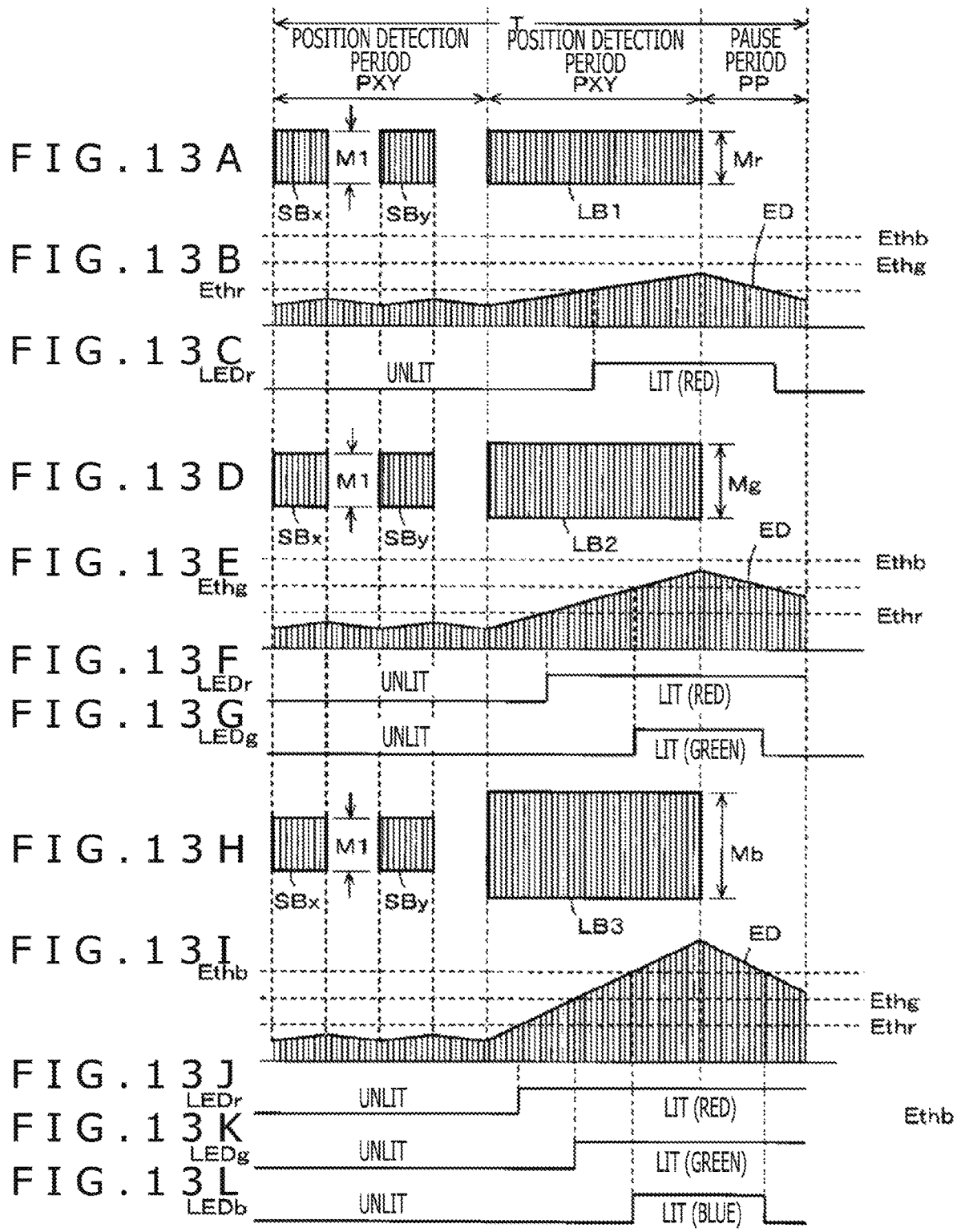
FIGS. 13A, 13B, 13C, 13D, 13E, 13F, 13G, 13H, 13I, 13J, 13K, and 13L are views depicting a timing chart used for description of operation corresponding to the software processing of FIG. 12.

FIG. 12 is a flow chart illustrating a flow of software processing by the process control circuit 233 of the position detection apparatus 200 in the present third embodiment. Meanwhile, FIG. 13 is a timing chart illustrating a transmission signal from the sensor 210 according to the flow of the software processing by the process control circuit 233 and operation of the signal generation circuit 343 of the electronic circuit 34B of the electronic pen 1B. In the following, light emission control of the three LEDs 342r, 342g and 342b of the electronic pen 1B by the position detection apparatus 200 in the present third embodiment is described with reference to FIGS. 12 and 13.

It is to be noted that, in the example described below, the process control circuit 233 controls the gain of the current driver to control the amplitude of the light emission controlling signal to be sent out within the light emission controlling period PD thereby to perform light emission control of the three LEDs 342r, 342g and 342b of the electronic pen 1B.

In particular, in the present third embodiment, the process control circuit 233 first executes a waiting mode before the sensor 210 is placed into an electromagnetically coupled state to the electronic pen 1 (S201).

In this waiting mode, while, in the present example, a light emission controlling signal LB1 configured from position detection signals SBx and SBy and a burst signal is sent out within all periods of the cycle T as depicted in FIG. 13A, the amplitude Mr of the light emission controlling signal LB1 is made, in the present example, equal to the amplitude M1 of the position detection signals SBx and SBy.

If the electronic pen 1B comes close to the sensor 210 of the position detection apparatus 200 that is in a state of the waiting mode, then the light emission driving controlling voltage ED obtained from the capacitor 3434 of the signal generation circuit 343 of the electronic circuit 34B of the electronic pen cartridge 3B exceeds the threshold voltage Ethr for driving the LED 342r for red to emit light for every cycle T, the light emission driving controlling voltage ED does not exceed the threshold voltage Ethg for green and the threshold voltage Ethb for blue as depicted in FIG. 13B. Therefore, if the electronic pen closely positioned state in the waiting mode is entered, then only the LED 342r for red of the electronic pen cartridge 3B is placed into a lit state (refer to FIG. 13C), and the user can be notified that the electronic pen 1B is in an electronic pen closely positioned state in the waiting mode. In this case, since the light emission driving controlling voltage ED obtained on the capacitor 3434 exceeds the threshold voltage Ethr for driving the LED 342r for red to emit light for every cycle T, to the human eyes, the LED 342r for red looks is lit in red together with the fact that the cycle T is so short as, for example, 7.5 milliseconds.

Then, the process control circuit 233 of the position detection apparatus 200 supervises, in this waiting mode, the voltage induced in the loop coils of the sensor 210 as described hereinabove to decide whether or not the electronic pen 1B comes closer to the sensor 210 from the electronic pen closely positioned state described hereinabove until a state in which the electronic pen 1B and the sensor 210 are effectively electromagnetically coupled to each other for position detection (such state is hereinafter referred to as effective electromagnetic coupling state) is entered (S202). It is to be noted that, in the present third embodiment, the effective electromagnetic coupling state signifies a state in which, although the position of the electronic pen 1B on the sensor can be detected accurately, the electronic pen 1B is not in contact with the sensor 210, namely, is in a so-called hovering state.

Then, if it is decided at S202 that the electronic pen 1B and the sensor 210 are not in an effective electromagnetic coupling state, then the process control circuit 233 returns the processing to S201 to repeat S201 and S202.

On the other hand, if it is decided at S202 that the electronic pen 1B and the sensor 210 are in an effective electromagnetic coupling state, then the process control circuit 233 changes the mode from the waiting mode to the effective electromagnetic coupling mode and sends out a light emission controlling signal LB2 of an amplitude Mg greater than amplitude Mr of the light emission controlling signal LB1 (Mg>Mr) within a light emission controlling period within a period of the cycle T (S203: refer to FIG. 13D).

In the present effective electromagnetic coupling mode, the light emission driving controlling voltage ED obtained at the capacitor 3434 of the signal generation circuit 343 of the electronic circuit 34B of the electronic pen cartridge 3B is in a state in which it exceeds the threshold voltage Ethr for driving the LED 342r for red and the threshold voltage Ethg for driving the LED 342g for green to emit light for every cycle T but does not exceed the threshold voltage Ethb for blue as depicted in FIG. 13E.

Therefore, in the effective electromagnetic coupling mode, the LED 342r for red and the LED 342g for green of the electronic pen cartridge 3B emit light (refer to FIGS. 13F and 13G), and the electronic pen 1B exhibits a state in which it emits light of yellow of the composite color and can notify the user that the electronic pen 1B is in the effective electromagnetic coupling mode.

The process control circuit 233 of the position detection apparatus 200 decides, in this effective electromagnetic coupling mode, whether or not the electronic pen 1B is space away from the sensor 210 into a state in which the effective electromagnetic coupling mode between the electronic pen 1B and the sensor 210 is cancelled (S204).

Then, if it is decided at S204 that the effective electromagnetic coupling state between the electronic pen 1B and the sensor 210 is cancelled, then the process control circuit 233 returns the process to S201 to repeat the processes beginning with S201 described hereinabove.

On the other hand, if it is decided at S204 that the effective electromagnetic coupling state between the electronic pen 1B and the sensor 210 is not in a cancelled state, then the process control circuit 233 detects a writing pressure applied to the electronic pen 1B from a feedback signal received from the electronic pen 1B and checks whether or not the writing pressure value is equal to or higher than the predetermined value to decide whether or not the electronic pen 1B is in contact with the sensor 210 (S205).

If it is decided at S205 that the electronic pen 1B is not in contact with the sensor 210, then the process control circuit 233 returns the processing S203 to repeat the processes beginning with S203.

On the other hand, if it is decided at S205 that the electronic pen 1B is in contact with the sensor 210, then the process control circuit 233 changes the mode from the effective electromagnetic coupling mode to the electronic pen contact mode and sends out a light emission controlling signal LB3 in the form of a burst signal of an amplitude Mb greater than the amplitude Mg of the burst signal configuring the light emission controlling signal LB2 (Mb>Mg) within a light emission controlling period within a period of the cycle T (S206: refer to FIG. 13H).

In this electronic pen contact mode, the light emission driving controlling voltage ED obtained at the capacitor 3434 of the signal generation circuit 343 of the electronic circuit 34B of the electronic pen cartridge 3B exhibits a state in which it exceeds all of the threshold voltage Ethr for driving the LED 342r for red to emit light, threshold voltage Ethg for green and threshold voltage Ethb for blue for every cycle T as depicted in FIG. 13I.

Therefore, in the electronic pen contact mode, all of the LED 342r for red, LED 342g for green and LED 342b for blue of the electronic pen cartridge 3B exhibit a lit state (refer to FIGS. 13J, 13K and 13L), and the electronic pen 1B exhibits a state in which it emits light in white that is the composite color and can notify the user that the electronic pen is in the electronic pen contact mode.

In such a manner as described above, in the present third embodiment, the emission light color by the light emitting element provided in the electronic pen 1B can be controlled by a light emission controlling signal from the position detection apparatus 200. Then, in the example described above, from the position detection apparatus 200, a light emission controlling signal according to the electromagnetic coupling state between the sensor 210 of the position detection apparatus 200 and the electronic pen 1B and the contact state of the electronic pen 1B with the sensor 210 is supplied to the electronic pen 1B, and the electronic pen 1B notifies the user of an effective electromagnetic coupling state or a contact state between the electronic pen 1B and the position detection apparatus 200 depending upon the emission light color of the light emitting element. Accordingly, the user can know what coupling relation state the electronic pen 1B has with the sensor 210 only by looking at the emission light color of the light emitting element of the electronic pen 1B, which is very conveniently.

It is to be noted that, while, in the third embodiment described above, the process control circuit 233 controls the emission light color of the light emitting element of the electronic pen 1B by changing the amplitude of a burst signal configuring the light emission controlling signal in response to the three modes, the process control circuit 233 may otherwise control the emission light color of the light emitting elements of the electronic pen 1B by controlling the signal duration and the repeat cycle of the burst signal configuring the light emission controlling signal as in the example depicted in FIGS. 5A, 5B, 5C, 5D, and 5E. Alternatively, only the signal duration of the burst signal configuring the light emission controlling signal or only the repeat cycle may be controlled, or two or more of the signal duration, repeat cycle and amplitude may be used in combination for the control.

Further, also in the present third embodiment, the position detection signal and the light emission controlling signal may be provided as a single common signal as depicted in FIGS. 6A, 6B, 6C, 6D, and 6E such that one of the amplitude, signal duration and repeat cycle of the burst signal configuring the common signal or a combination of two or more of them may be used for control to control the emission light color of the light emitting elements of the electronic pen 1B.

Fourth Embodiment

The fourth embodiment is a modification to the third embodiment described above. In the electronic pen 1B in the third embodiment described above, the number of LEDs to be driven to emit light from among the three LEDs 342r, 342g and 342b is controlled to change the emission light color. In contrast, in the fourth embodiment, each of the three LEDs 342r, 342g and 342b provided in the electronic pen cartridge 3C of the electronic pen 1C in the fourth embodiment is configured for switching control such that the emission light color can be set to red, green and blue.

In the present fourth embodiment, the configuration of the position detection apparatus 200 may be made quite similar to that of the third embodiment described above. Further, although the electronic pen cartridge 3C of the electronic pen 1C in the fourth embodiment is similar in hardware configuration in terms of the mechanical structure to that of the third embodiment depicted in FIGS. 10A and 10B, it is different in configuration of the electronic circuit.

Figure 14:
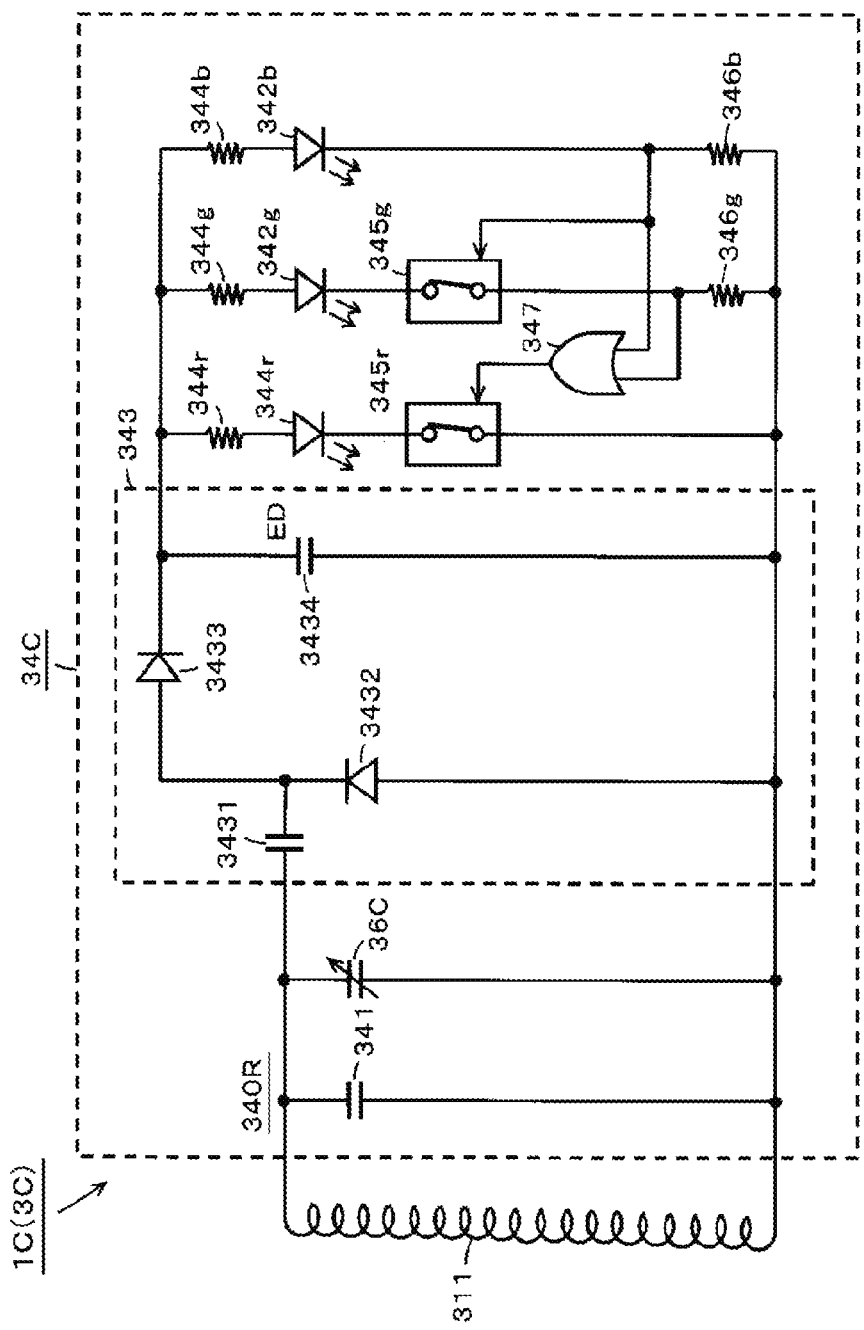
FIG. 14 is a circuit diagram of an example of an electronic circuit of a fourth embodiment of the position indicator according to the present disclosure.

FIG. 14 depicts an example of a circuit configuration of the electronic circuit 34C of the electronic pen cartridge 3C of the electronic pen 1C in the present fourth embodiment. In FIG. 14, like portions to those of the electronic circuit 34B of the electronic pen cartridge 3B of the third embodiment depicted in FIG. 11 described hereinabove are denoted by like reference characters.

In particular, in the electronic circuit 34C of the present fourth embodiment, a series circuit of a resistor 344r, an LED 342r and a switch circuit 345r, another series circuit of a resistor 344g, an LED 342g, a switch circuit 345g and another resistor 346g and a further series circuit of a resistor 344b, an LED 342b and another resistor 346b are connected in parallel to a capacitor 3434.

The switch circuit 345r and the switch circuit 345g are switch circuits having a normally on state (closed state). In the electronic circuit 34C, the switch circuit 345g is controlled to off by a voltage obtained across the resistor 346b when the LED 342b is placed into a light emitting state to cause current to flow through the resistor 346b.

Meanwhile, the switch circuit 345r is controlled to off by a voltage obtained across the resistor 346g when the LED 342g is placed into a light emitting state to cause current to flow through the resistor 346b. Further, the switch circuit 345r is controlled to off by a voltage obtained across the resistor 346b when the LED 342b is placed into a light emitting state to cause current to flow through the resistor 346b. In order that the switch circuit 345r is controlled by the voltage obtained across the resistor 346g and the voltage obtained across the resistor 346b, in the example of FIG. 14, the voltage obtained across the resistor 346g and the voltage obtained across the resistor 346b are supplied to a control terminal of the switch circuit 345r through an OR circuit 347.

Also in the present fourth embodiment, from the sensor 210 of the position detection apparatus 200, light emission controlling signals LB1, LB2 and LB3 according to the waiting mode, effective electromagnetic coupling mode and electronic pen contact mode are sent out as depicted in FIGS. 13A, 13B, 13C, 13D, 13E, 13F, 13G, 13H, 13I, 12J, 13K, and 13L.

Therefore, in the fourth embodiment, if the electronic pen 1C comes close to the sensor 210 of the position detection apparatus 200 that is in a state of the waiting mode, then the light emission driving controlling voltage ED obtained at the capacitor 3434 of the signal generation circuit 343 of the electronic circuit 34C of the electronic pen cartridge 3C exceeds only the threshold voltage Ethr for driving the LED 342r for red to emit light for every cycle T as depicted in FIG. 13B. Therefore, the electronic pen 1C exhibits a state in which only the LED 342r for red of the electronic pen cartridge 3C is lit, and can notify the user that it is in the waiting mode.

On the other hand, in the effective electromagnetic coupling mode, the light emission driving controlling voltage ED obtained at the capacitor 3434 of the signal generation circuit 343 of the electronic circuit 34C of the electronic pen cartridge 3C exceeds the threshold voltage Ethr for driving the LED 342r for read to emit light and the threshold voltage Ethg for driving the LED 342g for green to emit light for every cycle T as depicted in FIG. 13E.

Therefore, in the effective electromagnetic coupling mode, a state in which the LED 342r for red and the LED 342g for green of the electronic pen cartridge 3B can be lit is established. However, at this time, when the LED 342g for green is lit, a voltage is generated across the resistor 346g by current flowing through the LED 342g for green, and consequently, the switch circuit 345r is controlled to an off state. Accordingly, no driving current flows through the LED 342r for red, and the LED 342r for red cannot be lit but is placed into an unlit state. Accordingly, in the effective electromagnetic coupling mode, the electronic pen 1C is switched to a state in which only the LED 342g for green is lit.

Then, when the electronic pen contact mode is entered, the light emission driving controlling voltage ED obtained at the capacitor 3434 of the signal generation circuit 343 of the electronic circuit 34C of the electronic pen cartridge 3C exhibits a state in which it exceeds all of the threshold voltage Ethr for driving the LED 342r for red to emit light, threshold voltage Ethg for green and threshold voltage Ethb for blue for every cycle T as depicted in FIG. 13I.

Therefore, in the electronic pen contact mode, the electronic pen 1C is placed into a state in which all of the LED 342r for red, LED 342g for green and LED 342b for blue of the electronic pen cartridge 3B can be lit. However, at this time, when the LED 342b for blue is lit, a voltage is generated across the resistor 346b by current flowing through the LED 342b for blue, and the switch circuit 345r and the switch circuit 345g are controlled to an off state by the voltage. Accordingly, no driving current flows through the LED 342r for red and the LED 342g for green, and the LED 342r for red and the LED 342g for green cannot be lit but are placed into an unlit state. Accordingly, in the electronic pen contact mode, only the LED 342b for blue is switched to a lit state.

In this manner, in the present fourth embodiment, it is possible to control the LED 342r, LED 342g and LED 342b for the three colors of red, green and blue as the light emitting element provided on the electronic pen 1C by the light emission controlling signal from the position detection apparatus 200 such that they are switched to emit light by the light emission controlling signal from the position detection apparatus 200.

Then, in the example described above, since it is possible for the electronic pen 1C to notify the user of an electromagnetic coupling relation or a contact state between the electronic pen 1B and the position detection apparatus 200 depending upon the difference in emission light color of the light emitting element of the electronic pen 1C, the user can know what relation state the electronic pen 1B has with the sensor 210 only by seeing the emission light color of the light emitting element of the electronic pen 1C, which is very convenient.

It is to be noted that, also in the present fourth embodiment, the process control circuit 233 not only changeably control the amplitude of a burst signal configuring the light emission controlling signal in response to the three modes similarly as in the third embodiment described hereinabove, but also may control only the signal duration or the repeat cycle of the burst signal configuring the light emission controlling signal or may control two or more of the signal duration, repeat cycle and amplitude in combination.

Further, also in the present fourth embodiment, the position detection signal and the light emission controlling signal may be provided as a single common signal as depicted in FIGS. 6A, 6B, 6C, 6D, and 6E such that one of the amplitude, signal duration and repeat cycle of the burst signal configuring the common signal or a combination of two or more of them may be used for control to control the emission light color of the light emitting element of the electronic pen 1B similarly as in the third embodiment described hereinabove.

It is to be noted that, in the third embodiment and the fourth embodiment, the light emission controlling signal from the position detection apparatus 200 is changed and controlled in response to an electromagnetic coupling state between the electronic pen 1B or 1C and the sensor 210 of the position detection apparatus 200 or a positional coupling state between them such as a contact state. The emission light color of the light emitting element of the electronic pen 1B or the electronic pen 1C is thus changeably controlled.

However, in the configurations of the third embodiment and the fourth embodiment, the changing control mode for the emission light color of the light emitting element of the electronic pen 1B or the electronic pen 1C by the light emission controlling signal from the position detection apparatus 200 is not limited to that where the emission light color of the light emitting element of the electronic pen 1B or the electronic pen 1C is changeably controlled in response to the positional coupling relation between the electronic pen 1B or the electronic pen 1C and the sensor 210 of the position detection apparatus 200.

For example, where the process control circuit 233 of the position detection apparatus 200 is connected to an information processing apparatus such as a personal computer such that a user can set a drawing color by an electronic pen on a display screen image of the information processing apparatus, also it is possible to configure the position detection apparatus 200 such that the process control circuit 233 acquires information of a drawing color set by a user from the information processing apparatus and send out a light emission controlling signal according to the set drawing color from the sensor 210 of the position detection apparatus 200.

For example, where the light emitting element emits three emission light colors like the electronic pen 1B or the electronic pen 1C of the examples described hereinabove, a selection screen image for drawing colors corresponding to the three drawing colors are displayed on a display screen image of the information processing apparatus connected to the process control circuit 233 of the position detection apparatus 200. Then, when one of the three drawing colors is selected by the user, the selection information is transmitted from the information processing apparatus to the process control circuit 233. The process control circuit 233 recognizes the selected drawing color acquired from the information processing apparatus and sends out a light emission controlling signal for causing the electronic pen 1B or the electronic pen 1C to emit light in an emission light color according to the drawing color from the sensor 210.

If such a configuration as just described is adopted, then the user can confirm the drawing color by the electronic pen selected through the information processing apparatus, to which the position detection apparatus 200 is connected, from the emission light color of the light emitting element of the electronic pen. In this case, since the electronic pen may be configured in a simple configuration only for generating a light emission driving controlling signal from the light emission controlling signal in the signal generation circuit, such a remarkable effect is achieved that the necessity for such a complicated configuration as to receive and analyze destination information of an emission light color from the position detection apparatus 200 and control light emission of the light emitting element can be eliminated.

Fifth Embodiment

The electronic pen of the examples of the position indicator of the embodiments described above is directed to a case in which only one electronic pen cartridge is accommodated in the housing. In the present fifth embodiment, a plurality of electronic pen cartridges are accommodated in a housing and one of the plurality of electronic pen cartridges is selected by a knock mechanism such that the tip end of the pen tip portion of the selected electronic pen cartridge is projected from the opening of the pen tip side of the housing and used.

As described hereinabove, the electronic pen cartridge 3 of the electronic pen 1 of the first embodiment is configured such that it has compatibility with the replacement core 6 of a ballpoint pen. As a ballpoint pen on the market, a multicolor ballpoint pen in which replacement cores of different ink colors are incorporated is available. The present fifth embodiment provides an electronic pen configured such that an electronic pen cartridge having a configuration similar to the electronic pen cartridge 3 is accommodated in a housing of a configuration similar to that of the housing of the multicolor ballpoint pen.

FIG. 15A is a configuration view depicting an example of an electronic pen 1M of the present fifth embodiment. Also in the example of FIG. 15A, a housing 2M of the electronic pen 1M is configured from a transparent synthetic resin such that the inside thereof can be seen through the housing 2M.

The housing 2M of the electronic pen 1M has a configuration same as that of the housing and the knock cam mechanism of a multicolor ballpoint pen of the knock type on the market. The housing and the knock cam mechanism of the multicolor ballpoint pen of the knock type on the market may be used as they are. In the present housing 2M in the present example, three electronic pen cartridges 3D, 3E and 3F are accommodated.

The electronic pen cartridges 3D, 3E and 3F are similar in configuration in terms of the mechanical structure to the electronic pen cartridge 3 of the first embodiment except that they are configured in same dimensions as those of the replacement cores of a multicolor ballpoint pen. However, the electronic pen cartridges 3D, 3E and 3F in the case of the fifth embodiment are different from the electronic pen cartridge 3 in the first embodiment described hereinabove in that a switch member that is switched on or off in response to a movement in the axial direction by the knock mechanism is provided on the second tubular body portion 322 as hereinafter described. In the present fifth embodiment, components of the electronic pen cartridges 3D, 3E and 3F like to those of the electronic pen cartridge 3 are denoted by suffixes D, E and F to like reference characters, respectively.

Further, in the electronic pen cartridges 3D, 3E and 3F in the present fifth embodiment, an LED 342D, another LED 342E and a further LED 342F (not depicted in FIG. 15) as examples of a light emitting element are accommodated on printed boards 33D, 33E and 33F (not depicted in FIG. 15) in the inside of first tubular body portions 321D, 321E and 321F, respectively. Also in the present example, the LED 342D, LED 342E and LED 342F are disposed at the near side to the core body portions 31D, 31E and 31F in the electronic pen cartridges 3D, 3E and 3F, respectively.

Further, on side circumferential faces of the first tubular body portions 321D, 321E and 321F of the electronic pen cartridges 3D, 3E and 3F corresponding to the positions at which the LED 342D, LED 342E and LED 342F are disposed, window portions 321WD, 321WE and 321WF are formed which are configured from a resin material having a light transmitting property and having a light diffusion effect, respectively.

An opening 2Ma is formed at one end side of the housing 2M in the axial direction such that, when one of the electronic pen cartridges 3D, 3E and 3F is slidably moved in the axial direction by the knock mechanism, the tip end of the pen tip portion 313D, 313E or 313F of the core body portion 31D, 31E or 31F of the electronic pen cartridge 3D, 3E or 3F projects to the outside through the opening 2Ma.

In the electronic pen 1M of the fifth embodiment, it is detected by the electronic pen 1M from the state of the switches provided on the electronic pen cartridges 3D, 3E and 3F whether any of the electronic pen cartridges 3D, 3E and 3F is slidably moved in the axial direction by the respective knock mechanism until the tip end of the pen tip portion 313D, 313E or 313F of the core body portion 31D, 31E or 31F is in a state in which it projects to the outside through the opening 2Ma. The configuration of the other part of the electronic pen cartridges 3D, 3E and 3F is similar to that of the electronic pen cartridge 3 of the first embodiment.

The knock mechanism of the electronic pen 1M is configured from knock bars 42D, 42E and 42F having fitting portions 42Da, 42Ea and 42Fa into which the electronic pen cartridges 3D, 3E and 3F are to be fitted, respectively, a spring receiving member 7, and coil springs 8D, 8E and 8F disposed between the fitting portions 42Da, 42Ea and 42Fa of the electronic pen cartridges 3D, 3E and 3F and the spring receiving member 7, respectively.

The spring receiving member 7 is fixedly attached to a predetermined position in the axial direction in a hollow portion of the housing 2M. In the spring receiving member 7, through-holes 7D, 7E and 7F through which second tubular body portions 322D, 322E and 322F of the electronic pen cartridges 3D, 3E and 3F are to be fitted are formed. The electronic pen cartridges 3D, 3E and 3F are individually attached to the electronic pen 1M by inserting the electronic pen cartridges 3D, 3E and 3F into the through-holes 7D, 7E and 7F of the spring receiving member 7 and the coil springs 8D, 8E and 8F until they are fitted in the fitting portions 42Da, 42Ea and 42Fa of the knock bars 42D, 42E and 42F, respectively.

At portions of the housing 2M in which the knock bars 42D, 42E and 42F are accommodated, through-hole slits (not depicted in FIG. 15A) are provided such that the knock bars 42D, 42E and 42F are partly exposed to the outside therethrough and the knock bars 42D, 42E and 42F can move in the axial direction.

In the electronic pen 1M, when one of the knock bars 42D, 42E and 42F is slidably moved toward the opening 2Ma side until the tip end of the pen tip portion 313D, 313E or 313F of the core body portion 31D, 31E or 31F of the electronic pen cartridge 3D, 3E or 3F that is fitted with the knock bar projects to the outside through the opening 2Ma similarly as in a well-known multicolor ballpoint pen, a locking portion (not depicted) of the knock bar 42D, 42E or 42F is engaged with an engaging portion formed in the hollow portion of the housing 2M to establish a lock state in which the knock bar 42D, 42E or 42F is locked in the state.

Then, if, in the lock state, a different one of the knock bars is slidably moved toward the opening 2Ma side, then the locking of the knock bar in the locked state is cancelled and the knock bar is returned to its original state depicted in FIG. 15A by the coil spring 8D, 8E or 8F. Then, the knock bar slidably moved can be placed into a lock state in which the tip end of the pen tip portion 313D, 313E or 313F of the electronic pen cartridge 3D, 3E or 3F fitted with the knock bar projects from the opening 2Ma.

Thereafter, by slidably moving the knock bar, the electronic pen cartridge whose tip end is to be projected from the opening 2Ma can be changed. If the sliding movement of any of the knock bars 42D, 42E and 42F is stopped intermediately before the lock state is established, then unlocking of the other knock bar that has been in a locked state is performed and the knock bar returns to its state of FIG. 15A by the coil spring 8D, 8E or 8F.

FIGS. 15B and 15(C) are views illustrating a switch provided on the electronic pen cartridges 3D, 3E and 3F. FIGS. 15B and 15(C) depict a switch member 9D provided on the electronic pen cartridge 3D, and also the switch members 9E and 9F (not depicted) of the other electronic pen cartridges 3E and 3F are configured similarly.

In particular, a through-hole 322Da is provided on a circumferential face at a location of the second tubular body portion 322D that is just accommodated in the through-hole 7D of the spring receiving member 7 when the electronic pen cartridge 3D is fitted with the fitting portion 42Da of the knock bar 42D that is in a non-lock state, and the switch member 9D is provided in the second tubular body portion 322D such that it is partly exposed through the through-hole 322Da.

This switch member 9D is configured from a material having elasticity and having conductivity, for example, from a conductive metal having elasticity. This switch member 9D is configured from a fixed terminal piece 91 fixed to an inner wall face of the second tubular body portion 322D in the proximity of the through-hole 322Da and a movable terminal piece 92 elastically contactable with the fixed terminal piece 91 as depicted in FIGS. 15B and 15(C). The movable terminal piece 92 has a bent portion 92a configured so as to be capable of assuming a state in which it elastically touches with the fixed terminal piece 91 and another state in which it does not touch with the fixed terminal piece 91 and is attached in the second tubular body portion 322D such that the bent portion 92a can partly project from the through-hole 322Da.

When the electronic pen cartridge 3D is in a state in which it is fitted with the fitting portion 42Da of the knock bar 42D that is in a non-lock state and the electronic pen cartridge 3D entirely exists in the hollow portion of the housing 2M, the switch member 9D is positioned just in the through-hole 7D of the spring receiving member 7 as depicted in FIG. 15B. Therefore, the bent portion 92a of the movable terminal piece 92 is elastically deformed to the inner side of the second tubular body portion 322D by the inner wall of the through-hole 7D to establish a state in which the fixed terminal piece 91 and the movable terminal piece 92 are spaced from each other without touching with each other. In other words, the switch member 9D is placed into an off state.

If the knock bar 42D is slidably moved to a lock state to enter a state in which the tip end of the pen tip portion 313D of the core body portion 31D of the electronic pen cartridge 3D projects from the opening 2Ma of the housing 2M, the switch member 9D is placed into a state in which it is escaped from the through-hole 7D of the spring receiving member 7 as depicted in FIG. 15(C). Consequently, the bent portion 92a of the movable terminal piece 92 is elastically deformed such that it partly projects from the through-hole 322Da, and consequently, a state in which the movable terminal piece 92 and the fixed terminal piece 91 contact with each other is established. In other words, the switch member 9D is placed into an on state.

Then, the switch member 9D is incorporated into an electronic circuit 34D (refer to FIG. 16 hereinafter described) accommodated in the first tubular body portion 321D of the electronic pen cartridge 3D.

Also in the electronic pen cartridge 3E and the electronic pen cartridge 3F, the switch members 9E and 9F (not depicted) are provided on the second tubular body portion 322E and the second tubular body portion 322F and are accommodated in the electronic circuits 34E and 34F (not depicted) accommodated in the first tubular body portions 321E and 321F, respectively.

[Example of Configuration of Electronic Circuits of Electronic Pen Cartridges 3D, 3E and 3F of Electronic Pen 1M and Position Detection Apparatus 200D in Fifth Embodiment]

Figure 16:
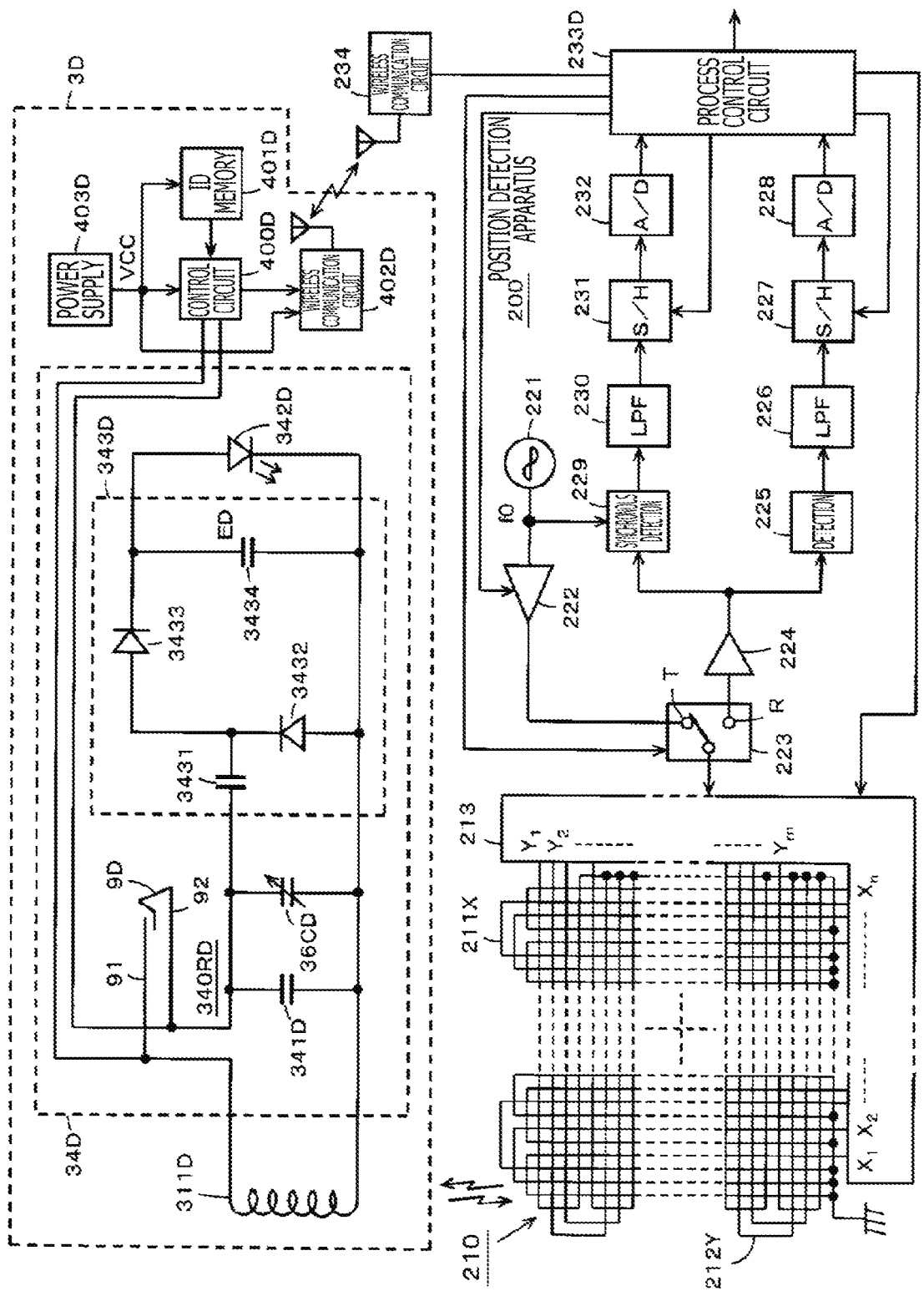
FIG. 16 is a view depicting an example of a configuration of an electronic circuit of the fifth embodiment of the position indicator according to the present disclosure together with an example of a circuit configuration of a position detection apparatus.

FIG. 16 is a view depicting an example of a configuration of the electronic circuit of the electronic pen cartridges 3D, 3E and 3F of the electronic pen 1M and a position detection apparatus 200D in the fifth embodiment. It is to be noted that, in FIG. 16, a relation between the electronic pen cartridge 3D in the electronic pen 1M and the position detection apparatus 200D is depicted. Since also the relations between the electronic pen cartridges 3E and 3F of the electronic pen 1M and the position detection apparatus 200D are similar, description of the electronic circuits 34E and 34F of the electronic pen cartridges 3E and 3F of the electronic pen 1M is omitted.

As depicted in FIG. 16, in the electronic circuit 34D of the present example, similarly to the afore-mentioned embodiments, an AC signal from the sensor 210 received by the resonance circuit 340RD is rectified by the signal generation circuit 343D and accumulated into the capacitor 3434 to generate a light emission driving controlling voltage ED. Then, the LED 342D is driven by the generated light emission driving controlling voltage ED.

Further, in the present fifth embodiment, the switch member 9D is connected between the coil 311D and the capacitor 341D of the resonance circuit 340RD. In particular, the fixed terminal piece 91 of the switch member 9D is connected to one end of the coil 311D, and the movable terminal piece 92 of the switch member 9D is connected to the other end of the coil 311D through the capacitor 341D.

Accordingly, when the switch member 9D is in an off state, since the resonance circuit 340RD is not formed, the electronic pen cartridge 3D is not placed into a state in which it is electromagnetically coupled to the sensor 210. Then, when the switch member 9D is placed into an on state, the resonance circuit 340RD is formed and the electronic pen cartridge 3D is placed into a state in which it is electromagnetically coupled to the sensor 210. In particular, in a state in which the core body portion 31D is accommodated in the housing 2M, the electronic pen cartridge 3D is not electromagnetically coupled to the sensor 210, but if the core body portion 31D is slidably moved by the knock mechanism until it is locked in a state in which the pen tip portion 313D thereof projects from the opening 2Ma of the housing 2M, then the electronic pen cartridge 3D is placed into a state in which it can be electromagnetically coupled to the sensor 210.

Further, in the present fifth embodiment, as depicted in FIG. 16, a control circuit 400D is provided in addition to the electronic circuit 34D on a printed board in the first tubular body portion 321D of the electronic pen cartridge 3D, and an ID (identification information) memory 401D and a wireless communication circuit 402D are provided on the printed board and connected to the control circuit 400D. Further, a power supply unit 403D is provided.

The ID memory 401D has identification information of the electronic pen cartridge 3D stored therein. The wireless communication circuit 402D is for performing wireless communication with a wireless communication circuit 234 provided on the position detection apparatus 200D of the present fifth embodiment. In the present example, the wireless communication circuit 402D and the wireless communication circuit 234 are configured from those that use a short range wireless communication technology, for example, of the Bluetooth (registered trademark) standard. It is a matter of course that the wireless communication circuit 402D and the wireless communication circuit 234 may be configured from those that use any other wireless communication technology.

The power supply circuit 403D is for the control circuit 400D, ID memory 401D and wireless communication circuit 402D and can be configured, for example, from a primary cell or a secondary cell. Further, the power supply circuit 403D may be a circuit that generates a power supply voltage to be supplied to the control circuit 400D, ID memory 401D and wireless communication circuit 402D from a voltage from a rectification circuit configuring the signal generation circuit 343D of the electronic circuit 34D. It is to be noted that, also in the electronic pen cartridge 3D in the present fifth embodiment, the power supply for the electronic circuit 34D need not be provided in the electronic pen cartridge 3D.

Further, as depicted in FIG. 16, the fixed terminal piece 91 and the movable terminal piece 92 of the switch member 9D are electrically connected to the control circuit 400D. The control circuit 400D supervises on/off states of the switch member 9D such that it recognizes, when the switch member 9D is in an off state, that the electronic pen cartridge 3D is in a state in which it entirely exists in the hollow portion of the housing 2M, but recognizes, when the switch member 9D is in an on state, that the electronic pen cartridge 3D is in a state in which the tip end of the pen tip portion 313D of the core body portion 31D thereof projects from the opening 2Ma of the housing 2M by the knock bar 42D (state in which the resonance circuit 340RD operates).

If the control circuit 400D recognizes that the switch member 9D is in an on state and the electronic pen cartridge 3D is in a state in which the tip end of the pen tip portion 313D of the core body portion 31D thereof projects from the opening 2Ma of the housing 2M (state in which the resonance circuit 340RD operates), then the control circuit 400D transmits the identification information stored in the ID memory 401D to the wireless communication circuit 234 of the position detection apparatus 200D through the wireless communication circuit 402D.

In the present example, to the electronic pen cartridge 3D, a function of a red pen for coloring a locus (character or figure), which is displayed in response to an indication position of the electronic pen cartridge 3D, in red is allocated; to the electronic pen cartridge 3E, a function of a green pen for coloring a locus, which is displayed in response to an indication position of the electronic pen cartridge 3E, in green is allocated; and to the electronic pen cartridge 3F, a function of a blue pen for coloring a locus, which is displayed in response to an indication position of the electronic pen cartridge 3F, in blue is allocated. Identification information stored in the ID memories 401D, 401E and 401F (ID memories 401E and 401F are not depicted) includes, in the present embodiment, not only information for identifying the electronic pen 1M or the electronic pen cartridges 3D, 3E and 3F themselves but also information for identifying the colors of characters of them, respectively.

Further, for the LED 342D of the electronic pen cartridge 3D, an LED that emits red light is used; for the LED 342E of the electronic pen cartridge 3E, an LED 342E that emits green light is used; and for the LED 342F of the electronic pen cartridge 3F, an LED 342F that emits blue light is used.

Accordingly, in the electronic circuit 34D of the electronic pen cartridge 3D, if the light emission driving controlling voltage ED obtained at the capacitor 3434 of the signal generation circuit 343D exceeds the threshold value Ethr for driving the LED 342D for red light emission, then the LED 342D emits red light. Further, in the electronic circuit 34E (not emitted) of the electronic pen cartridge 3E, if the light emission driving controlling voltage ED obtained at the capacitor 3434 of the signal generation circuit 343E exceeds the threshold value Ethg (Ethg>Ethr) for driving the LED 342E for green light emission, then the LED 342E emits green light. Further, in the electronic circuit 34F (not depicted) of the electronic pen cartridge 3F, if the light emission driving controlling voltage ED obtained at the capacitor 3434 of the signal generation circuit 343E exceeds the threshold value Ethb (Ethb>Ethg) for driving the LED 342F for blue light emission, then the LED 342F emits blue light.

In the case of the present fifth embodiment, in the position detection apparatus 200D that is used together with the electronic pen cartridges 3D, 3E and 3F, the wireless communication circuit 234 receives identification information transmitted by wireless transmission from the electronic pen cartridges 3D, 3E and 3F and supplies the received identification information to the process control circuit 233D. The process control circuit 233D performs, from the received identification information, predetermined processing based on information for identifying the electronic pen cartridges 3D, 3E and 3F themselves, and processes, on the basis of information for identifying the emission light colors included in the received identification information, a locus by the electronic pen cartridge 3D, which is inputted as an instruction through the sensor 210, as red drawing information. Further, the process control circuit 233D controls a light emission controlling signal to be sent out to the electronic pen 1M through the sensor 210.

In particular, if the information for identifying a emission light color included in the received identification information is identification information of red light emission, then the process control circuit 233 controls the sensor 210 to send out, to the electronic pen 1M, such light emission controlling signal that causes the light emission driving controlling voltage ED obtained at the capacitor 3434 of the electronic circuit 34D of the electronic pen cartridge 3D to exceed the threshold voltage Ethr for driving the LED for red light emission. Further, when the information included in the received identification information for identifying an emission light color is the identification information for green light emission, then the process control circuit 233 controls the sensor 210 to send out, to the electronic pen 1M, such a light emission controlling signal that causes the light emission driving controlling voltage ED, which is obtained at the capacitor 3434 of the electronic circuit 34E of the electronic pen cartridge 3E, to exceed the threshold voltage Ethg for driving the LED for green light emission. On the other hand, when the information included in the received identification information for identifying an emission light color is the identification information for blue light emission, the process control circuit 233 controls the sensor 210 to send out, to the electronic pen 1M, such a light emission controlling signal that causes the light emission driving controlling voltage ED, which is obtained at the capacitor 3434 of the electronic circuit 34F of the electronic pen cartridge 3F, to exceed the threshold voltage Ethb for driving the LED for blue light emission.

In the case of the present example, as a particular example for changeably controlling a light emission controlling signal in response to received identification information, if the information for identifying an emission light color included in the received identification information is the identification information for red light emission, then the process control circuit 233 sends out a light emission controlling signal LB1 formed from such a burst signal of the amplitude M1 as depicted in FIG. 13A similarly as in the example depicted in FIGS. 13A, 13B, 13C, 13D, 13E, 13F, 13G, 13H, 13I, 13J, 13K, and 13L. On the other hand, if the information for identifying an emission light color included in the received identification information is the identification information for green light emission, then the process control circuit 233 sends out a light emission controlling signal LB2 configured from a burst signal of such an amplitude M2 (M2>M1) as depicted in FIG. 13D. Further, when the information for identifying the emission light color included in the received identification information is the identification information for blue light emission, then the process control circuit 233 sends out a light emission controlling signal LB3 configured from such a burst signal of an amplitude M3 (M3>M2) as depicted in FIG. 13H.

It is to be noted that a particular example for changeably controlling the light emission controlling signal in response to received identification information is not limited to the case in which the amplitude of the light emission controlling signal is controlled as in the example described above, but the length of the signal duration or the repeat cycle of the burst signal as the light emission controlling signal may be used or a combination of two or more selected from the amplitude, length of the signal duration and repeat cycle of the burst signal as the light emission controlling signal may be changeably controlled similarly as in the embodiments described hereinabove.

[Operation of Electronic Pen Cartridges 3D, 3E and 3F and Position Detection Apparatus 200D]

In the following, operation of the electronic pen cartridges 3D, 3E and 3F of the electronic pen 1M and the position detection apparatus 200D in the present fifth embodiment is described. It is to be noted that, since the electronic pen cartridges 3D, 3E and 3F operate similarly to each other, description here is given of a case of the electronic pen cartridge 3D as an example.

The control circuit 400D of the electronic pen cartridge 3D supervises whether or not the switch member 9D is switched on by a knock operation (slidably moving operation) of the knock bar 42D by a user. If the control circuit 400D decides that the switch member 9D is switched on, then it decides that the electronic pen cartridge 3D is in a state in which it is fully accommodated in the housing 2M and does not perform wireless transmission of identification information.

If the knock bar 42D is subjected by the user to a knock operation (slidably moving operation) until the core body portion 31D of the electronic pen cartridge 3D is placed into a state in which the tip end of the pen tip portion 313D projects from the opening 2Ma of the housing 2M, then the switch member 9D of the electronic pen cartridge 3D is switched on to establish a state in which the resonance circuit 340RD is formed. If the control circuit 400D decides that the switch member 9D is switched on, then it starts wireless transmission of the identification information stored in the ID memory 401D through the wireless communication circuit 402D (S203).

Then, if the electronic pen 1M is brought close to the sensor 210 of the position detection apparatus 200D by the user, then the wireless communication circuit 234 of the position detection apparatus 200D receives the identification information from the electronic pen cartridge 3D and passes the identification information to the process control circuit 233D. The process control circuit 233D extracts information for identifying the emission light color of the LED from within the received identification information and decides that the emission light color of the LED 342D of the electronic pen cartridge 3D is red. Then, the process control circuit 233D sends out, from a result of the decision of the emission light color of the LED, a light emission controlling signal for causing the red LED to emit light, in this example a light emission controlling signal LB1 in the form of a burst signal of the amplitude M1 as depicted in FIG. 13B, from the sensor 210 toward the electronic pen 1M together with the position detection signals SBx and SBy.

In the electronic pen cartridge 3D of the electronic pen 1M, the resonance circuit 340RD receives the position detection signals SBx and SBy and the light emission controlling signal LB1 from the sensor 210 and feeds back them to the sensor 210 for a position detection process and a writing pressure detection process by the position detection apparatus 200D. Further, in the electronic pen cartridge 3D of the electronic pen 1M, the light emission controlling signal LB1 received by the resonance circuit 340RD is rectified and accumulated to generate a light emission driving controlling voltage ED as a voltage across the capacitor 3434 to cause the LED 342D for red to emit light.

If the electronic pen 1M is moved far away from the sensor 210 to cancel the electromagnetic coupling to the sensor 210 by the user, then the LED 342D of the electronic pen cartridge 3D is placed into an unlit state.

Further, if the core body portion 31D of the electronic pen cartridge 3D is returned by a knock operation by the user to the original state in which the pen tip portion 313D thereof is accommodated in the housing 2M, then the switch member 9D is switched off and the resonance circuit 340RD is turned off. Then, the control circuit 400D stops the transmission of the identification information on the basis that the switch member 9D is switched off.

Then, if the tip portion 313E or 313F of the core body portion 31E or 31F of a different electronic pen cartridge 3E or 3F is placed into a state in which it projects from the opening 2Ma of the housing 2M by a knock operation by the user in place of the electronic pen cartridge 3D, then the resonance circuit 340RE or 340RF is formed in the electronic pen cartridge 3E or 3F, and identification information of the same is transmitted by wireless transmission to the position detection apparatus 200D.

In the position detection apparatus 200D, the identification information from the electronic pen 1M is received through the wireless communication circuit 234 and passed to the process control circuit 233D. The process control circuit 233D decides, from the received identification information, the electronic pen cartridge 3E or 3F in which the resonance circuit 340RE or 340RF is formed and grasps the emission light color of the LED provided in the electronic pen cartridge 3E or 3F. Then, the process control circuit 233D sends out a light emission controlling signal LB2 or LB3 for driving the LED of the grasped emission light color to emit light from the sensor 210.

The electronic pen cartridge 3E or 3F that is projected at the tip portion 313E or 313F of the core body portion 31E or 31F thereof from the opening 2Ma of the housing 2M processes the signal received from the sensor 210 similarly to the electronic pen cartridge 3D described hereinabove such that the LED 342E or the LED 342F provided in the own cartridge is driven to emit light.

At this time, depending upon the light emission controlling signal LB2, also the LED 342D for red of the electronic pen cartridge 3D becomes capable of emitting light, and depending upon the light emission controlling signal LB3, also the LED 342D for red of the electronic pen cartridge 3D and the LED 342E for green of the electronic pen cartridge 3E become capable of emitting light. However, since a resonance circuit for receiving a signal from the sensor 210 is formed only in one electronic pen cartridge in which the tip portion of the core body portion is in a state in which it projects from the opening 2Ma of the housing 2M, LEDs in a plurality of electronic pen cartridges do not emit light.

In such a manner as described above, in the present fifth embodiment, if the core body portion of the electronic pen cartridge of the electronic pen 1M used by the knock mechanism is placed into a state in which the tip portion thereof projects from the opening 2Ma of the housing 2M, then the user can transmit a drawing color allocated to the electronic pen cartridge to the position detection apparatus 200D.

Further, in the present fifth embodiment, since the position detection apparatus 200D supplies a light emission controlling signal according to the drawing color of the recognized electronic pen cartridge to the electronic pen 1M through the sensor 210, an LED or LEDs of an emission light color according to the drawing color provided in the electronic pen cartridge, which is in a state in which the tip portion of the core body portion projects from the opening 2Ma of the housing 2M, are driven by a light emission controlling signal from the sensor 210 to emit light. Accordingly, the user can confirm the drawing color of the electronic pen cartridge, which is in a use state, from the emission light color of the LED.

It is to be noted that the present fifth embodiment may be combined with the second embodiment such that, in response to an electromagnetic coupling state between the electronic pen cartridge that is in a use state in which the tip portion of the core body portion of the electronic pen 1M projects from the opening 2Ma of the housing 2M and the sensor 210 of the position detection apparatus 200D, the position detection apparatus 200D changeably controls the light emission controlling signal, which is to be sent out from the sensor 210 to the electronic pen cartridge of the electronic pen 1M, for example, between a blinking state and a lit state. In this case, as the relation between the electronic pen cartridge and the sensor 210 of the position detection apparatus 200D, not only the electromagnetic coupling state but also the contact state with the sensor 210 as in the case of the third embodiment may be added.

It is to be noted that, in the second embodiment described hereinabove, although the switch members 9D, 9E and 9F are used as detection means for detecting a state in which the tip portion of the core body portion of any of the electronic pen cartridges 3D, 3E and 3F projects from the opening 2Ma of the housing 2M and another state in which any of the electronic pen cartridges 3D, 3E and 3F is entirely accommodated in the housing 2M, the detection means is not limited to them. For example, a switch that is switched on and off by a manipulation element provided on the housing 2M of the electronic pen 1M is provided, for example, on a side face of the first tubular body portion or the second tubular body portion of the electronic pen cartridge such that the switch is switched on or off by the user manipulating the operation element.

Further, in the fifth embodiment described hereinabove, the function allocated to the three electronic pen cartridges 3D, 3E and 3F may not only be such display color of a locus according to an indication position as in the example described hereinabove but also be the thickness of the locus or the type of a line to be displayed such as a solid line, a broken line or a chain line and so forth.

Further the present fifth embodiment can be applied not only to a case in which the three electronic pen cartridges 3D, 3E and 3F are accommodated in the housing 2M of the electronic pen 1M but also to another case in which an electronic pen cartridge is accommodated in the housing of the electronic pen.

Other Embodiments or Modifications

<First Example of Configuration of Mechanical Structure of Different Embodiment of Position Indicator>

It is a matter of course that the number and arrangement of light emitting elements to be provided in the position indicator according to the present disclosure are not limited to those of the configurations of the embodiments described above.

For example, in the case of in which the position indicator is such an electronic pen as described hereinabove, also it is possible to adopt such a configuration that a plurality of, for example, three or more light emitting elements are provided in one row in an axial direction of one electronic pen cartridge such that the number of light emitting elements to be caused to emit light from among the plurality of light emitting elements in the row is controlled as in the case of a so-called level indicator by a light emission controlling signal from the sensor 210 of the position detection apparatus 200.

Figures 17A, 17B:
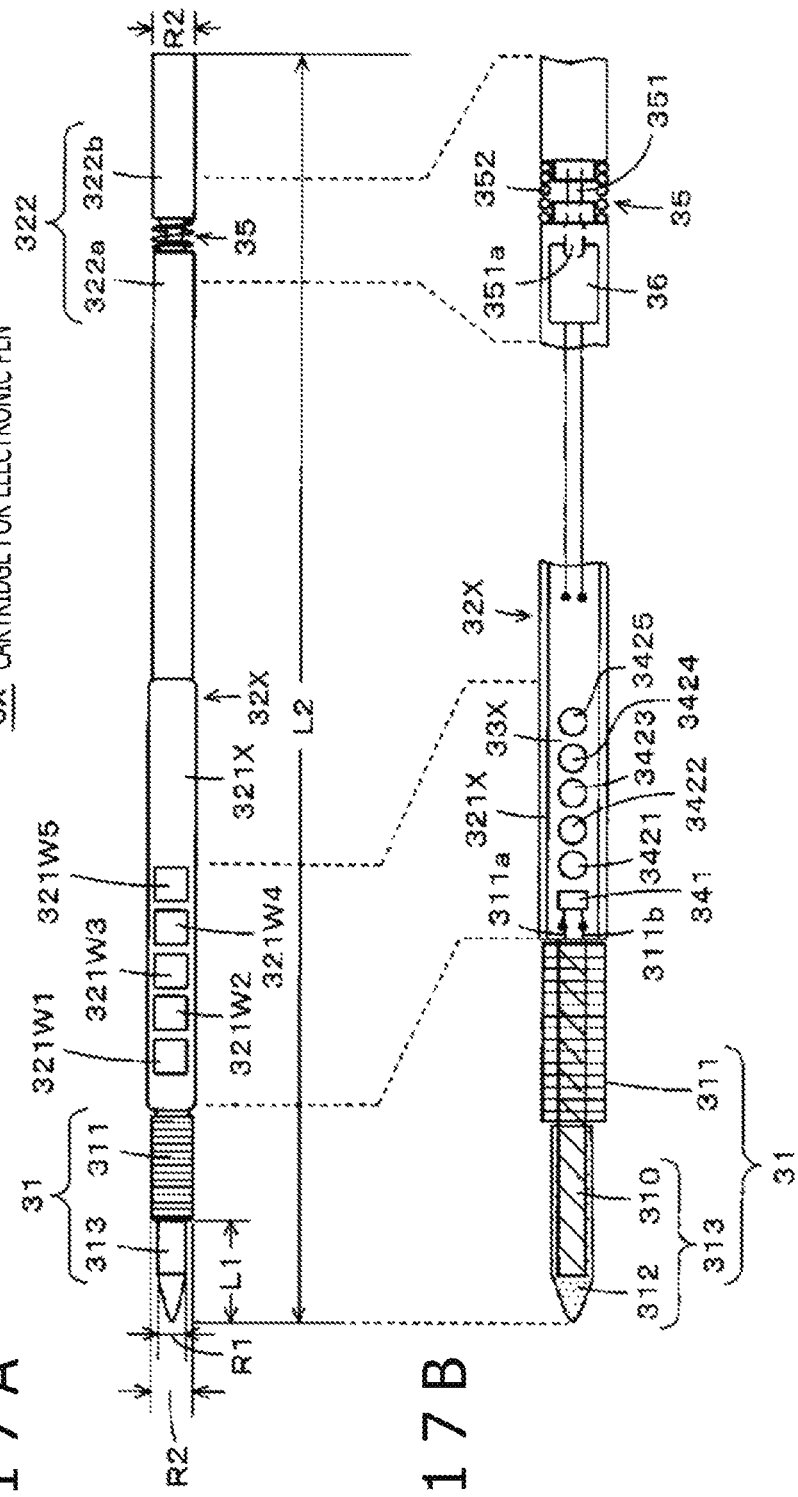
FIGS. 17A and 17B are views illustrating a first example of a configuration of a mechanical structure of a different embodiment of the position indicator according to the present disclosure.

FIG. 17 is a view depicting an example of an electronic pen cartridge 3X configured in such a manner as just described. In the electronic pen cartridge 3X of the present example, five LEDs 3421, 3422, 3423, 3424 and 3425 having emission light colors same as each other or different from each other are provided on a printed board 33X in a first tubular body portion 321X of a tubular body 32X in such a manner as to be lined up in a row in the axial direction as depicted in FIG. 17(B).

Further, on an outer circumferential portion of the first tubular body portion 321X of the tubular body 32X, window portions 321W1, 321W2, 321W3, 321W4 and 321W5 for making it possible to radiate emission light to the outside therethrough are formed in a lined up relation in one row in the axial direction such that they correspond to the five LEDs 3421, 3422, 3423, 3424 and 3425 lined up in the axial direction as depicted in FIG. 17(A), respectively.

Since the hardware configuration of the other part of the electronic pen cartridge 3X is similar to that of the electronic pen cartridge 3 or 3B depicted in FIGS. FIGS. 2A, 2B, and 2C or 10, such configuration portions are denoted by like reference characters to those of FIGS. 2A, 2B, and 2C or 10 and description of them is omitted.

Figure 18:
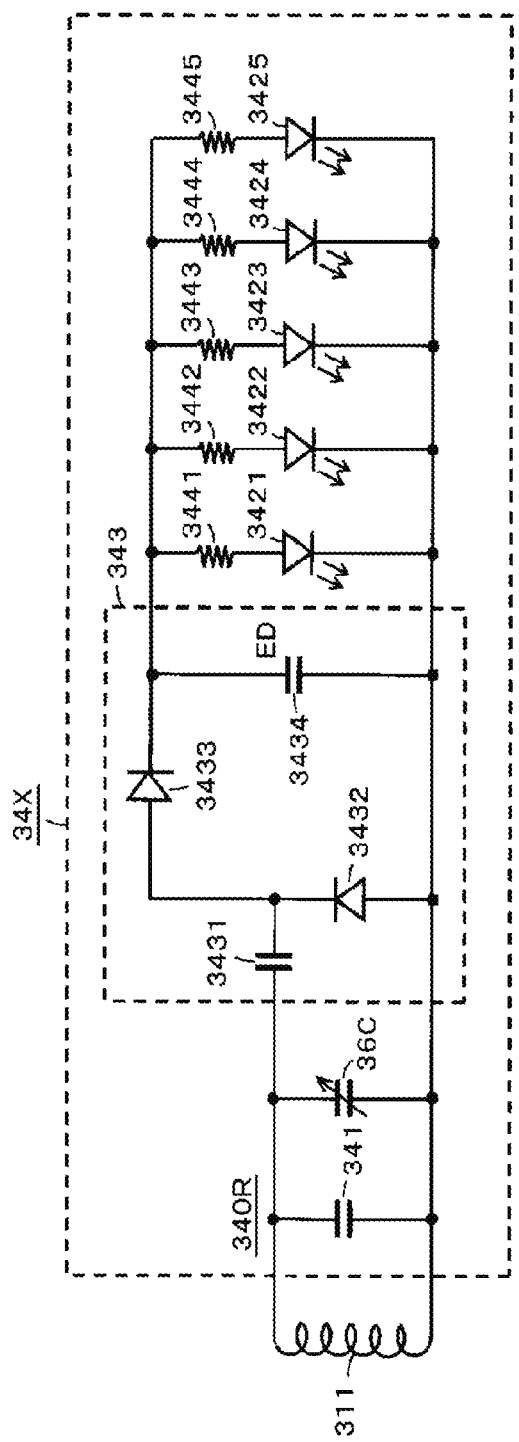
FIG. 18 is a view illustrating an example of an electronic circuit in the position indicator of the example of FIGS. 17A and 17B.

The electronic circuit 34X of the electronic pen cartridge 3X of the present example is configured, for example, in such a manner as depicted in FIG. 18. Referring to FIG. 18, since a resonance circuit 340R including a coil 311 and a signal generation circuit 343 for generating a light emission driving controlling signal are similar to those depicted in FIG. 3 or 11, such configuration portions are denoted by like reference characters to those of FIG. 3 or 11, and description of them is omitted. In the electronic circuit 34X of the present example, a series circuit of a resistor 3441 and an LED 3421, another series circuit of a resistor 3442 and an LED 3422, a further series circuit of a resistor 3443 and an LED 3423, a still further series circuit of a resistor 3444 and an LED 3424, and a yet further series circuit of a resistor 3445 and an LED 3425 are connected in parallel to a capacitor 3434.

In this case, where the resistance value of the resistor 3441 is represented by Ra; the resistance value of the resistor 3442 by Rb; the resistance value of the resistor 3443 by Rc; the resistance value of the resistor 3444 by Rd; and the resistance value of the resistor 3445 by Re, they have a relation of Ra<Rb<Rc<Rd<Re thereamong. In particular, in the present example, the values of the resistors 3441 to 3445 connected in series to the five LEDs 3421 to 3425 liked up in the axial direction are selected such that the value is lowest at the resistor near to the core body 31 and gradually increases as the position becomes farther from the core body 31.

Therefore, in the electronic circuit 34X, where the threshold voltages at which the LEDs 3421, 3422, 3423, 3424 and 3425 are driven to emit light are represented by Eth1, Eth2, Eth3, Eth4 and Eth5, respectively, then they have a relation of Eth1<Eth2<Eth3<Eth4<Eth5.

Accordingly, when the light emission driving controlling voltage ED that is an accumulation voltage of the capacitor 3434 of the electronic circuit 34X satisfies Eth1≤ED<Eth2, only the one LED 3421 emits light; when Eth2≤ED<Eth3, the two LEDs 3421 and 3422 emit light; when Eth3≤ED<Eth4, the three LEDs 3421, 3422 and 3423 emit light; when Eth4≤ED<Eth5, the four LEDs 3421, 3422, 3423 and 3424 emit light; and when Eth5≤ED, all of the five LEDs 3421 to 3425 emit light. In this manner, the number of LEDs to emit light from among the five LEDs 3421 to 3425 is controlled in response to the magnitude of the level value of the light emission driving controlling voltage ED thereby to provide such a display mode as in the case of a level indicator.

Since the light emission driving controlling voltage ED that is an accumulation voltage of the capacitor 3434 of the electronic circuit 34X depends upon the light emission controlling signal from the sensor 210, the five LEDs 3421 to 3425 of the electronic pen cartridge 3X are controlled such that the number of LEDs to emit light increases or decreases in response to the light emission controlling signal from the sensor 210 like a level indicator.

<Second Example of Different Embodiment of Configuration of Mechanical Structure of Position Indicator>

While, in the embodiments described above, the position indicator is configured such that the housing is of the pen type and an electronic pen cartridge is provided in the housing and besides a knock mechanism of a configuration similar to that of a ballpoint pen of a writing tool is provided, the present disclosure can be applied also to an electronic pen of a conventionally well-known configuration in which the core body portion is normally exposed to the outside from an opening of a pen type housing. In this case, the constituents including a core body accommodated in the housing, a coil wound around a magnetic core, a writing pressure detector and a printed board on which an electronic circuit is formed are not limited to those of a form of an electronic pen cartridge, and any configuration may be applied only if they are electromagnetically coupled to a position detection apparatus by an electromagnetic coupling method.

Further, it is a matter of course that, in this case, a light radiation portion (window portion) for emission light of a light emitting element may be provided at any one of the pen tip side of the housing of the electronic pen, an end portion at a side opposite to a pen tip side and a region portion between the pen tip side and the end portion at the side opposite to the pen tip side.

Figure 19:
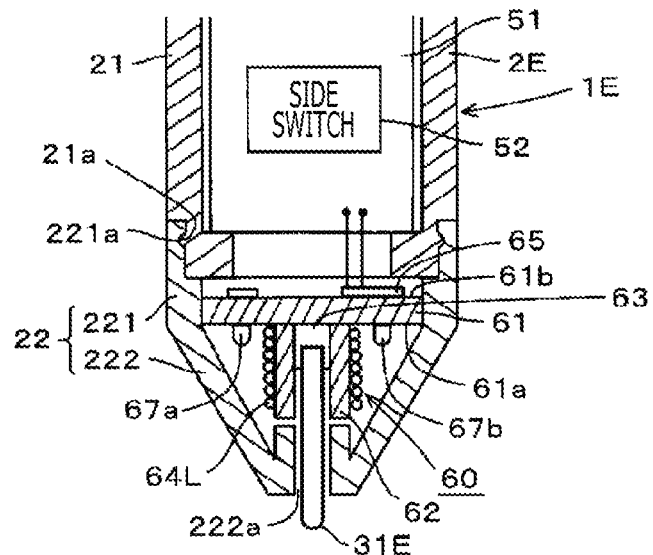
FIG. 19 is a view illustrating a second example of a configuration of a mechanical structure of the different embodiment of the position indicator according to the present disclosure.

FIG. 19 depicts part of an example of a configuration of an electronic pen 1E in which a light radiation portion is provided at the pen tip side. The electronic pen 1E of the present example includes a housing 2E having a pen-shaped appearance. The housing 2E is configured from a housing main body 21 configured from an insulator of a hollow tubular shape, in the present example, of a cylindrical shape, formed from an insulating material, for example, a synthetic resin, a sleeve 22 coupled to the pen tip side of the housing main body 21, and a lid portion not depicted in FIG. 19 coupled to an end portion of the housing main body 21 at the side opposite to the pen tip side.

In the hollow portion of the housing main body 21, a printed board 51 is disposed as depicted in FIG. 19. On the printed board 51, a side switch 52 is provided which is switched on and off by a manipulation portion (not depicted) exposed to the outside from a side circumferential face of the housing main body 21.

As depicted in FIG. 19, the sleeve 22 has an outer profile having such a shape that a tubular shape portion 221 having a fixed diameter and a truncated conical shape portion 222 are connected to each other, and is configured from a material having a light passing property and a light scattering property, for example, a resin having a light passing property and a light scattering property. Further, the sleeve 22 is configured for engagement at the tubular shape portion 221 thereof with the housing main body 21. Therefore, as depicted in FIG. 19, an annular engaging recessed portion 221a is formed on an inner circumferential face of the tubular shape portion 221 of the sleeve 22 and an annular engaging protrusion 21a is formed at a corresponding position of the housing main body 21. Further, a through-hole 222a in which the core body 31E is fitted is formed at a tip end (top end) of the truncated conical shape portion 222 of the sleeve 22 as depicted in FIG. 19.

Figure 20:
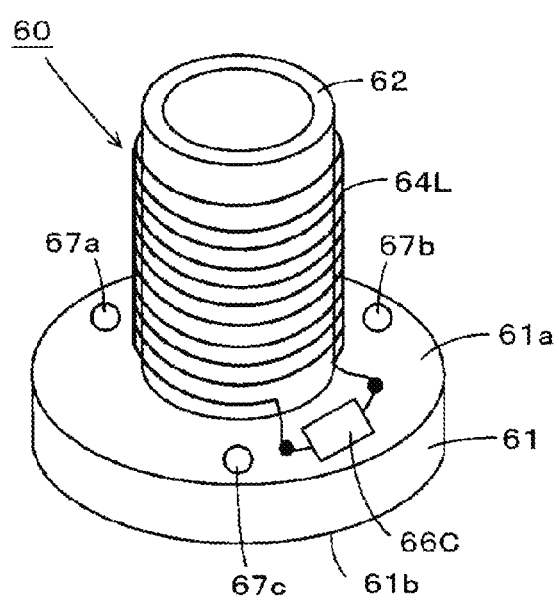
FIG. 20 is a view illustrating the second example of the configuration of the mechanical structure of the different embodiment of the position indicator according to the present disclosure.

Further, as depicted in FIG. 19, a processing module 60 formed as a module part including an electronic circuit including a light emitting element and a writing pressure detector is disposed in a hollow portion of the sleeve 22. FIG. 20 is a perspective view illustrating an example of a configuration of the processing module 60 and depicts the processing module 60 in a vertically reversed state from that of FIG. 19.

The processing module 60 includes a disk portion 61 and a tubular body portion 62 formed integrally, for example, from a resin. The tubular body portion 62 is provided at the center of one 61a of faces of the disk portion 61. Further, the processing module 60 is provided such that the disk portion 61 thereof is positioned at the tubular shape portion 221 of the sleeve 22 and the tubular body portion 62 is located in the truncated conical shape portion 222 of the sleeve 22. The processing module 60 is adhered at a circumferential face of the disk portion 61 thereof to the tubular shape portion 221 of the sleeve 22. The tubular body portion 62 is configured such that the inner diameter thereof is greater than an outer diameter of the core body 31E and a side opposite of the core body 31E to the pen tip side is inserted in the hollow portion of the tubular body portion 62.

Further, a writing pressure detector 63 is disposed at a bottom portion of the hollow portion of the tubular body portion 62. This writing pressure detector 63 is configured as a variable capacitor that uses writing pressure detection means of a well-known configuration described, for example, in Patent Document: Japanese Patent Laid-Open No. 2011-18090 and has a capacitance that varies in response to the writing pressure applied to the core body 31E. It is to be noted that the writing pressure detector 63 can be configured otherwise such that it uses such a semiconductor element that has a capacitance that varies in response to a writing pressure applied to the core body 31E as disclosed, for example, in Japanese Patent Laid-Open No. 2013-161307. It is to be noted that, while a detailed configuration of the writing pressure detector 63 is not depicted in FIG. 20, the writing pressure detector 63 is configured such that the core body 31E is fitted at the side opposite to the tip end portion thereof with the writing pressure detector 63 such that a writing pressure applied to the tip end portion side of the core body 31E is transmitted to the writing pressure detector 63.

In the electronic pen 1E of the present example, the processing module 60 is configured such that the disk portion 61 and the tubular body portion 62 thereof are configured from different materials and are integrated with each other. The disk portion 61 is configured from a resin that can play a role of a printed board as hereinafter described. Meanwhile, the tubular body portion 62 is configured, in the present example, from a material from which a magnetic core can be configured. For example, the tubular body portion 62 is configured from such a material that it is provided with a predetermined magnetic property by mixing magnetic power in the resin. Further, in the present example, a coil 64L that configures part of a resonance circuit is wound on an outer circumferential face of the tubular body portion 62 having a magnetic property.

As described hereinabove, the disk portion 61 of the processing module 60 is configured such that, in the present example, it has a role also as a printed board, and on a face 61b at a side opposite to the face 61a of the disk portion 61 on which the tubular body portion 62 is formed, an integrated circuit (IC) 65 including a circuit similar to the signal generation circuit 343 of the electronic circuit 34 in the embodiments described hereinabove is provided as depicted in FIGS. 19 and 20. An output terminal of the writing pressure detector 63 is electrically connected to the IC 65 through a through-hole formed in the disk portion 61.

Further, in the present example, as depicted in FIG. 20, the coil 64L is connected at one end and the other end thereof to the opposite ends of a capacitor 66C provided on the face 61a of the disk portion 61 such that a resonance circuit including a parallel circuit of the coil 64L and the capacitor 66C is configured. The resonance circuit is electrically connected at one end and the other end thereof to the IC 65 through a through-hole formed in the disk portion 61. It is to be noted that the capacitor 66C may be provided on the face 61b of the disk portion 61 and electrically connected to the one end and the other end of the coil 64L through the through-hole formed in the disk portion 61. Further, it is a matter of course that the capacitor 66C may be provided on the printed board 51 on which the side switch 52 is provided.

It is to be noted that, for detection of an on state or an off state of the side switch 52 by the position detection apparatus, a method for detecting the state as a variation of the resonance frequency of a resonance circuit can be adopted. In particular, part of a resonance circuit may be configured by connecting a series circuit formed by connecting a capacitor in series to the side switch in parallel to the coil 64L of the resonance circuit.

Further, in the present example, a plurality of light emitting elements, in the present example, three, LEDs 67a, 67b and 67c, are provided on the face 61a, on which the tubular body portion 62 is formed, of the disk portion 61 of the processing module 60 as depicted in FIGS. 19 and 20. The LEDs 67a, 67b and 67c may be LEDs of a same color or may be LEDs that emit light of the three primary colors of red, blue and green.

Further, each of the LEDs 67a, 67b and 67c may be configured from three LED elements individually emitting light of the primary colors of red, blue and green such that the emission light intensity of each of the three LED elements is controlled to allow emission of an arbitrary color by synthesis of the light of the three colors.

Though not depicted, the LEDs 67a, 67b and 67c and the IC 65 including the signal generation circuit are electrically connected to each other through through-holes formed in the disk portion 61.

It is to be noted that, while, in the present example, a plurality of light emitting elements are provided on the face 61a of the disk portion 61, a single light emitting element may be provided. Further, the number of plural light emitting elements is not limited to three but may be 2 or may be three or more. It is to be noted that preferably a plurality of light emitting elements are arranged at equal distances on a same concentric circle on the face 61a of the disk portion 61.

In the present example, since the sleeve 22 is configured from a material having a light passing property and a light scattering property, for example, from a resin having a light passing property and a light scattering property, if the three LEDs 67a, 67b and 67c emit light, then the emission light is radiated to the outside through the sleeve 22. In short, it looks from the outside that light is emitted from the sleeve 22. It is to be noted that the face 61a of the disk portion 61 of the processing module 60 and a side circumferential face of the tubular body portion 62 are in a mirror-finished state such that they reflect emission light of the LEDs 67a, 67b and 67c.

Since the electronic pen 1E of the present example is configured such that the sleeve 22 of the housing looks lighting in response to light emission of the light emitting element, also where the electronic pen is gripped at the housing thereof by a hand of a user, there is an advantageous effect that the user can observe the light emitting portion without being obstructed by its hand.

It is to be noted that the light emitting element and the electronic circuit provided in the electronic pen 1E of the present example are not limited to the configurations depicted in FIGS. 19 and 20, but it is a matter of course that any of the configurations of the light emitting element and the electronic circuit in the first to fifth embodiments described hereinabove can be applied.

<Third Example of Different Embodiment of Configuration of Mechanical Structure of Position Indicator>

While the second example described above is an example of an electronic pen configured such that a portion of the pen type housing at the pen tip side looks lighting in response to light emission of the light emitting element, it is possible to configure the electronic pen such that not part of the housing but the core body of the electronic pen looks lighting in response to light emission of the light emitting element.

Figure 21:
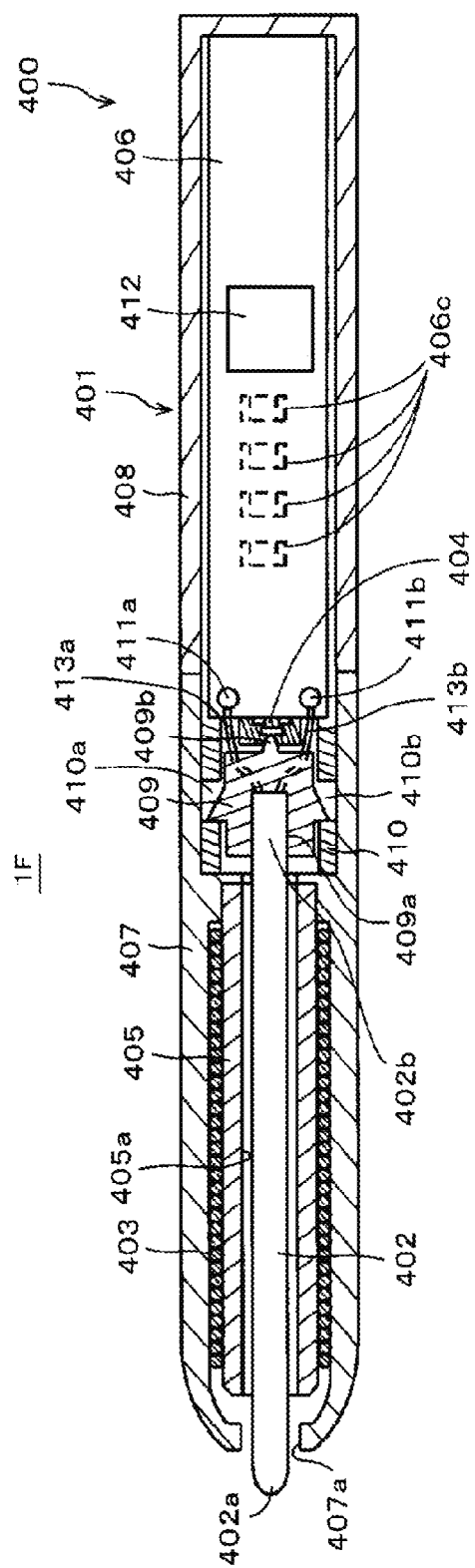
FIG. 21 is a view illustrating a third example of a configuration of a mechanical structure of the different embodiment of the position indicator according to the present disclosure.

FIG. 21 is a sectional view illustrating an example of a configuration of an electronic pen 1F configured such that the core body looks lighting. As depicted in FIG. 21, the electronic pen 1F of the present example includes, in a hollow portion of a tubular housing 401, a core body 402, a coil 403 wound around a ferrite core 405, a writing pressure detector 404 configured such that it uses a semiconductor element whose capacitance varies in response to a writing pressure applied to the core body 31E as disclosed, for example, in Japanese Patent Laid-Open No. 2013-161307, and a printed board 406. A resonance circuit is configured as a parallel circuit of the coil 403, a variable capacitor of the writing pressure detector 404 and a capacitor 406c provided on the printed board 406. It is to be noted that, for the capacitor 406c, a quantity (capacitance) of capacitors according to a resonance frequency of the resonance circuit is selected. For the writing pressure detector 404, a writing pressure detector may be used which is configured as a variable capacitor for which writing pressure detection means of a well-known configuration disclosed, for example, in Patent Document: Japanese Patent Laid-Open No. 2011-18090 is used and whose capacitance varies in response to a writing pressure applied to the core body.

The housing 401 is configured from a first case 407 and a second case 408 assembled and coupled in a superposed relation in the axial direction. The first case 407 has a cylindrical shape that has a substantially conical shape at one end side thereof in the axial direction, which is the pen tip side, and has an opening 407a at a tip end thereof. The second case 408 has a cylindrical shape closed at one end in the axial direction.

The ferrite core 405 has, for example, a cylindrical shape and has the core body 402 fitted in a tube hole 405a thereof. Further, a tip portion 402a of the core body 402 projects from the one end side in the axial direction of the ferrite core 405. The coil 403 that configures the resonance circuit is wound and mounted on an outer circumference of the ferrite core 407. The coil 403 is electrically connected at the opposite ends thereof not depicted to a variable capacitor configured from the writing pressure detector 404 and the capacitor 406c on the printed board 406 to configure a parallel resonance circuit.

The core body 402 is configured from a material having a light passing property and a light scattering property, for example, from a bar-shaped member made of a resin having a light passing property and a light scattering property. The core body 402 is fitted at an end portion 402b at the side opposite to the tip portion 402a with a fitting recessed portion 409a of a pressing member 409 for transmitting a writing pressure to the writing pressure detector 404. The pressing member 409 includes a protrusion 409b that fits with a recessed portion provided on the writing pressure detector 404. The pressing member 409 is disposed for movement in the axial direction of the housing 401 in a hollow portion of the holding portion 410 and transmits a pressure according to the writing pressure applied to the tip portion 402a of the core body 402 to the writing pressure detector 404.

Further, in the present example, the printed board 406 includes LEDs 411a and 411b as an example of a light emitting element and an IC 412 that includes a signal generation circuit for generating, by the resonance circuit, a light emission driving controlling voltage ED for driving the LEDs 411a and 411b to emit light on the basis of a signal received from the sensor of the position detection apparatus similarly to the afore-mentioned embodiments.

Further, in the present example, for the LEDs 411a and 411b, light guide tubes 413a and 413b each formed from an optical fiber are provided. The light guide tubes 413a and 413b are configured such that they are embedded at the side opposite thereto to the LEDs 411a and 411b in the pressing member 409 such that the LEDs 411a and 411b are exposed at tip ends of end portions thereof to the fitting recessed portion 409a such that emission light of the LEDs 411a and 411b is guided to the fitting recessed portion 409a of the pressing member 409.

Accordingly, if the LEDs 411a and 411b emit light with a light emission driving controlling voltage from the signal generation circuit of the IC 412, then the emission light is guided to the fitting recessed portion 409a of the pressing member 409 through the light guide tubes 413a and 413b, respectively. Since the core body 402 is configured from a resin having a light passing property and a light scattering property, the light guided to the fitting recessed portion 409a is radiated to the outside through the core body 402. Accordingly, if the LEDs 411a and 411b emit light, then the core body 402 operates such that the tip portion 402a thereof emits light depending upon the emission light.

Since the electronic pen 1F of the present example is configured such that the tip portion 402a side of the core body 402 looks lighting in response to light emission of the light emitting element, coupled with the fact that the user of the electronic pen performs a work while observing the pen tip, the user can observe the light emitting portion with certainty, and besides, there is an advantageous effect that also confirmation of the indication position by the electronic pen 1F is facilitated.

It is to be noted that also it is possible to omit the light guide tubes 413a and 413b by configuring the pressing member 409 from a member having a light passing property.

It is to be noted that the light emitting element and the electronic circuit provided in the electronic pen 1F of the present example are not limited to those of the configuration depicted in FIG. 21, but it is a matter of course that the configuration of any one of the light emitting element and the electronic circuit in the first to fifth embodiments described hereinabove can be applied.

<Fourth Example of Different Embodiment of Configuration of Mechanical Structure of Position Indicator>

Figure 22:
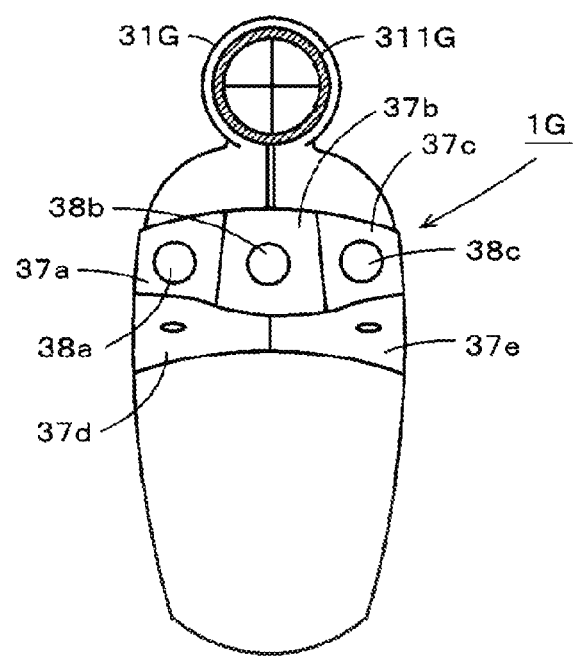
FIG. 22 is a view illustrating a fourth example of a configuration of a mechanical structure of the different embodiment of the position indicator according to the present disclosure.

Further, while the position indicator in the embodiments described hereinabove has a configuration of an electronic pen whose housing is of the pen type, the position indicator is not limited to that of the pen type configuration. For example, the position indicator may be, for example, a position indicator 1G having such an outer profile as depicted in FIG. 22. The configuration for position indication of the position indicator 1G of the example depicted in FIG. 22 to a position detection apparatus is similar to that of the position indicator disclosed, for example, in Japanese Patent Laid-Open No. 1993-210450 or Japanese Patent Laid-Open No. 1993-210453.

In the position indicator 1G of the present example, a coil 311G wound circularly is disposed on a circular index device 31G. Further, the position indicator 1G of present example includes five switch manipulation portions 37a, 37b, 37c, 37d and 37e as depicted in FIG. 22, and five switches (not depicted) controlled between on and off by the five switch manipulation portions 37a, 37b, 37c, 37d and 37e are provided in a housing of the position indicator 1G.

Further, though not depicted, in the housing of the position indicator 1G, a resonance circuit configured from a main capacitor connected in parallel to the coil 311G is provided, and the five capacitors are configured such that they are connected in parallel to the coil 311G through switches that are operated between on and off by the switch manipulation portions 37a, 37b, 37c, 37d and 37e. Accordingly, the resonance frequency of the resonance circuit is a frequency according to the state of the switches controlled between on and off by the switch manipulation portions 37a, 37b, 37c, 37d and 37e.

The position detection apparatus that is used together with the present position indicator 1G is configured such that it detects a signal fed back from the position indicator 1G to detect the position indicated by the index device 31G of the position indicator 1G and can detect, by detecting the frequency of a signal fed back from the position indicator 1G, which one of the switch manipulation portions 37a, 37b, 37c, 37d and 37e is operated.

Further, in the example of FIG. 22, light emission windows 38a, 38b and 38c are formed on the three switch manipulation portions 37a, 37b and 37c, respectively, in the position indicator 1G, and three light emitting elements, for example three LEDs that emit light of red, green and blue, are arranged at positions in the housing of the position indicator 1G corresponding to the light emission windows 38a, 38b and 38c.

Further, the position indicator 1G includes an electronic circuit in which the resonance circuit, signal generation circuit and three LEDs are connected is provided, for example, as depicted in FIG. 14.

In the position detection apparatus used together with the position indicator 1G of the present example, it is detected on the basis of a feedback signal from the position indicator 1G which one of the switch manipulation portions 37a, 37b and 37c is operated, and a light emission controlling signal according to the detected switch manipulation portion 37a, 37b or 37c is transmitted to the position indicator 1G.

When the position indicator 1G receives this light emission controlling signal, as described with reference to FIG. 14, it places the LED provided corresponding to the light emission window 38a, 38b or 38c of the switch manipulation portion 37a, 37b or 37c whose manipulation by the user has been detected in the position detection apparatus into a lit light emitting state. Accordingly, the user can recognize that the switch manipulation portion 37a, 37b or 37c manipulated by the user itself is detected by the position detection apparatus.

It is to be noted that the foregoing description of the position indicator 1G is one example, and the first to fourth embodiments described hereinabove can be applied also to the position indicator 1G.

<Different Example of Light Emission Controlling Mode of Position Indicator by Light Emission Controlling Signal from Position Detection Apparatus>

The embodiments described above are explained taking a case of a light emission controlling mode in which information of a coupling state between the position indicator and the sensor of the position detection apparatus is given by a light emission mode of the light emitting element. However, the light emission controlling mode of the position indicator of the present disclosure by the light emission controlling signal from the position detection apparatus is not limited to such a mode as described above, but various modes are possible including controlling processing of the position detection apparatus.

<<First Different Example of Light Emission Controlling Mode>>

Figure 23:
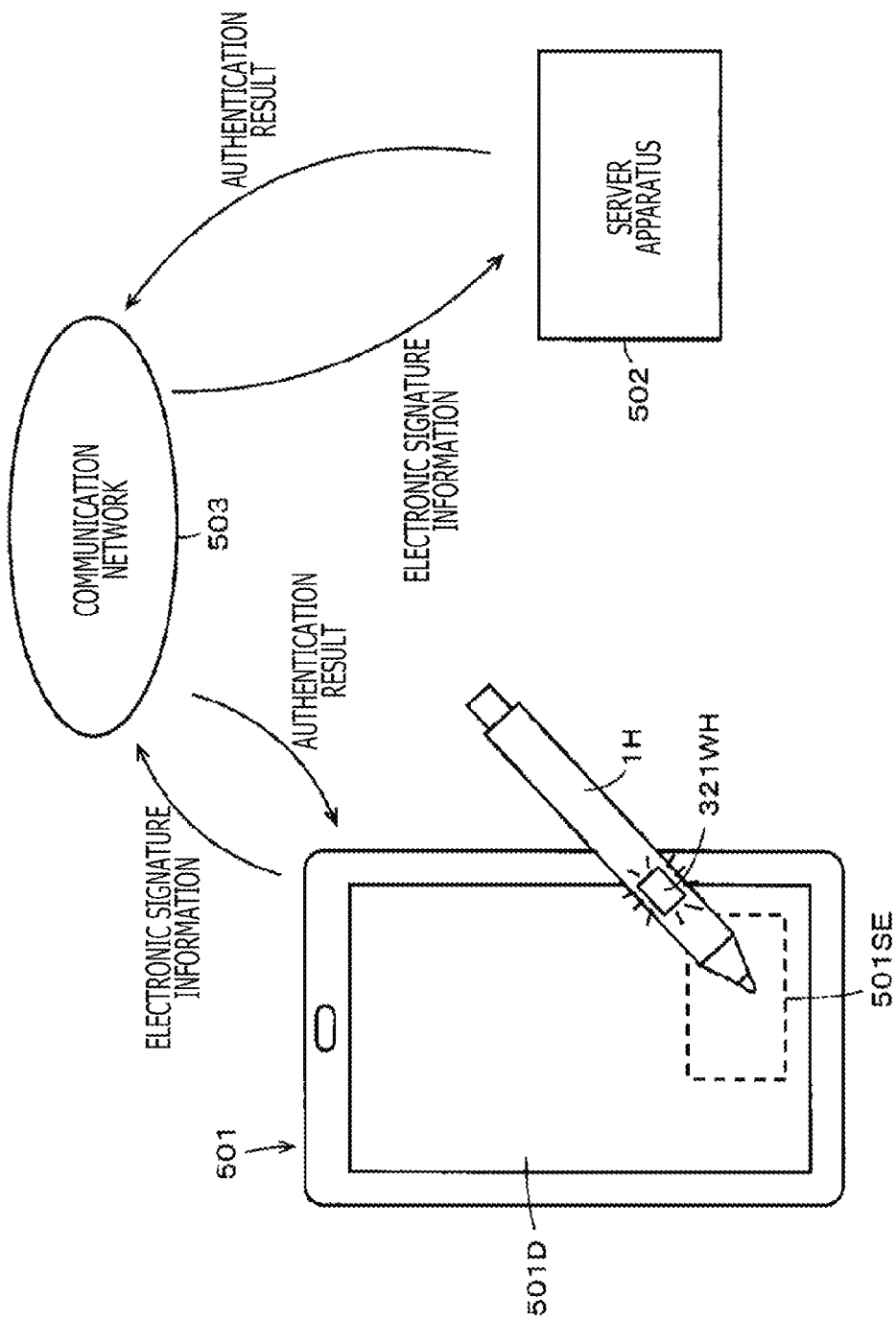
FIG. 23 is a view illustrating a first different example of a light emission control mode in the embodiment of the position indicator according to the present disclosure.

FIG. 23 is a view depicting an example of a system configuration illustrating a first example of a different embodiment of the light emission controlling mode of the position indicator by the light emission controlling signal from the position detection apparatus. As depicted in FIG. 23, this system includes a configuration of a cloud type system configured from an electronic pen 1H as an example of the position indicator according to the present disclosure, a portable personal computer 501 in which a position detection apparatus 200 (refer to FIG. 3; not depicted in FIG.

23) that includes a sensor 210 that electromagnetically couples to the electronic pen 1H is incorporated, and a server apparatus 502 connected to the portable personal computer 501 through a communication network 503.

The electronic pen 1H has, in the present example, a configuration similar to that of the electronic pen of the fourth embodiment described hereinabove, and includes three LEDs that emit light of emission light colors of red, green and blue depicted in FIG. 14 and further includes an electronic circuit similar to the electronic circuit 34C such that the LEDs can emit light of the emission light colors of red, green and blue and the three LEDs can be driven switchably. The electronic pen 1H further includes a window portion 321WH as an example of a light radiation portion for radiating emission light from any of the three LEDs to the outside therethrough.

The portable personal computer 501 is configured, in the present example, from that of a type called tablet PC or pad type PC, and includes a display apparatus configured from a liquid crystal display (LCD) or the like having a display screen 501D and further includes a sensor that electromagnetically couples to the electronic pen 1H. The portable personal computer 501 further includes a position detection apparatus 200 (not depicted) configured so as to supply a light emission controlling signal to the electronic pen 1H. Further, in the present example, the portable personal computer 501 includes a wireless communication circuit for connecting to the server apparatus 502 through the communication network 503.

Further, the portable personal computer 501 includes an application program by which a user uses the electronic pen 1H to perform hand-written inputting including an electronic signature. Further, when the application program is in operation, as depicted in FIG. 23, if an electronic signature by hand-written inputting is performed into an electronic signature inputting field 501SE displayed on the display screen 501D, then the portable personal computer 501 sends the signature information to the server apparatus 502 through the communication network 503 and issues an authentication request to the server apparatus 502 to acquire an authentication result from the server apparatus 502. In particular, the portable personal computer 501 of the present example does not by itself perform authentication of an electronic signature but requests the server apparatus 502 to authenticate the electronic signature and acquire a result of the authentication.

In the server apparatus 502, an electronic signature of a user of the portable personal computer 501 is registered in an associated relation with identification information of the user in advance and is stored in the storage unit. The identification information of the user is, for example, a user ID and a password. The server apparatus 502 receives a user ID, a password and electronic signature information sent thereto from the portable personal computer 501, reads out electronic authentication information stored in the storage unit and associated with the same user ID and password, compares the received electronic signature information and the read out electronic signature information with each other and decides availability of the authentication depending upon whether or not they coincide with each other. Then, the server apparatus 502 transmits "authentication OK" or "authentication NG" as a result of the decision of the availability of the authentication as a reply to the portable personal computer 501 through the communication network 503.

The portable personal computer 501 generates a light emission controlling signal for controlling light emission of the light emitting element of the electronic pen in response to the authentication result received from the server apparatus 502, and transmits the light emission controlling signal to the electronic pen 1H through the sensor 210 (not depicted) in such a manner as described above. The electronic pen 1H receives the light emission controlling signal from the sensor 210 by the resonance circuit thereof as described hereinabove, and in the electronic pen 1H, the signal generation circuit of the electronic circuit generates a light emission driving controlling voltage from the received light emission controlling signal to perform light emission control of the light emitting element.

Figure 24:
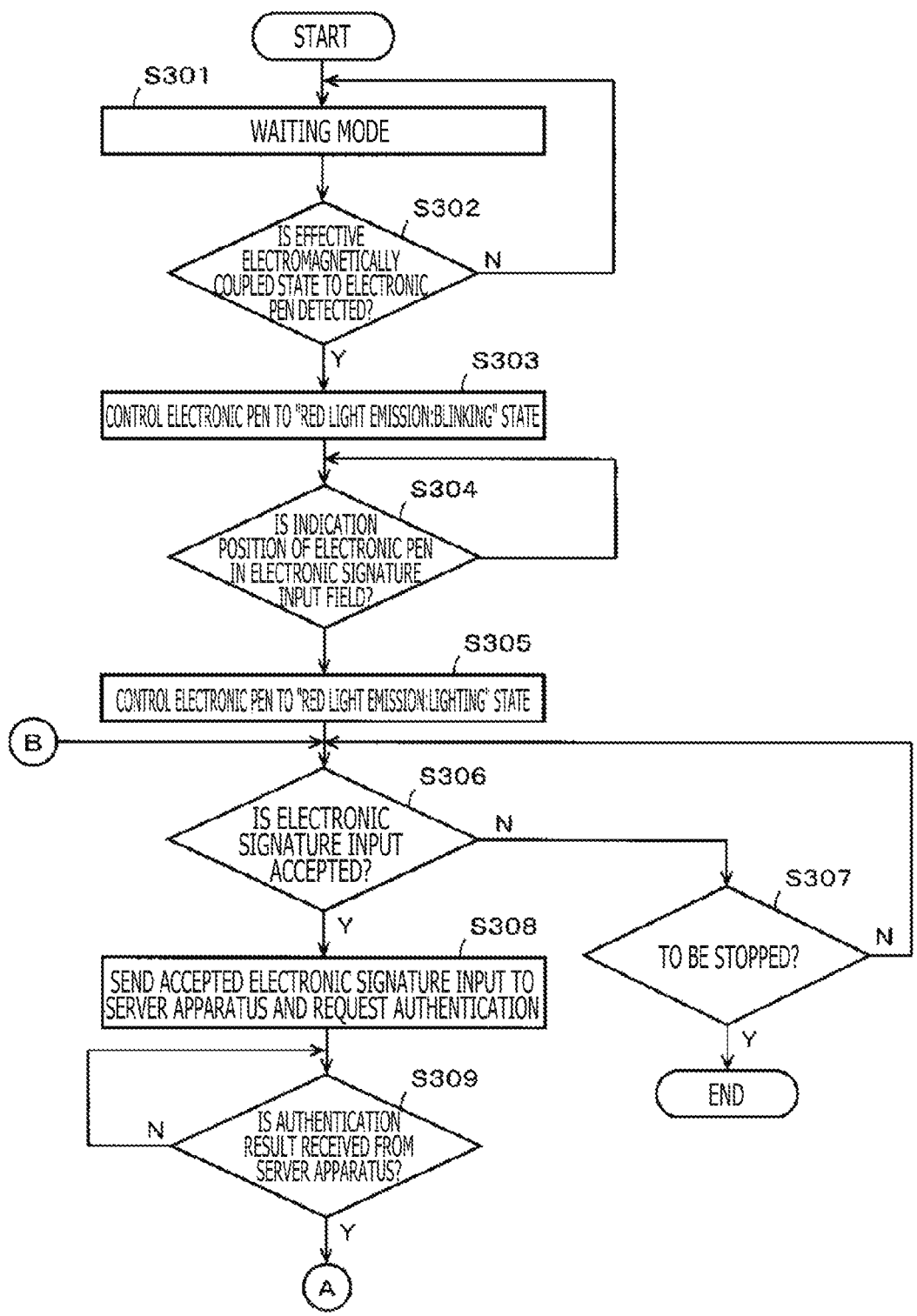
FIG. 24 is a view depicting part of a flow chart illustrating the first different example of the light emission control mode in the embodiment of the position indicator according to the present disclosure.
Figure 25:
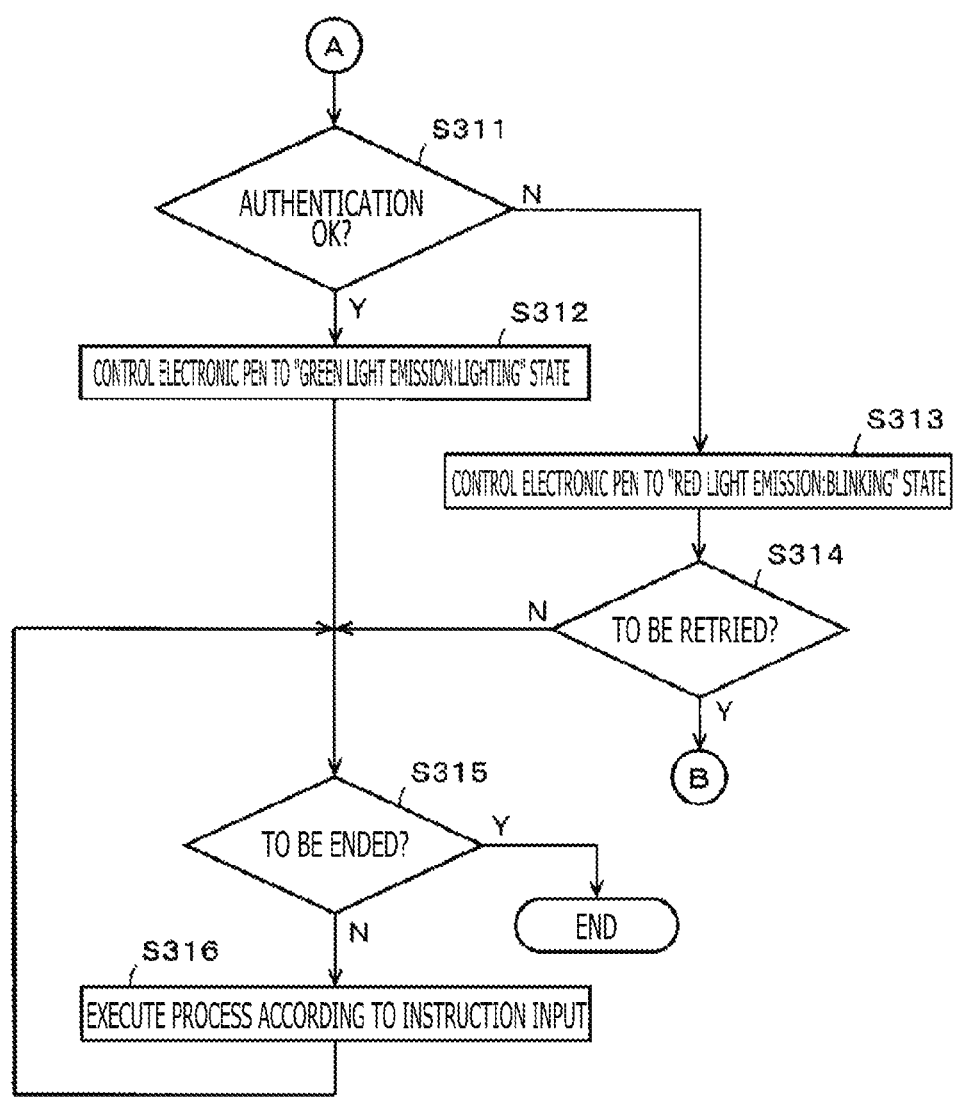
FIG. 25 is a view depicting part of the flow chart illustrating the first different example of the light emission control mode in the embodiment of the position indicator according to the present disclosure.

FIGS. 24 and 25 depict an example of a flow of light emission controlling operation of the light emitting element of the electronic pen 1H by the portable personal computer 501 in such a system as described above. In the present example, the portable personal computer 501 operates in an interlocked relation with the position detection apparatus 200. It is to be noted that the flow charts of FIGS. 24 and 25 indicate a processing routine started simultaneously by the portable personal computer 501 when an application program including an electronic signature to be hand-written inputted using the electronic pen 1H by the user, and are executed principally through cooperation of the above-described process control circuit 233 (refer to FIG. 3; not depicted in FIG. 23) of the position detection apparatus 200 and the main control unit (microprocessor) of the portable personal computer 501. In the following description, it is described that the light emission controlling operation is executed only by the process control circuit 233 for the convenience of description.

The process control circuit 233 of the position detection apparatus 200 of the portable personal computer 501 first executes a waiting mode before the sensor 210 enters an effective electromagnetic coupling state to the electronic pen 1H (S301). In the present example, in the waiting mode, the process control circuit 233 does not transmit a light emission controlling signal to the electronic pen 1H.

The process control circuit 233 of the position detection apparatus 200 decides, in the present waiting mode, whether or not the electronic pen 1H comes close to the sensor 210 until the electronic pen 1H and the sensor 210 enter an effective electromagnetic coupling state by supervising the voltage induced in the loop coil of the sensor 210 as described hereinabove (S302).

Then, if it is decided at S302 that the electronic pen 1H and the sensor 210 are not in an effective electromagnetic coupling state as yet, then the process control circuit 233 returns the processing to S301 to repeat S301 and S302.

If it is decided at S302 that the electronic pen 1H and the sensor 210 are in an effective electromagnetic coupling state, then the process control circuit 233 controls the sensor 210 to send out, to the electronic pen 1H, a light emission controlling signal for causing the light emitting element to emit light but blink in red (S303).

Then, the process control circuit 233 detects and supervises the position indicated by the electronic pen 1H to decide whether or not the indication position of the electronic pen 1H is within the electronic signature inputting field 501SE (S304). If it is decided that the indication position of the electronic pen 1H is not within the electronic signature inputting field 501SE, then the process control circuit 233 continues the supervision of the indication position of the electronic pen 1H.

If it is decided at S304 that the indication position of the electronic pen 1H is within the electronic signature inputting field 501SE, then the process control circuit 233 controls the sensor 210 to send out a light emission controlling signal for causing the light emitting element to be lit and emit light in red to the electronic pen 1H such that the light emitting element of the electronic pen 1H is changed from blinking in red to lighting (S305).

Then, the process control circuit 233 decides whether or not an electronic signature input by the electronic pen 1H is accepted (S306), and if it is decided that an electronic signature input is not accepted, then the process control circuit 233 decides whether or not a stopping instruction input is accepted (S307). If it is decided at S307 that a stopping instruction input is accepted, then this processing routine is ended, but if it is decided that a stopping instruction input is not accepted, then the process control circuit 233 returns the processing to S306.

Then, if it is decided at S306 that an electronic signature input is accepted, then the process control circuit 233 transmits the accepted electronic signature input information to the server apparatus 502 through the communication network 503 and issues a request for authentication to the server apparatus 502 (S308). It is to be noted that the electronic signature input information includes identification information of the user (user ID, password and so forth) inputted in advance or inputted at a similar timing to that of the electronic signature input.

Then, the process control circuit 233 waits for reception of an authentication result from the server apparatus 502 (S309), and if reception of an authentication result from the server apparatus 502 is decided, then the process control circuit 233 scrutinizes the substance of the authentication result to decide whether or not the authentication result is "authentication OK" (S311 of FIG. 25).

If it is decided at S311 that the authentication result is "authentication OK," then the process control circuit 233 controls the sensor 210 to send out a light emission controlling signal for causing the light emitting element to be lit and emit light in green to the electronic pen 1H (S312). Consequently, in the electronic pen 1H, the window portion 321WH is lit and emits light in green to notify the user that the authentication is OK. It is a matter of course that also the display screen 501D of the portable personal computer 501 may additionally perform display for the notification of the authentication OK. It is to be noted that, when a predetermined period of time within which the user can confirm the authentication OK, for example, a period of approximately 30 seconds, elapses, the process control circuit 233 stops the sending out of the light emission controlling signal for causing the light emitting element of the electronic pen 1H to be lit and emit light in green for "authentication OK" to turn off the light emitting element of the electronic pen 1H.

If it is decided at S311 that the authentication result is not "authentication OK," then the process control circuit 233 controls the sensor 210 to send out a light emission controlling signal for causing the light emitting element to emit light but block in red to the electronic pen 1H (S313). The blinking light emission in red in this case is made different in blinking cycle from blinking light emission in red at S303 such that they can be distinguished from each other. Consequently, in the electronic pen 1H, the window portion 321WH emits light and blinks in red to notify the user that the authentication results in NG. It is a matter of course that, even on the display screen 501D of the portable personal computer 501, display for the notification of the authentication NG may be performed additionally.

Subsequently to S313, the process control circuit 233 decides whether or not an instruction input for retry is performed (S314). If it is decided at S314 that an instruction input for retry is performed, then the process control circuit 233 returns the processing to S306 of FIG. 24 to repeat the processes beginning with S306.

If it is decided at S314 that an instruction input for retry is not performed, or subsequently to S312, the process control circuit 233 decides whether or not an ending instruction input is performed (S315), and if it is decided that an ending instruction input is performed, then this processing routine is ended.

Meanwhile, if it is decided at S315 that an ending instruction input is not performed, then the process control circuit 233 executes a process according to the instruction input (S316), and after the process at S316 ends, the process control circuit 233 returns the processing to S315 to wait for an ending instruction input.

In this manner, according to the first different example described above, the user can confirm whether authentication of an electronic signature input results in success from light emission of the light emitting element of the electronic pen 1H, which is very convenience.

<<Second Different Example of Light Emission Controlling Mode>>

For example, in a membership service, in order to prevent criticism of members or increase opportunities of service enjoyment by members, it is customary to prepare a plurality of member stages (or member levels: hereinafter referred to only as member stages) among which the service details enjoyable by a member are made different depending upon the length of subscription period of a member, a service usage frequency, an amount of money paid in service usage and so forth. For example, the following system is available. In particular, a member whose membership period is less than three months from joining is determined as initial member (first stage); a member whose membership period is longer than three months can be determined as normal member (second stage); and a member whose membership period is longer than three years can be determined as premium member (third stage), and a user can acquire weighting points according to each member stage or can enjoy benefits according to each member stage.

In the case of a member of such a service as described above, it is convenient if to which member stage the member itself belongs can be known readily. This second different example is an example of a case in which a light emitting element of an electronic pen emits light for the notification of a member stage.

Also a system in the case of the present second example can be made quite similar to that depicted in FIG. 23. However, in the case of the second different example, the server apparatus 502 has a configuration of a providing server of such a membership service as described above and has a member stage stored therein in an associated relation with identification information of each member (for example, a user ID and a password).

Further, in the present second different example, the portable personal computer 501 includes an application program for enjoying such a membership service as described above, and if the application program is started to access the server apparatus 502 through the communication network 503 (including the Internet), then the user ID and the password are sent from the portable personal computer 501 to the server apparatus 502. The server apparatus 502 collates the received user ID and password with the user ID and password registered in advance to perform membership authentication. If the server apparatus 502 decides that the membership authentication is OK, then the server apparatus 502 transmits information of a member stage of the user who is the member to the portable personal computer 501.

The portable personal computer 501 generates a light emission controlling signal to be supplied to the electronic pen 1H in response to the member stage received and acquired from the server apparatus 502 and supplies the light emission controlling signal to the electronic pen 1H. The electronic pen 1H drives the light emitting element with a light emission driving controlling voltage generated in response to the light emission controlling signal such that light is emitted in a light emission mode according to the member stage.

Figure 26:
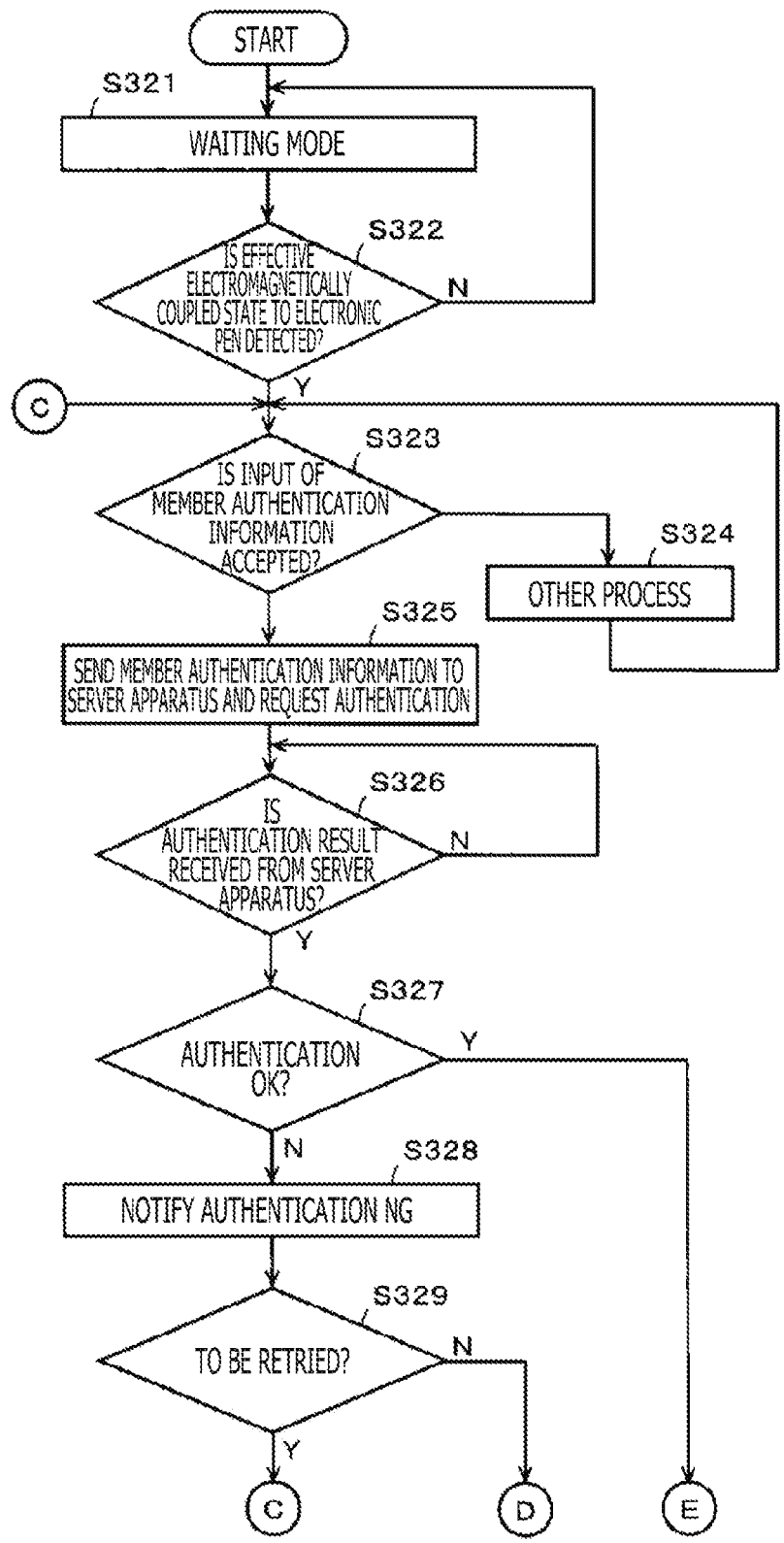
FIG. 26 is a view depicting part of a flow chart illustrating a second different example of the light emission control mode in the embodiment of the position indicator according to the present disclosure.

FIGS. 26 and 27 depict an example of a flow of light emission controlling operation of the light emitting element of the electronic pen 1H by the portable personal computer 501 in the present second different example, and the portable personal computer 501 operates in an interlocking relation with the position detection apparatus 200 similarly as in the first different example described hereinabove. The flow charts of FIGS. 26 and 27 depict a processing routine started simultaneously when an application program for a membership service is started using the electronic pen 1H by the user. Although the processing routine is executed by cooperation of the above-described process control circuit 233 (refer to FIG. 3) of the position detection apparatus 200 and the main control unit (microprocessor) of the portable personal computer 501, it is described that the processing routine is executed only by the process control circuit 233 for the convenience of description similarly as in the first example.

The process control circuit 233 of the position detection apparatus 200 of the portable personal computer 501 first executes a waiting mode before the sensor 210 enters an effective electromagnetic coupling state with the electronic pen 1H (S321). In the present example, in the waiting mode, the process control circuit 233 does not transmit a light emission controlling signal to the electronic pen 1H.

The process control circuit 233 of the position detection apparatus 200 decides, in the present waiting mode, similarly as in the first different example, whether or not the electronic pen 1H comes close to the sensor 210 until the electronic pen 1H and the sensor 210 are placed into an effective electromagnetic coupling state (S322). Then, if it is decided at S322 that the electronic pen 1H and the sensor 210 are not placed into an effective electromagnetic coupling state as yet, then the process control circuit 233 returns the processing to S321 to repeat S321 and S322.

If it is decided at S322 that the electronic pen 1H and the sensor 210 are placed into an effective electromagnetic coupling state, then the process control circuit 233 supervises the indication position of the electronic pen 1H and decides whether or not an input to an input field for a user ID and a password and an input for service starting instruction are accepted as information for membership authentication (S323).

If it is decided at S323 that an input of information for membership authentication is not accepted, then the process control circuit 233 performs some other process (S324), whereafter the processing is returned to S323 to repeat the processes beginning with S323. On the other hand, if it is decided at S323 that an input of information for membership authentication is accepted, then the process control circuit 233 sends the accepted information for membership authentication to the server apparatus 502 through the communication network 503 and issues a request for membership authentication to the server apparatus 502 (S325).

The server apparatus 502 decides whether or not membership authentication results in success in regard to whether or not the user is a member using the user ID and the password in the information for membership authentication. Then, if the membership authentication results in success (authentication OK), then the server apparatus 502 transmits information of the member stage of the member to the portable personal computer 501 through the communication network 503. On the other hand, when the membership authentication results in failure (authentication NG), the server apparatus 502 transmits the information of the authentication NG to the portable personal computer 501 through the communication network 503.

The process control circuit 233 of the position detection apparatus 200 of the portable personal computer 501 waits for reception of an authentication result from the server apparatus 502 (S326), and if reception of an authentication result is decided, then the process control circuit 233 decides whether or not the authentication result is authentication OK (S327). If it is decided at S327 that the authentication result is not authentication OK, then the process control circuit 233 sends out a light emission controlling signal for causing the light emitting element to emit light but blink in red to the electronic pen 1H to notify that the membership authentication results in failure and further causing the portable personal computer 501 to display that the authentication result is authentication NG on the display screen 501D for the notification (S328).

Subsequently to this S328, the process control circuit 233 decides whether or not an instruction input for retry is performed (S329). If it is decided at S329 that an instruction input for retry is performed, then the process control circuit 233 returns the processing to S323 to repeat the processes beginning with S323.

If it is decided at S329 that an instruction input for retry is not performed, then the process control circuit 233 decides whether or not an ending instruction input is performed (S335 of FIG. 27), and if it is decided that an ending instruction input is performed, then the process control circuit 233 ends this processing routine. On the other hand, if it is decided at S335 that an ending instruction input is not performed, then the process control circuit 233 executes a process according to the instruction input (S336) and returns, after the process comes to an end, the processing to S335 to wait for an ending instruction input.

If it is decided at S327 that the authentication result is authentication OK, then the process control circuit 233 refers to information of the member stage included in the return information from the server apparatus 502 to decide the member stage of the authenticated member (S331 of FIG. 27).

Then, if it is decided as a result of the decision at S331 that the member stage is the initial member (first stage), then the process control circuit 233 controls the sensor 210 to send out a light emission controlling signal for causing the light emitting element to be lit and emit light in red to the electronic pen 1H such that it notifies the user of the electronic pen 1H that the member stage is the initial member (first stage) (S332).

On the other hand, if it is decided as a result of the decision at S331 that the member stage is the normal member (second stage), then the process control circuit 233 controls the sensor 210 to send out a light emission controlling signal for causing the light emitting element to be lit and emit light in green to the electronic pen 1H such that it notifies the user of the electronic pen 1H that the member stage is the normal member (second stage) (S333).

Furthermore, if it is decided as a result of the decision at S331 that the member stage is the premium member (third stage), then the process control circuit 233 controls the sensor 210 to send out a light emission controlling signal for causing the light emitting element to be lit and emit light in blue to the electronic pen 1H such that it notifies the user of the electronic pen 1H that the member stage is the premium member (third stage) (S334).

The process control circuit 233 continues the process for controlling the emission light color of the light emitting element of the electronic pen 1H as at S332, S333 and S334 as a result of the decision at S331 until the application program of the membership service comes to an end. It is to be noted that also it is a matter of course that the decided member stage may be displayed additionally also on the display screen 501D of the portable personal computer 501.

Then, subsequently to S332, S333 or S334, the process control circuit 233 advances the processing to S335, at which it decides whether or not an ending instruction input is performed. If it is decided that an ending instruction input is performed, then this processing routine is ended. On the other hand, if it is decided at S335 that an ending instruction input is not performed, then the process control circuit 233 executes a process according to the instruction input (S336), and after the process comes to an end, the process control circuit 233 returns the processing to S335 to wait for an ending instruction input.

In this manner, according to the second different example described above, when an application program for a membership service is started, the user can confirm it from an emission light color of the light emitting element of the electronic pen 1H to which member stage the user itself belongs in the membership service, which is very convenient.

<Other Modifications>

It is to be noted that, while, in the electronic pens of the embodiments described above, the light emitting element is disposed at a pen tip side or at an intermediate position of the housing, the light emitting element may otherwise be provided at an end portion side or at an end portion at the side opposite to the pen tip side. Further, while the radiation portion for radiating emission light of the light emitting element to the outside merely is a window portion, also it is possible to apply a specific character, a logo mark or the like by printing to a portion corresponding to the window portion such that the character or the log mark looks as if it is lifted up by light emission of the light emitting element.

Further, while the embodiments described above are directed to an example in which an LED is used for the light emitting element, the light emitting element is not limited to an LED, but it is a matter of course that other light emitting elements can be used.

DESCRIPTION OF REFERENCE SYMBOLS 1, 1B, 1C, 1G, 1M . . . Electronic pen, 2, 2M . . . Housing, 3, 3B, 3C, 3D, 3E, 3F . . . Electronic pen cartridge, 4 . . . Knock cam mechanism, 200 . . . Position detection apparatus, 210 . . . Sensor, 311 . . . Coil, 340R . . . Resonance circuit, 341 . . . Capacitor, 342, 342r, 342g, 342b, 342D . . . LED, 343, 343D . . . Signal generation circuit

The invention claimed is:

1. A position indicator, comprising:
a light emitting element;
a resonance circuit including a coil which, in operation, transmits and receives a signal to and from a sensor of a position detection apparatus, and a first capacitor connected in parallel to the coil; and
a signal generation circuit including a second capacitor that is different from the first capacitor and is connected in parallel to the coil, wherein the second capacitor, in operation, accumulates power of the signal received from the sensor by the resonance circuit, and the signal generation circuit, in operation, generates a light emission driving controlling signal that drives and controls the light emitting element to emit light based on the power accumulated by the second capacitor; and
a circuit configured to store identification information of the position indicator and transmit the stored identification information to the position detection apparatus,
wherein the light emitting element is driven and controlled by the light emission driving controlling signal generated by the signal generation circuit to perform light emission control of the light emitting element by the position detection apparatus,
wherein the signal from the sensor of the position detection apparatus includes a position detection signal that is detected as a feedback signal from the position indicator by the sensor and a light emission controlling signal that controls light emission of the light emitting element; and
wherein the signal generation circuit receives the signal including the position detection signal and the light emission controlling signal received by the resonance circuit and generates the light emission driving controlling signal based on the received signal including the position detection signal and the light emission controlling signal,
wherein the position detection apparatus transmits the signal according to the received identification information as the light emission controlling signal from the sensor; and
wherein the signal generation circuit generates the light emission driving controlling signal using the signal according to the identification information.

2. The position indicator according to claim 1, wherein the signal from the sensor of the position detection apparatus is used both as the position detection signal and the light emission controlling signal.

3. The position indicator according to claim 1, wherein, when the resonance circuit receives the signal from the sensor of the position detection apparatus and feeds back the signal to the sensor of the position detection apparatus, the light emitting element is controlled to emit light in accordance with the light emission driving controlling signal.

4. The position indicator according to claim 1, further comprising:
a switch provided between the coil and the first capacitor and configured to be controlled between on and off states in response to a user operation.

5. A position indicator, comprising:
a light emitting element;
a resonance circuit including a coil which, in operation, transmits and receives a signal to and from a sensor of a position detection apparatus, and a first capacitor connected in parallel to the coil; and
a signal generation circuit including a second capacitor that is different from the first capacitor and is connected in parallel to the coil, wherein the second capacitor, in operation, accumulates power of the signal received from the sensor by the resonance circuit, and the signal generation circuit, in operation, generates a light emission driving controlling signal that drives and controls the light emitting element to emit light based on the power accumulated by the second capacitor, wherein the light emitting element is driven and controlled by the light emission driving controlling signal generated by the signal generation circuit to perform light emission control of the light emitting element by the position detection apparatus, wherein the signal from the sensor of the position detection apparatus includes a position detection signal that is detected as a feedback signal from the position indicator by the sensor and a light emission controlling signal that controls light emission of the light emitting element, wherein the signal generation circuit receives the signal including the position detection signal and the light emission controlling signal received by the resonance circuit and generates the light emission driving controlling signal based on the received signal including the position detection signal and the light emission controlling signal, and wherein the position detection signal and the light emission controlling signal are transmitted time-divisionally from the sensor of the position detection apparatus.

6. The position indicator according to claim 5, wherein:
the position detection signal and the light emission controlling signal are each an alternating-current signal of a given frequency; and
the light emission controlling signal is different from the position detection signal in one or more of an amplitude of the alternating-current signal, a signal sending out duration from the sensor, and a transmission repeat cycle from the sensor.

7. The position indicator according to claim 5, wherein:
the light emission controlling signal is an alternating-current signal of a given frequency; and
the light emitting element is placed into a different light emission mode based on one or more of: an amplitude of the alternating-current signal of the received light emission controlling signal, a frequency of the alternating-current signal of the received light emission controlling signal, a signal duration from the sensor, and a repeat cycle from the sensor.

8. A position indicator, comprising:
a light emitting element;
a resonance circuit including a coil which, in operation, transmits and receives a signal to and from a sensor of a position detection apparatus, and a first capacitor connected in parallel to the coil; and
a signal generation circuit including a second capacitor that is different from the first capacitor and is connected in parallel to the coil, wherein the second capacitor, in operation, accumulates power of the signal received from the sensor by the resonance circuit, and the signal generation circuit, in operation, generates a light emission driving controlling signal that drives and controls the light emitting element to emit light based on the power accumulated by the second capacitor, wherein the light emitting element is driven and controlled by the light emission driving controlling signal generated by the signal generation circuit to perform light emission control of the light emitting element by the position detection apparatus, wherein a plurality of light emitting elements having emission light colors different from each other is provided as the light emitting element; and wherein one of the plurality of light emitting elements that is to emit light is switched to a different emission light color in accordance with the light emission driving controlling signal, wherein the light emitting element has an emission light color according to a distance of the position indicator from the sensor and emits light in accordance with the light emission driving controlling signal.

9. The position indicator according to claim 8, comprising:
a plurality of light emitting elements, wherein
the number of the light emitting elements that emit light is changed in accordance with the light emission driving controlling signal.

10. The position indicator according to claim 8, comprising:
a plurality of light emitting elements, wherein
one or more light emitting elements that are to emit light from among the plurality of light emitting elements is switched in accordance with the light emission driving controlling signal.

11. The position indicator according to claim 8, wherein:
the light emitting element is a light emission unit including three light emitting elements having emission light colors of red, green and blue, respectively; and
the emission light color of the light emission unit is varied in accordance with the light emission driving controlling signal.

12. A position indicator, comprising
a light emitting element;
a resonance circuit including a coil which, in operation, transmits and receives a signal to and from a sensor of a position detection apparatus, and a first capacitor connected in parallel to the coil; and
a signal generation circuit including a second capacitor that is different from the first capacitor and is connected in parallel to the coil, wherein the second capacitor, in operation, accumulates power of the signal received from the sensor by the resonance circuit, and the signal generation circuit, in operation, generates a light emission driving controlling signal that drives and controls the light emitting element to emit light based on the power accumulated by the second capacitor, wherein the light emitting element is driven and controlled by the light emission driving controlling signal generated by the signal generation circuit to perform light emission control of the light emitting element by the position detection apparatus, wherein at least one position indicator cartridge is accommodated in a tubular housing;
wherein the position indicator cartridge includes:
a core body portion in which the coil is wound on a magnetic core and a pen tip portion formed such that at least a portion of the magnetic core at which the coil is not wound is covered with a protective member, and
a tubular body portion that at least accommodates the first capacitor that configures the resonance circuit together with the coil; and
wherein the light emitting element is provided on the tubular body portion and the signal generation circuit is provided in the tubular body portion.

13. The position indicator according to claim 12, wherein a mechanism of a knock type ballpoint pen for the position indicator cartridge is provided in the housing.

14. The position indicator according to claim 12, further comprising:
a mechanism of a knock type ballpoint pen provided in the housing and configured such that the mechanism accommodates a plurality of position indicator cartridges and selectively operates one of the position indicator cartridges such that the core body portion is projected at a pen tip portion side thereof from an opening of the housing to outside of the housing.

15. The position indicator according to claim 14, wherein the signal generation circuit generates the light emission driving controlling signal so as to cause the light emitting element of the position indicator cartridge to emit light when the core body portion is projected at one end thereof from the opening of the housing to outside of the housing by the knock type ballpoint pen mechanism.

16. The position indicator according to claim 14, further comprising:
a switch provided between the coil and the first capacitor and configured to be controlled between on and off states in response to a user operation, the switch being closed when the core body portion is projected at the one end thereof from the opening of the housing to outside of the housing by a manipulation of the knock type ballpoint pen mechanism by the user.

17. A position indicator, comprising:
a light emitting element;
a resonance circuit including a coil which, in operation, transmits and receives a signal to and from a sensor of a position detection apparatus, and a first capacitor connected in parallel to the coil; and
a signal generation circuit including a second capacitor that is different from the first capacitor and is connected in parallel to the coil, wherein the second capacitor, in operation, accumulates power of the signal received from the sensor by the resonance circuit, and the signal generation circuit, in operation, generates a light emission driving controlling signal that drives and controls the light emitting element to emit light based on the power accumulated by the second capacitor,
wherein the light emitting element is driven and controlled by the light emission driving controlling signal generated by the signal generation circuit to perform light emission control of the light emitting element by the position detection apparatus, and
wherein the light emitting element emits light with a light emission intensity according to a distance of the position indicator from the sensor by the light emission driving controlling signal.

18. A position detection apparatus that is used together with a position indicator, the position detection apparatus comprising:
a sensor; and
a process control circuit coupled to the sensor, wherein:
the position indicator includes:
a light emitting element;
a resonance circuit including a coil which, in operation, transmits and receives a signal to and from the sensor of the position detection apparatus, and a first capacitor connected in parallel to the coil;
a signal generation circuit including a second capacitor that is different from the first capacitor and is connected in parallel to the coil, wherein the second capacitor, in operation, accumulates power of the signal received from the sensor by the resonance circuit, and the signal generation circuit, in operation, generates a light emission driving controlling signal that drives and controls the light emitting element to emit light based on the power accumulated by the second capacitor; and
a detection circuit which, in operation, detects electromagnetic coupling to the resonance circuit of the position indicator based on the feedback signal from the position indicator,
the position detection apparatus transmits the signal, which includes a position detection signal that is detected as a feedback signal from the position indicator by the sensor and a light emission controlling signal that controls light emission of the light emitting element, from the sensor to the resonance circuit of the position indicator through electromagnetic coupling, and
the light emission controlling signal is varied so as to vary a light emission mode of the light emitting element of the position indicator based on a detection result of the electromagnetic coupling to the resonance circuit of the position indicator by the detection circuit.

19. The position detection apparatus according to claim 18, wherein:
the light emission controlling signal is a burst signal of a given frequency; and
the light emission controlling signal is varied by varying one or more of an amplitude, a signal duration, a repeat cycle, and a frequency of the burst signal.

20. The position detection apparatus according to claim 18, wherein:
a plurality of light emitting elements is provided in the position indicator; and
the light emission controlling signal switches a light emitting element that is to emit light from among the plurality of light emitting elements.

21. The position detection apparatus according to claim 18, wherein
the position indicator includes a plurality of light emitting elements having different emission light colors; and
the light emission controlling signal one of the light emitting elements that is to emit light to a different emission light color.

22. The position detection apparatus according to claim 18, wherein:
the light emitting element of the position indicator is a light emission unit including three light emitting elements having emission light colors of red, green and blue, respectively; and
the light emission controlling signal varies the emission light color of the light emission unit.

23. A position detection apparatus that is used together with a position indicator, the position detection apparatus comprising:
a sensor; and
a process control circuit coupled to the sensor, wherein:
the position indicator includes:
a light emitting element;
a resonance circuit including a coil which, in operation, transmits and receives a signal to and from the sensor of the position detection apparatus, and a first capacitor connected in parallel to the coil; and
a signal generation circuit including a second capacitor that is different from the first capacitor and is connected in parallel to the coil, wherein the second capacitor, in operation, accumulates power of the signal received from the sensor by the resonance circuit, and the signal generation circuit, in operation, generates a light emission driving controlling signal that drives and controls the light emitting element to emit light based on the power accumulated by the second capacitor, the position detection apparatus transmits the signal, which includes a position detection signal that is detected as a feedback signal from the position indicator by the sensor and a light emission controlling signal that controls light emission of the light emitting element, from the sensor to the resonance circuit of the position indicator through electromagnetic coupling, the position detection signal and the light emission controlling signal are each a burst signal of a given frequency; and the light emission controlling signal is different from the position detection signal in one or more of an amplitude, a signal duration of the burst signal, and a repeat cycle of the burst signal.

* * * * *